United States Patent
Petrushin

(10) Patent No.: US 7,940,914 B2
(45) Date of Patent: May 10, 2011

(54) DETECTING EMOTION IN VOICE SIGNALS IN A CALL CENTER

(75) Inventor: Valery A. Petrushin, Arlington Heights, IL (US)

(73) Assignee: Accenture Global Services Limited, Dublin (IE)

( * ) Notice: Subject to any disclaimer, the term of this patent is extended or adjusted under 35 U.S.C. 154(b) by 3093 days.

(21) Appl. No.: 09/833,301

(22) Filed: Apr. 10, 2001

(65) Prior Publication Data

US 2003/0033145 A1 Feb. 13, 2003

Related U.S. Application Data

(63) Continuation of application No. 09/388,909, filed on Aug. 31, 1999, now Pat. No. 6,275,806.

(51) Int. Cl.
*H04M 3/51* (2006.01)
*H04M 3/523* (2006.01)
*G10L 17/00* (2006.01)

(52) U.S. Cl. ............... 379/265.06; 379/265.07; 704/270; 704/E17.002

(58) Field of Classification Search .... 379/88.01–88.04, 379/112.01, 142.01, 265.02–265.08, 266.01–266.03, 379/309; 704/270, 272, E17.002
See application file for complete search history.

(56) References Cited

U.S. PATENT DOCUMENTS

| | | | |
|---|---|---|---|
| 5,572,576 A | 11/1996 | Klausner et al. | 379/67 |
| 5,918,222 A | 6/1999 | Fukui et al. | |
| 6,212,550 B1 | 4/2001 | Segur | 709/206 |
| 6,638,217 B1 | 10/2003 | Liberman | 600/300 |
| 6,795,808 B1 | 9/2004 | Strubbe et al. | |
| 7,181,693 B1 | 2/2007 | Anderson et al. | 715/745 |

OTHER PUBLICATIONS

Petrushin, V. "Emotion in Speech: Recognition and Application to Call Centers," Artificial Neural Networks in Engineering, Nov. 7-10, 1999.

Foreign communication/office action dated Dec. 3, 2008 (in Hebrew and English translation citing above U.S. Patent No. 5,572,576 (5p).

*Primary Examiner* — Harry S Hong

(74) *Attorney, Agent, or Firm* — Brinks Hofer Gilson & Lione

(57) ABSTRACT

A system, method and article of manufacture are provided for detecting emotion using statistics. First, a database is provided. The database has statistics including human associations of voice parameters with emotions. Next, a voice signal is received. At least one feature is extracted from the voice signal. Then the extracted voice feature is compared to the voice parameters in the database. An emotion is selected from the database based on the comparison of the extracted voice feature to the voice parameters and is then output.

3 Claims, 35 Drawing Sheets

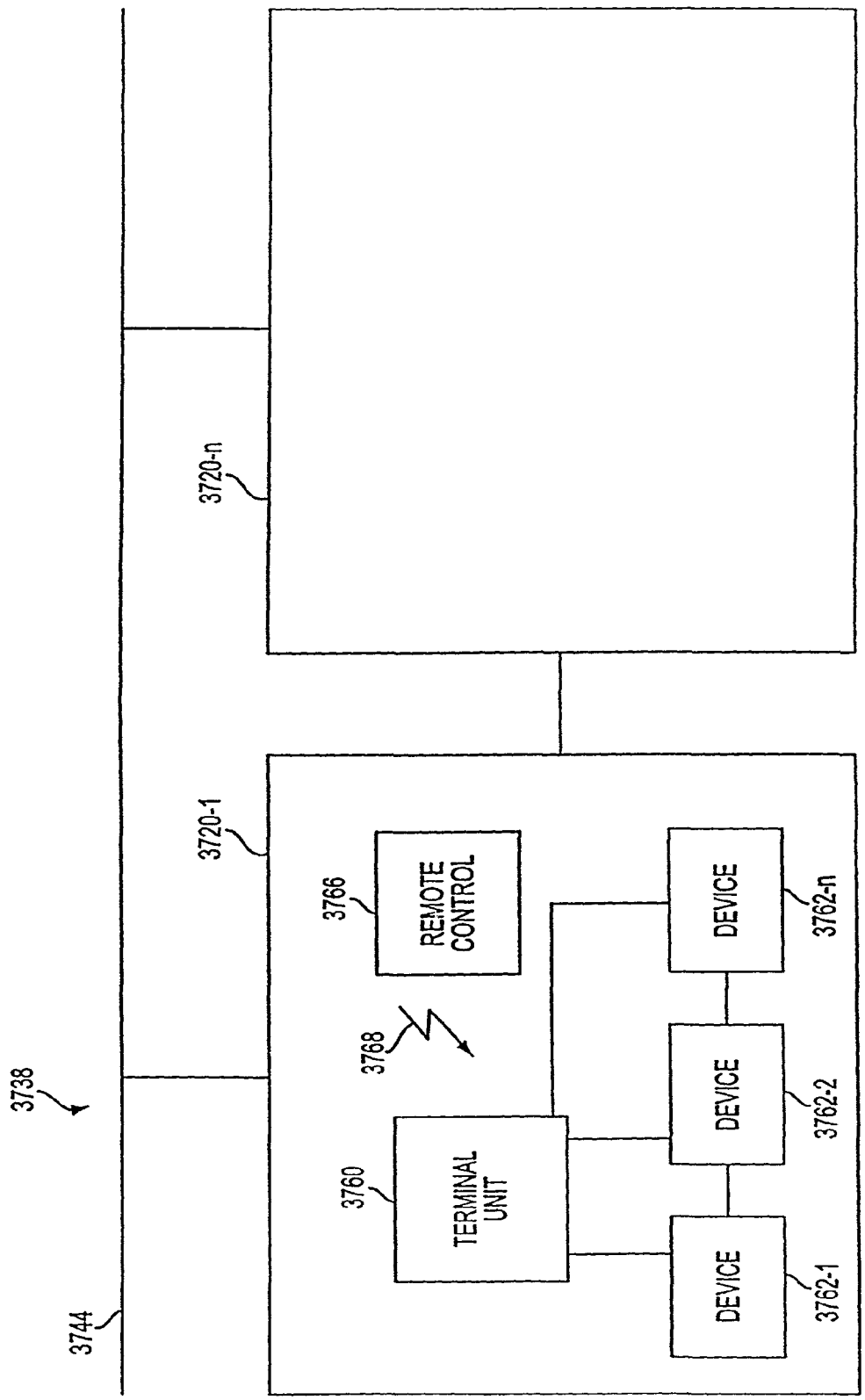

US 7,940,914 B2

DETECTING EMOTION IN VOICE SIGNALS IN A CALL CENTER

This application claims priority to and is a continuation of U.S. patent application Ser. No. 09/388,909, filed Aug. 31, 1999, now U.S. Pat. No. 6,275,806 which is herein incorporated by reference.

FIELD OF THE INVENTION

The present invention relates to voice recognition and more particularly to detecting emotion using statistics calculated for voice signal parameters.

BACKGROUND OF THE INVENTION

Although the first monograph on expression of emotions in animals & humans was written by Charles Darwin in the last century and psychologists have gradually cumulated knowledge in the field of emotion detection and voice recognition, it has attracted a new wave of interest recently by both psychologists and artificial intelligence specialists. There are several reasons for this renewed interest: technological progress in recording, storing and processing audio and visual information; the development of non-intrusive sensors; the advent of wearable computers; and the urge to enrich human-computer interface from point-and-click to sense-and-feel. Further, a new field of research in AI known as affective computing has recently been identified.

As to research on recognizing emotions in speech, on one hand, psychologists have done many experiments and suggested theories. On the other hand, AI researchers made contributions in the following areas: emotional speech synthesis, recognition of emotions and using agents for decoding and expressing emotions. Similar progress has been made with voice recognition.

In spite of the research on recognizing emotions in speech, the art has been devoid of methods and apparatuses that utilize emotion recognition and voice recognition for business purposes.

SUMMARY OF THE INVENTION

A system, method and article of manufacture are provided for detecting emotion using statistics. First, a database is provided. The database has statistics including statistics of human associations of voice parameters with emotions. Next, a voice signal is received. At least one feature is extracted from the voice signal. Then the extracted voice feature is compared to the voice parameters in the database. An emotion is selected from the database based on the comparison of the extracted voice feature to the voice parameters and is then output. In one aspect of the present invention, the feature that is extracted includes a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and/or a range of the first formant.

In another aspect of the present invention, the database includes probabilities of a particular voice feature being associated with an emotion. Preferably, the selection of the emotion from the database includes analyzing the probabilities and selecting the most probable emotion based on the probabilities. Optionally, the probabilities of the database may include performance confusion statistics. Also optionally, the statistics in the database may include self-recognition statistics.

DESCRIPTION OF THE DRAWINGS

The invention will be better understood when consideration is given to the following detailed description thereof. Such description makes reference to the annexed drawings wherein:

FIGS. 37A, 37B, and 37C together form a block diagram of an exemplary entertainment delivery system in which an embodiment of the instant invention is incorporated;

DETAILED DESCRIPTION

In accordance with at least one embodiment of the present invention, a system is provided for performing various functions and activities through voice analysis and voice recognition. The system may be enabled using a hardware implementation such as that illustrated in FIG. 1. Further, various functional and user interface features of one embodiment of the present invention may be enabled using software programming, i.e. object oriented programming (OOP).

Hardware Overview

Figure 1:
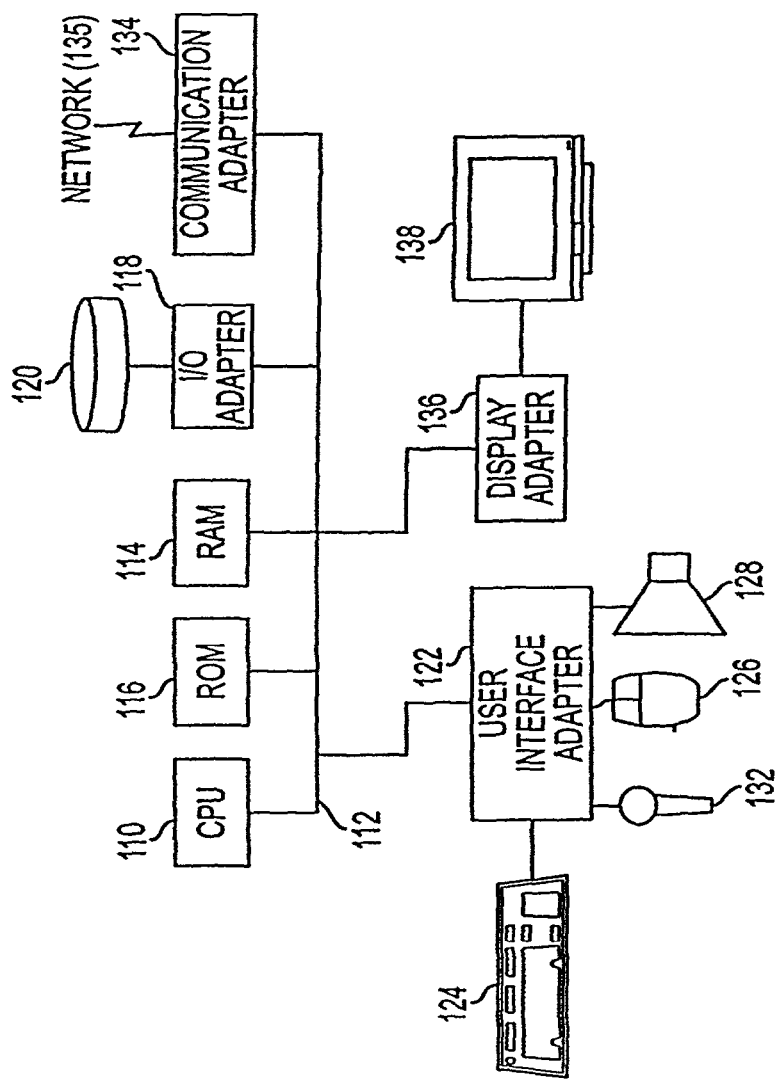
FIG. 1 is a schematic diagram of a hardware implementation of one embodiment of the present invention.

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system.

Software Overview

Object oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

- Objects can represent physical objects, such as automobiles in a traffic-flow simulation, electrical components in a circuit-design program, countries in an economics model, or aircraft in an air-traffic-control system.
- Objects can represent elements of the computer-user environment such as windows, menus or graphics objects.
- An object can represent an inventory, such as a personnel file or a table of the latitudes and longitudes of cities.
- An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects. This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increase in the speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal. The benefits of object classes can be summarized as follows:

- Objects and their corresponding classes break down complex programming problems into many smaller, simpler problems.
- Encapsulation enforces data abstraction through the organization of data into small, independent objects that can communicate with each other. Encapsulation protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.
- Libraries of reusable classes are useful in many situations, but they also have some limitations. For example:
- Complexity. In a complex system, the class hierarchies for related classes can become extremely confusing, with many dozens or even hundreds of classes.
- Flow of control. A program written with the aid of class libraries is still responsible for the flow of control (i.e., it must control the interactions among all the objects created from a particular library). The programmer has to decide which functions to call at what times for which kinds of objects.
- Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure). A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems. Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "Interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, which are fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Emotion Recognition

The present invention is directed towards utilizing recognition of emotions in speech for business purposes. Some embodiments of the present invention may be used to detect the emotion of a person based on a voice analysis and output the detected emotion of the person. Other embodiments of the present invention may be used for the detection of the emotional state in telephone call center conversations, and providing feedback to an operator or a supervisor for monitoring purposes. Yet other embodiments of the present invention may be applied to sort voice mail messages according to the emotions expressed by a caller.

If the target subjects are known, it is suggested that a study be conducted on a few of the target subjects to determine which portions of a voice are most reliable as indicators of emotion. If target subjects are not available, other subjects may be used. Given this orientation, for the following discussion:

Data should be solicited from people who are not professional actors or actresses to improve accuracy, as actors and actresses may overemphasize a particular speech component, creating error.

Data may be solicited from test subjects chosen from a group anticipated to be analyzed. This would improve accuracy.

Telephone quality speech (<3.4 kHz) can be targeted to improve accuracy for use with a telephone system.

The testing may rely on voice signal only. This means the modem speech recognition techniques would be excluded, since they require much better quality of signal & computational power.

Data Collecting & Evaluating

In an exemplary test, four short sentences are recorded from each of thirty people:

"This is not what I expected."
"I'll be right there."
"Tomorrow is my birthday.
"I'm getting married next week."

Each sentence should be recorded five times; each time, the subject portrays one of the following emotional states: happiness, anger, sadness, fear/nervousness and normal (unemotional). Five subjects can also record the sentences twice with different recording parameters. Thus, each subject has recorded 20 or 40 utterances, yielding a corpus containing 700 utterances with 140 utterances per emotional state. Each utterance can be recorded using a close-talk microphone; the first 100 utterances at 22-kHz/8 bit and the remaining 600 utterances at 22-kHz/16 bit.

After creating the corpus, an experiment may be performed to find the answers to the following questions:

How well can people without special training portray and recognize emotions in speech?

How well can people recognize their own emotions that they recorded 6-8 weeks earlier?

Which kinds of emotions are easier/harder to recognize? One important result of the experiment is selection of a set of most reliable utterances, i.e. utterances that are recognized by the most people. This set can be used as training and test data for pattern recognition algorithms run by a computer.

An interactive program of a type known in the art may be used to select and play back the utterances in random order and allow a user to classify each utterance according to its emotional content. For example, twenty-three subjects can take part in the evaluation stage and an additional 20 of whom had participated in the 15 recording state earlier.

Table 1 shows a performance confusion matrix resulting from data collected from performance of the previously discussed study. The rows and the columns represent true & evaluated categories respectively. For example, the second row says that 11.9% of utterances that were portrayed as happy were evaluated as normal (unemotional), 61.4% as true happy, 10.1% as angry, 4.1% as sad, and 12.5% as fear. It is also seen that the most easily recognizable category is anger (72.2%) and the least recognizable category is fear (49.5%). A lot of confusion is found between sadness and fear, sadness and unemotional state and happiness and fear. The mean accuracy is 63.5% that agrees with the results of the other experimental studies.

TABLE 1

Performance Confusion Matrix

| Category | Normal | Happy | Angry | Sad | Afraid | Total |
|---|---|---|---|---|---|---|
| Normal | 66.3 | 2.5 | 7.0 | 18.2 | 6.0 | 100 |
| Happy | 11.9 | 61.4 | 10.1 | 4.1 | 12.5 | 100 |

Table 2 shows statistics for evaluators for each emotional category and for summarized performance that was calculated as the sum of performances for each category. It can be seen that the variance for anger and sadness is much less then for the other emotional categories.

TABLE 2

Evaluators' Statistics

| Category | Mean | Std. Dev. | Median | Minimum | Maximum |
|---|---|---|---|---|---|
| Normal | 66.3 | 13.72.5 | 64.3 | 29.3 | 95.7 |
| Happy | 61.4 | 11.8 | 62.9 | 31.4 | 78.6 |
| Angry | 72.2 | 5.3 | 72.1 | 62.9 | 84.3 |
| Sad | 68.3 | 7.8 | 68.6 | 50.0 | 80.0 |
| Afraid | 49.5 | 13.3 | 51.4 | 22.1 | 68.6 |
| Total | 317.7 | 28.9 | 314.3 | 253.6 | 355.7 |

Table three, below, shows statistics for "actors", i.e. how well subjects portray emotions. Speaking more precisely, the numbers in the table show which portion of portrayed emotions of a particular category was recognized as this category by other subjects. It is interesting to see comparing tables 2 and 3 that the ability to portray emotions (total mean is 62.9%) stays approximately at the same level as the ability to recognize emotions (total mean is 63.2%), but the variance for portraying is much larger.

TABLE 3

Actors' Statistics

| Category | Mean | Std. Dev. | Median | Minimum | Maximum |
|---|---|---|---|---|---|
| Normal | 65.1 | 16.4 | 68.5 | 26.1 | 89.1 |
| Happy | 59.8 | 21.1 | 66.3 | 2.2 | 91.3 |
| Angry | 71.1 | 24.5 | 78.2 | 13.0 | 100.0 |
| Sad | 68.1 | 18.4 | 72.6 | 32.6 | 93.5 |
| Afraid | 49.7 | 18.6 | 48.9 | 17.4 | 88.0 |
| Total | 314.3 | 52.5 | 315.2 | 213 | 445.7 |

Table 4 shows self-reference statistics, i.e. how well subjects were able to recognize their own portrayals. We can see that people do much better in recognizing their own emotions (mean is 80.0%), especially for anger (98.1%), sadness (80.0%) and fear (78.8%). Interestingly, fear was recognized better than happiness. Some subjects failed to recognize their own portrayals for happiness and the normal state.

TABLE 4

Self-reference Statistics

| Category | Mean | Std. Dev. | Median | Minimum | Maximum |
|---|---|---|---|---|---|
| Normal | 71.9 | 25.3 | 75.0 | 0.0 | 100.0 |
| Happy | 71.2 | 33.0 | 75.0 | 0.0 | 100.0 |
| Angry | 98.1 | 6.1 | 100.0 | 75.0 | 100.0 |
| Sad | 80.0 | 22.0 | 81.2 | 25.0 | 100.0 |
| Afraid | 78.8 | 24.7 | 87.5 | 25.0 | 100.0 |
| Total | 400.0 | 65.3 | 412.5 | 250.0 | 500.0 |

From the corpus of 700 utterances five nested data sets which include utterances that were recognized as portraying the given emotion by at least p percent of the subjects (p=70, 80, 90, 95, and 100%) may be selected. For the present discussion, these data sets shall be referred to as s70, s80, s90, and s100. Table 5, below, shows the number of elements in each data set. We can see that only 7.9% of the utterances of the corpus were recognized by all subjects. And this number lineally increases up to 52.7% for the data set s70, which corresponds to the 70%-level of concordance in decoding emotion in speech.

TABLE 5 p-level Concordance Data sets

| Data set | s70 | s80 | s90 | s95 | s100 |
|---|---|---|---|---|---|
| Size | 369 | 257 | 149 | 94 | 55 |
|  | 52.7% | 36.7% | 21.3% | 13.4% | 7.9% |

These results provide valuable insight about human performance and can serve as a baseline for comparison to computer performance.

Feature Extraction

It has been found that pitch is the main vocal cue for emotion recognition. Strictly speaking, the pitch is represented by the fundamental frequency (FO), i.e. the main (lowest) frequency of the vibration of the vocal folds. The other acoustic variables contributing to vocal emotion signaling are:

Vocal energy

Frequency spectral features

Formants (usually only on or two first formants (F1, F2) are considered).

Temporal features (speech rate and pausing).

Another approach to feature extraction is to enrich the set of features by considering some derivative features such as LPC (linear predictive coding) parameters of signal or features of the smoothed pitch contour and its derivatives.

For this invention, the following strategy may be adopted. First, take into account fundamental frequency FO (i.e. the main (lowest) frequency of the vibration of the vocal folds), energy, speaking rate, first three formants (F1, F2, and F3) and their bandwidths (BW1, BW2, and BW3) and calculate for them as many statistics as possible. Then rank the statistics using feature selection techniques, and pick a set of most "important" features.

The speaking rate can be calculated as the inverse of the average length of the voiced part of utterance. For all other parameters, the following statistics can be calculated: mean, standard deviation, minimum, maximum and range. Additionally for FO the slope can be calculated as a linear regression for voiced part of speech, i.e. the line that fits the pitch contour. The relative voiced energy can also be calculated as the proportion of voiced energy to the total energy of utterance. Altogether, there are about 40 features for each utterance.

The RELIEF-F algorithm may be used for feature selection. For example, the RELIEF-F may be run for the s70 data set varying the number of nearest neighbors from 1 to 12, and the features ordered according to their sum of ranks. The top 14 features are the following: F0 maximum, F0 standard deviation, F0 range, F0 mean, BW1 mean, BW2 mean, energy standard deviation, speaking rate, F0 slope, F1 maximum, energy maximum, energy range, F2 range, and F1 range. To investigate how sets of features influence the accuracy of emotion recognition algorithms, three nested sets of features may be formed based on their sum of ranks. The first set includes the top eight features (from F0 maximum speaking rate), the second set extends the first one by two next features (F0 slope and F1 maximum), and the third set includes all 14 top features. More details on the RELIEF-F algorithm are set forth in the publication Proc. European Conf. On Machine Learning (1994) in the article by I. Kononenko entitled "Estimating attributes: Analysis and extension of RELIEF" and found on pages 171-182 and which is herein incorporated by reference for all purposes.

Figure 2:
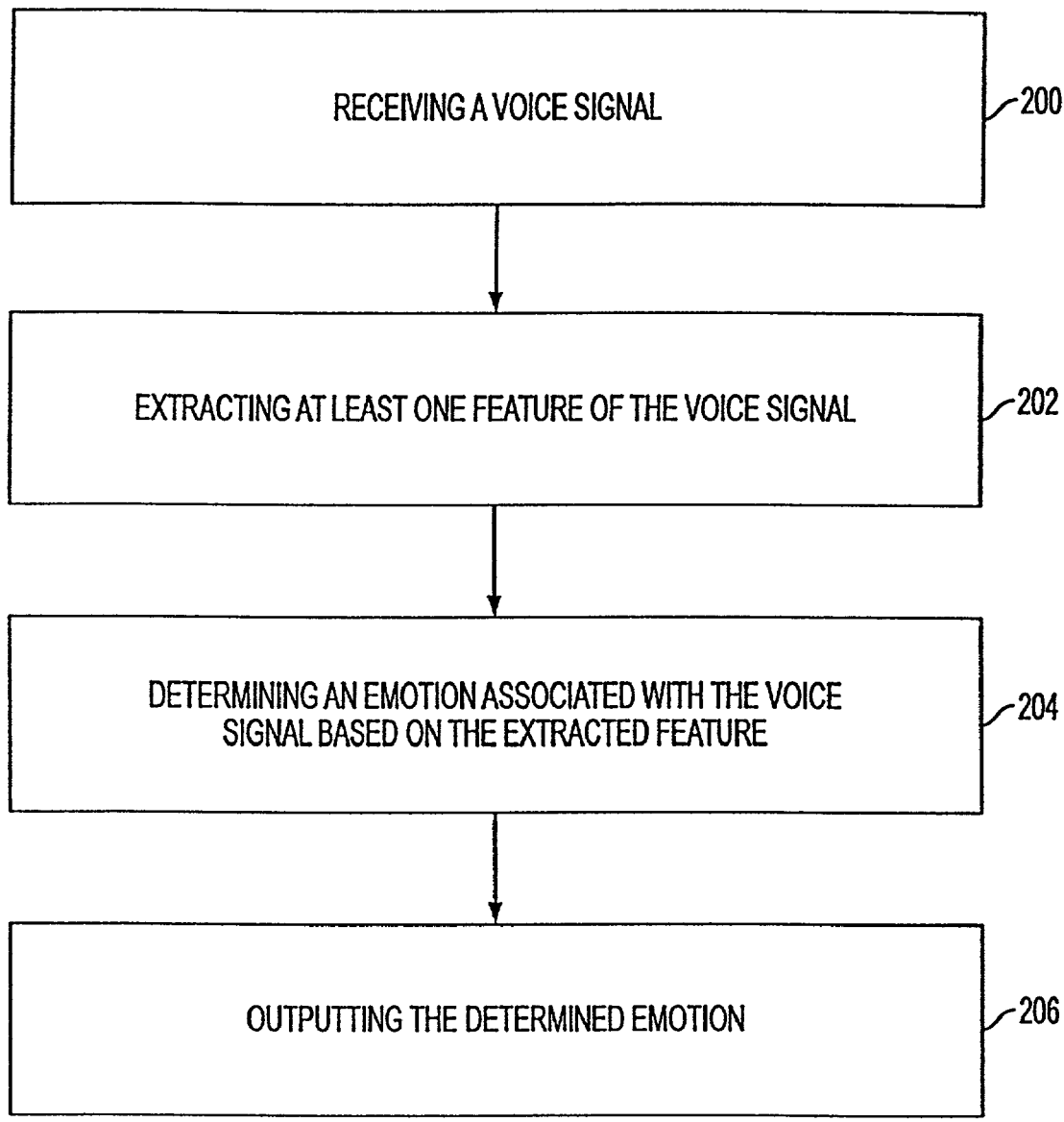
FIG. 2 is a flowchart depicting one embodiment of the present invention that detects emotion using voice analysis.

FIG. 2 illustrates one embodiment of the present invention that detects emotion using voice analysis. In operation 200, a voice signal is received, such as by a microphone or in the form of a digitized sample. A predetermined number of features of the voice signal are extracted as set forth above and selected in operation 202. These features include, but are not limited to, a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and a range of the first formant. Utilizing the features selected in operation 202, an emotion associated with the voice signal is determined in operation 204 based on the extracted feature. Finally, in operation 206, the determined emotion is output. See the discussion below, particularly with reference to FIGS. 8 and 9, for a more detailed discussion of determining an emotion based on a voice signal in accordance with the present invention.

Preferably, the feature of the voice signal is selected from the group of features consisting of the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, and the speaking rate. Ideally, the extracted feature includes at least one of the slope of the fundamental frequency and the maximum value of the first formant.

Optionally, a plurality of features are extracted including the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, and the speaking rate. Preferably, the extracted features include the slope of the fundamental frequency and the maximum value of the first formant.

As another option, a plurality of features are extracted including the maximum value of the fundamental frequency, the standard deviation of the fundamental frequency, the range of the fundamental frequency, the mean of the fundamental frequency, the mean of the bandwidth of the first formant, the mean of the bandwidth of the second formant, the standard deviation of energy, the speaking rate, the slope of the fundamental frequency, the maximum value of the first formant, the maximum value of the energy, the range of the energy, the range of the second formant, and the range of the first formant.

Computer Performance

To recognize emotions in speech, two exemplary approaches may be taken: neural networks and ensembles of classifiers. In the first approach, a two-layer back propagation neural network architecture with a 8-, 10- or 14-element input vector, 10 or 20 nodes in the hidden sigmoid layer and five nodes in the output linear layer may be used. The number of outputs corresponds to the number of emotional categories. To train and test the algorithms, data sets s70, s80, and s90 may be used. These sets can be randomly split into training (67% of utterances) and test (33%) subsets. Several neural network classifiers trained with different initial weight matrices may be created. This approach, when applied to the s70 data set and the 8-feature set above, gave the average accuracy of about 55% with the following distribution for emotional categories: normal state is 40-50%, happiness is 55-65%, anger is 60-80%, sadness is 60-70%, and fear is 20-40%.

For the second approach, ensembles of classifiers are used. An ensemble consists of an odd number of neural network classifiers, which have been trained on different subsets of the training set using the bootstrap aggregation and cross-validated committees techniques. The ensemble makes decisions based on the majority voting principle. Suggested ensemble sizes are from 7 to 15.

Figure 3:
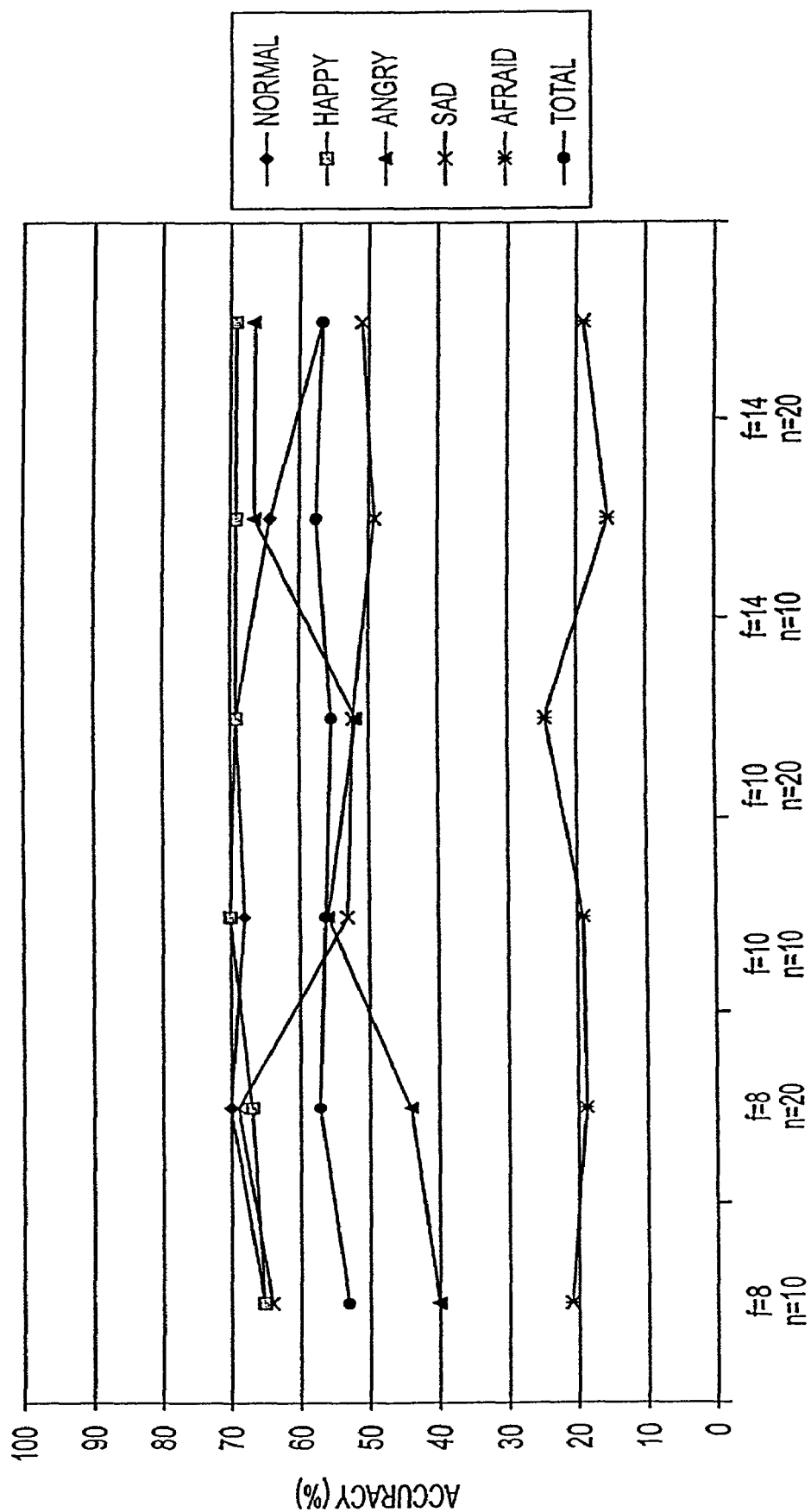
FIG. 3 is a graph showing the average accuracy of recognition for an s70 data set.

FIG. 3 shows the average accuracy of recognition for an s70 data set, all three sets of features, and both neural network architectures (10 and 20 neurons in the hidden layer). It can be seen that the accuracy for happiness stays the same (~68%) for the different sets of features and architectures. The accuracy for fear is rather low (15-25%). The accuracy for anger is relatively low (40-45%) for the 8-feature set and improves dramatically (65%) for the 14-feature set. But the accuracy for sadness is higher for the 8-feature set than for the other sets. The average accuracy is about 55%. The low accuracy for fear confirms the theoretical result which says that if the individual classifiers make uncorrelated errors are rates exceeding 0.5 (it is 0.6-0.8 in our case) then the error rate of the voted ensemble increases.

Figure 4:
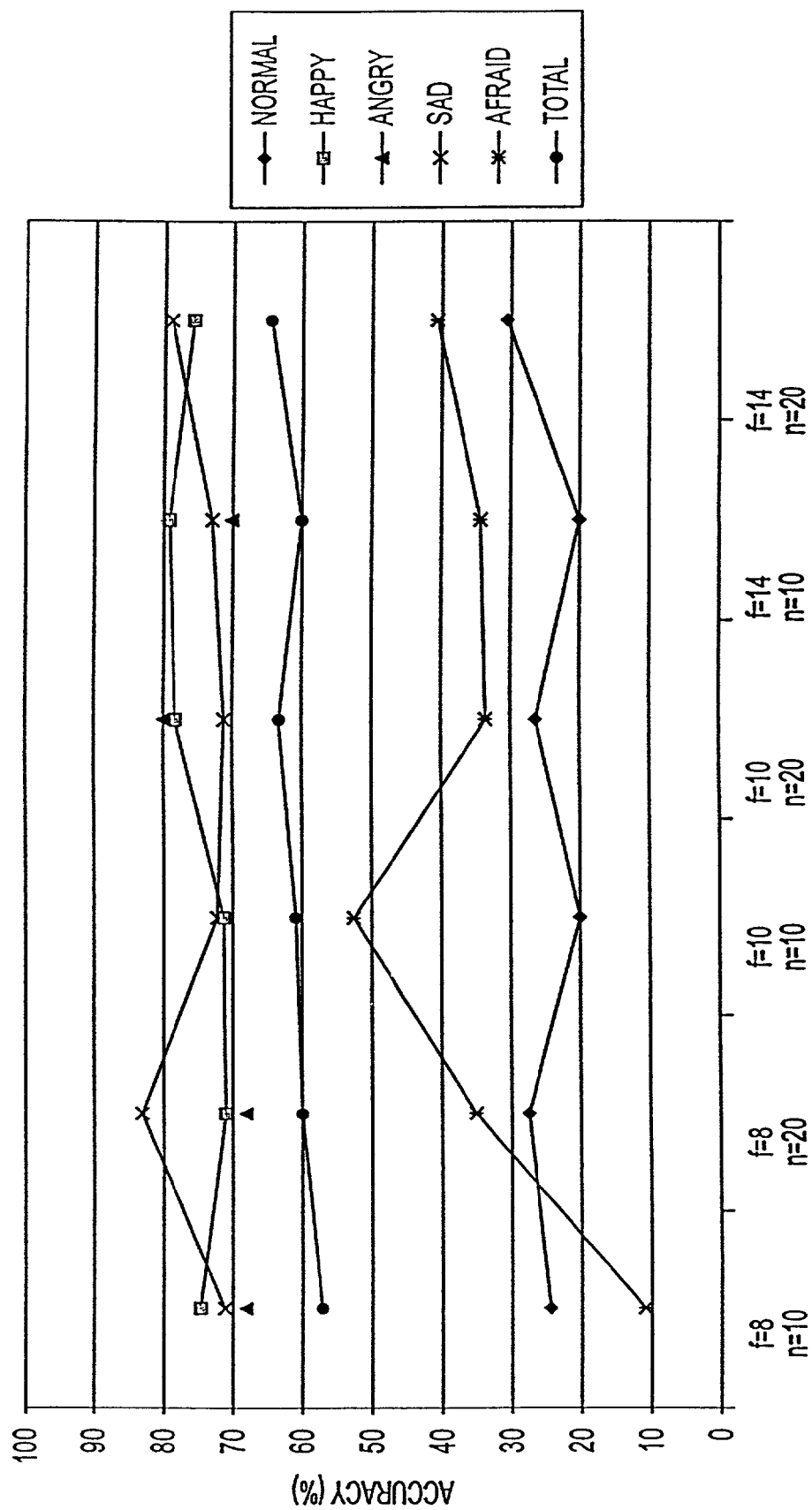
FIG. 4 is a chart illustrating the average accuracy of recognition for an s80 data set.

FIG. 4 shows results for an s80 data set. It is seen that the accuracy for normal state is low (20-30%). The accuracy for fear changes dramatically from 11% for the 8-feature set and 10-neuron architecture to 53% for the 10-feature and 10-neuron architecture. The accuracy for happiness, anger and sadness is relatively high (68-83%) The average accuracy (~61%) is higher than for the s70 data set.

Figure 5:
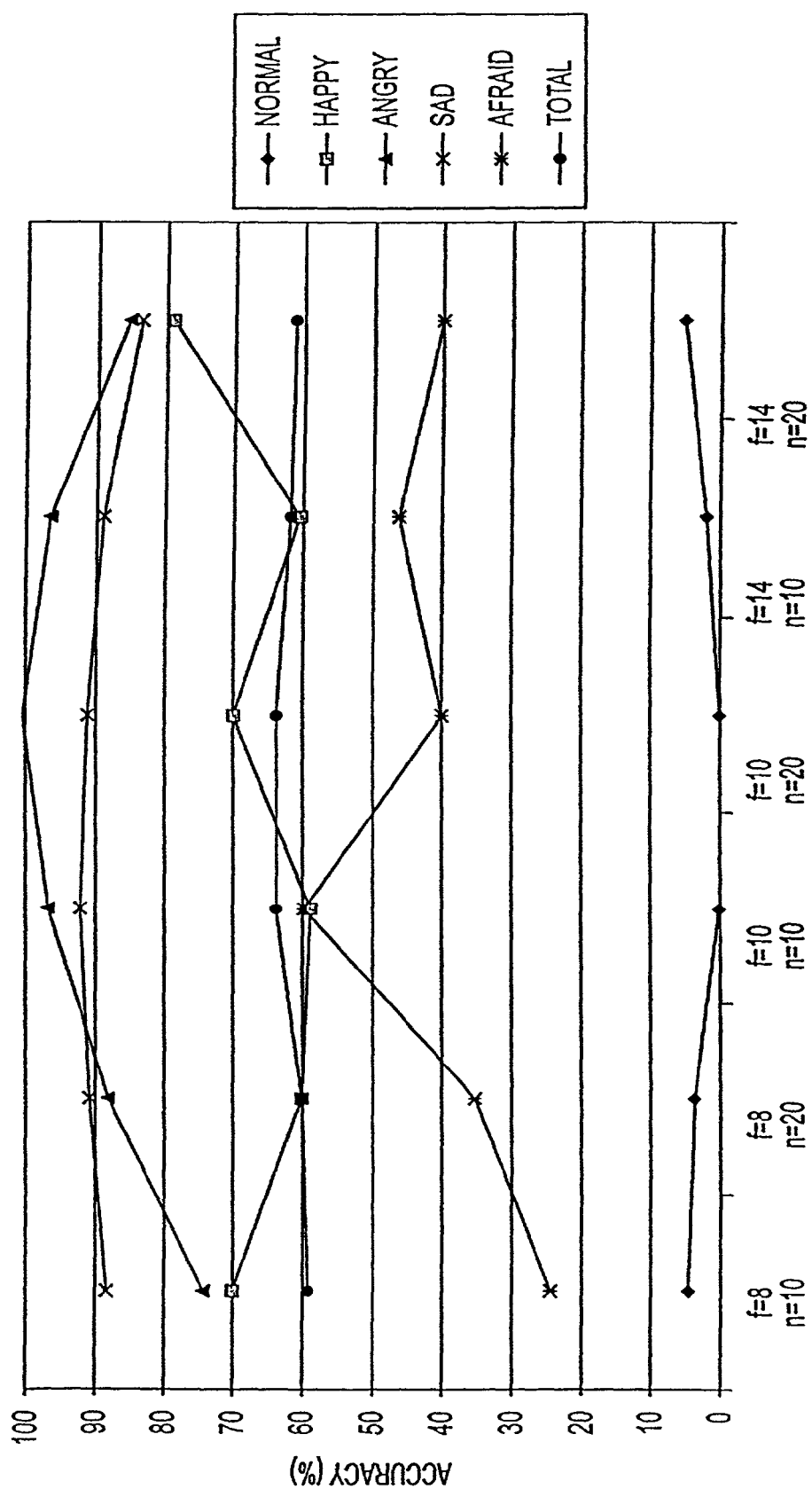
FIG. 5 is a graph depicting the average accuracy of recognition for an s90 data set.

FIG. 5 shows results for an s90 data set. We can see that the accuracy for fear is higher (25-60%) but it follows the same pattern shown for the s80 data set. The accuracy for sadness and anger is very high: 75-100% for anger and 88-93% for sadness. The average accuracy (62%) is approximately equal to the average accuracy for the s80 data set.

Figure 6:
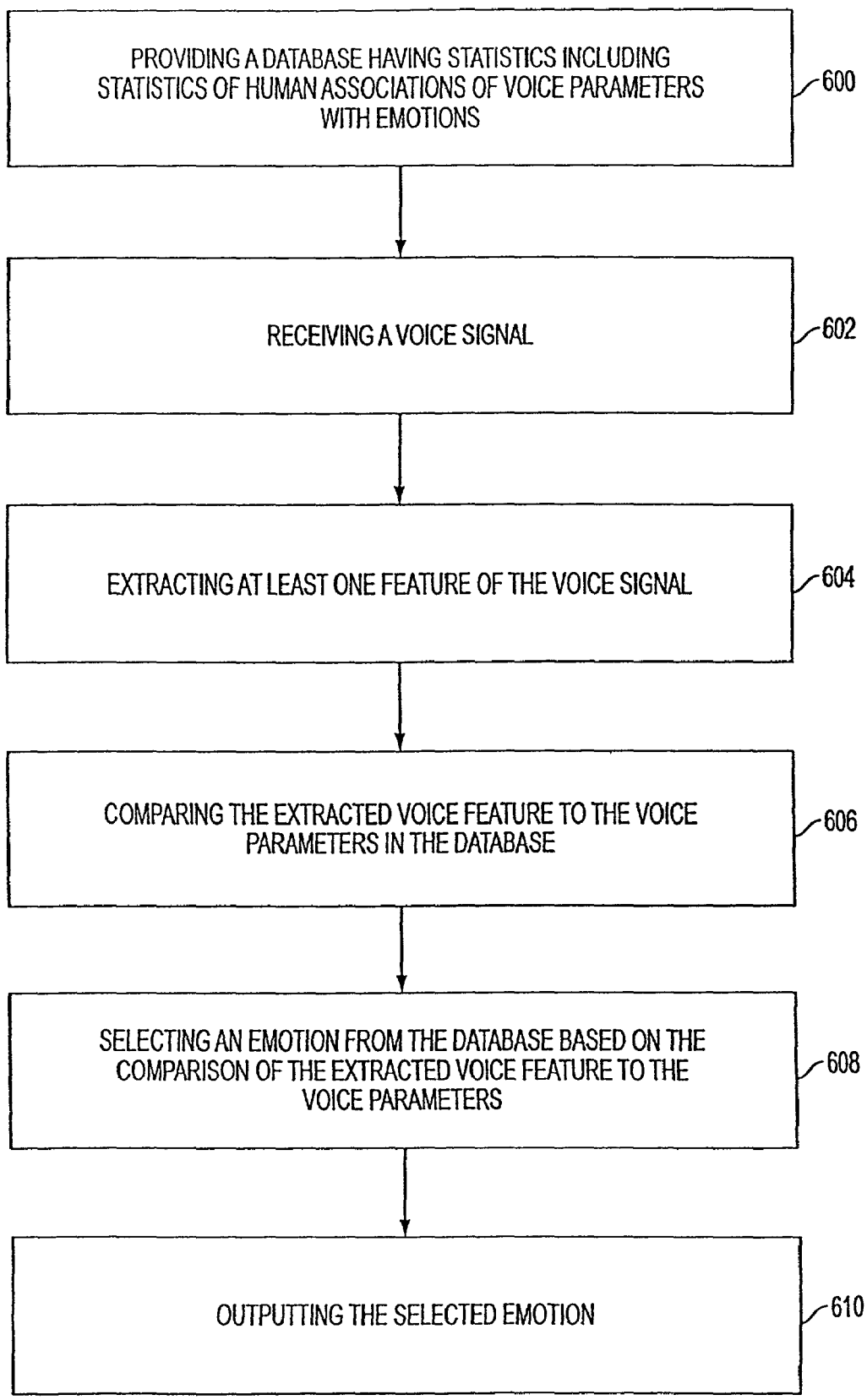
FIG. 6 is a flow chart illustrating an embodiment of the present invention that detects emotion using statistics.

FIG. 6 illustrates an embodiment of the present invention that detects emotion using statistics. First, a database is provided in operation 600. The database has statistics including statistics of human associations of voice parameters with emotions, such as those shown in the tables above and Figures through 5. Further, the database may include a series of voice pitches associated with fear and another series of voice pitches associated with happiness and a range of error for certain pitches. Next, a voice signal is received in operation 602. In operation 604, one or more features are extracted from the voice signal. See the Feature extraction section above for more details on extracting features from a voice signal. Then, in operation 606, the extracted voice feature is compared to the voice parameters in the database. In operation 608, an emotion is selected from the database based on the comparison of the extracted voice feature to the voice parameters. This can include, for example, comparing digitized speech samples from the database with a digitized sample of the feature extracted from the voice signal to create a list of probable emotions and then using algorithms to take into account statistics of the accuracy of humans in recognizing the emotion to make a final determination of the most probable emotion. The selected emotion is finally output in operation 610. Refer to the section entitled Exemplary Apparatuses for Detecting Emotion in Voice Signals, below, for computerized mechanisms to perform emotion recognition in speech.

In one aspect of the present invention, the database includes probabilities of particular voice features being associated with an emotion. Preferably, the selection of the emotion from the database includes analyzing the probabilities and selecting the most probable emotion based on the probabilities. Optionally, the probabilities of the database may include performance confusion statistics, such as are shown in the Performance Confusion Matrix above. Also optionally, the statistics in the database may include self-recognition statistics, such as shown in the Tables above.

In another aspect of the present invention, the feature that is extracted includes a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and/or a range of the first formant.

Figure 7:
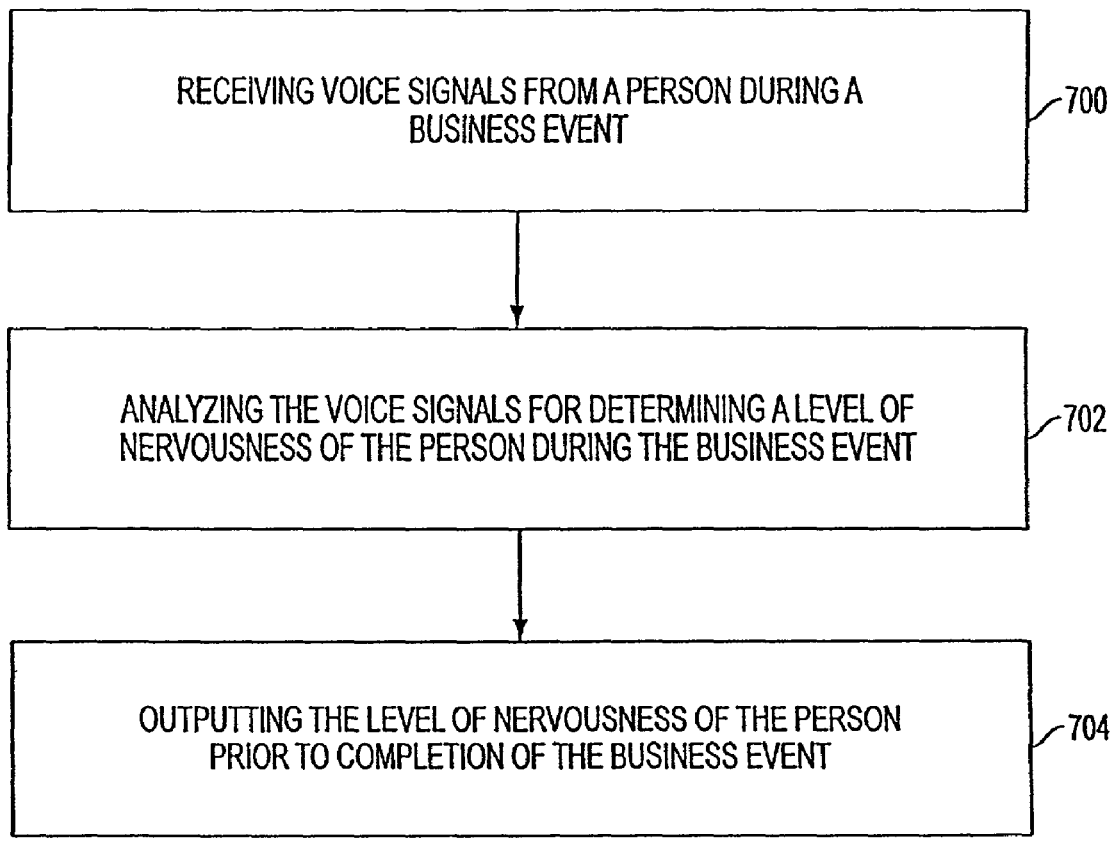
FIG. 7 is a flow chart illustrating a method for detecting nervousness in a voice in a business environment to help prevent fraud.

FIG. 7 is a flow chart illustrating a method for detecting nervousness in a voice in a business environment to help prevent fraud. First, in operation 700, voice signals are received from a person during a business event. For example, the voice signals may be created by a microphone in the proximity of the person, may be captured from a telephone tap, etc. The voice signals are analyzed during the business event in operation 702 to determine a level of nervousness of the person. The voice signals may be analyzed as set forth above. In operation 704, an indication of the level of nervousness is output, preferably before the business event is completed so that one attempting to prevent fraud can make an assessment whether to confront the person before the person leaves. Any kind of output is acceptable, including paper printout or a display on a computer screen. It is to be understood that this embodiment of the invention may detect emotions other than nervousness. Such emotions include stress and any other emotion common to a person when committing fraud.

This embodiment of the present invention has particular application in business areas such as contract negotiation, insurance dealings, customer service, etc. Fraud in these areas cost companies millions each year. Fortunately, the present invention provides a tool to help combat such fraud. It should also be noted that the present invention has applications in the law enforcement arena as well as in a courtroom environment, etc.

Preferably, a degree of certainty as to the level of nervousness of the person is output to assist one searching for fraud in making a determination as to whether the person was speaking fraudulently. This may be based on statistics as set forth above in the embodiment of the present invention with reference to FIG. 6. Optionally, the indication of the level of nervousness of the person may be output in real time to allow one seeking to prevent fraud to obtain results very quickly so he or she is able to challenge the person soon after the person makes a suspicious utterance.

As another option, the indication of the level of nervousness may include an alarm that is set off when the level of nervousness goes above a predetermined level. The alarm may include a visual notification on a computer display, an auditory sound, etc. to alert an overseer, the listener, and/or one searching for fraud. The alarm could also be connected to a recording device which would begin recording the conversation when the alarm was set off, if the conversation is not already being recorded.

The alarm options would be particularly useful in a situation where there are many persons taking turns speaking. One example would be in a customer service department or on the telephone to a customer service representative. As each customer takes a turn to speak to a customer service representative, the present invention would detect the level of nervousness in the customer's speech. If the alarm was set off because the level of nervousness of a customer crossed the predetermined level, the customer service representative could be notified by a visual indicator on his or her computer screen, a flashing light, etc. The customer service representative, now aware of the possible fraud, could then seek to expose the fraud if any exists. The alarm could also be used to notify a manager as well. Further, recording of the conversation could begin upon the alarm being activated.

In one embodiment of the present invention, at least one feature of the voice signals is extracted and used to determine the level of nervousness of the person. Features that may be extracted include a maximum value of a fundamental frequency, a standard deviation of the fundamental frequency, a range of the fundamental frequency, a mean of the fundamental frequency, a mean of a bandwidth of a first formant, a mean of a bandwidth of a second formant, a standard deviation of energy, a speaking rate, a slope of the fundamental frequency, a maximum value of the first formant, a maximum value of the energy, a range of the energy, a range of the second formant, and a range of the first formant. Thus, for example, a degree of wavering in the tone of the voice, as determined from readings of the fundamental frequency, can be used to help determine a level of nervousness. The greater the degree of wavering, the higher the level of nervousness. Pauses in the person's speech may also be taken into account.

The following section describes apparatuses that may be used to determine emotion, including nervousness, in voice signals.

Exemplary Apparatuses for Detecting Emotion in Voice Signals

This section describes several apparatuses for analyzing speech in accordance with the present invention.

One embodiment of the present invention includes an apparatus for analyzing a person's speech to determine their emotional state. The analyzer operates on the real time frequency or pitch components within the first formant band of human speech. In analyzing the speech, the apparatus analyses certain value occurrence patterns in terms of differential first formant pitch, rate of change of pitch, duration and time distribution patterns. These factors relate in a complex but very fundamental way to both transient and long term emotional states.

Human speech is initiated by two basic sound generating mechanisms. The vocal cords; thin stretched membranes under muscle control, oscillate when expelled air from the lungs passes through them. They produce a characteristic "buzz" sound at a fundamental frequency between 80 Hz and 240 Hz. This frequency is varied over a moderate range by both conscious and unconscious muscle contraction and relaxation. The wave form of the fundamental "buzz" contains many harmonies, some of which excite resonance is various fixed and variable cavities associated with the vocal tract. The second basic sound generated during speech is a pseudo-random noise having a fairly broad and uniform frequency distribution. It is caused by turbulence as expelled air moves through the vocal tract and is called a "hiss" sound. It is modulated, for the most part, by tongue movements and also excites the fixed and variable cavities. It is this complex mixture of "buzz" and "hiss" sounds, shaped and articulated by the resonant cavities, which produces speech.

In an energy distribution analysis of speech sounds, it will be found that the energy falls into distinct frequency bands called formants. There are three significant formants. The system described here utilizes the first formant band which extends from the fundamental "buzz" frequency to approximately 1000 Hz. This band has not only the highest energy content but reflects a high degree of frequency modulation as a function of various vocal tract and facial muscle tension variations.

In effect, by analyzing certain first formant frequency distribution patterns, a qualitative measure of speech related muscle tension variations and interactions is performed. Since these muscles are predominantly biased and articulated through secondary unconscious processes which are in turn influenced by emotional state, a relative measure of emotional activity can be determined independent of a person's awareness or lack of awareness of that state. Research also bears out a general supposition that since the mechanisms of speech are exceedingly complex and largely autonomous, very few people are able to consciously "project" a fictitious emotional state. In fact, an attempt to do so usually generates its own unique psychological stress "fingerprint" in the voice pattern.

Because of the characteristics of the first formant speech sounds, the present invention analyses an FM demodulated first formant speech signal and produces an output indicative of nulls thereof The frequency or number of nulls or "flat" spots in the FM demodulated signal, the length of the nulls and the ratio of the total time that nulls exist during a word period to the overall time of the word period are all indicative of the emotional state of the individual. By looking at the output of the device, the user can see or feel the occurrence of the nulls and thus can determine by observing the output the number or frequency of nulls, the length of the nulls and the ratio of the total time nulls exist during a word period to the length of the word period, the emotional state of the individual.

In the present invention, the first formant frequency band of a speech signal is FM demodulated and the FM demodulated signal is applied to a word detector circuit which detects the presence of an FM demodulated signal. The FM demodulated signal is also applied to a null detector means which detects the nulls in the FM demodulated signal and produces an output indicative thereof. An output circuit is coupled to the word detector and to the null detector. The output circuit is enabled by the word detector when the word detector detects the presence of an FM demodulated signal, and the output circuit produces an output indicative of the presence or non-presence of a null in the FM demodulated signal. The output of the output circuit is displayed in a manner in which it can be perceived by a user so that the user is provided with an indication of the existence of nulls in the FM demodulated signal. The user of the device thus monitors the nulls and can thereby determine the emotional state of the individual whose speech is being analyzed.

In another embodiment of the present invention, the voice vibrato is analyzed. The so-called voice vibrato has been established as a semi-voluntary response which might be of value in studying deception along with certain other reactions; such as respiration volume; inspiration-expiration ratios; metabolic rate; regularity and rate of respiration; association of words and ideas; facial expressions; motor reactions; and reactions to certain narcotics; however, no useable technique has been developed previously which permits a valid and reliable analysis of voice changes in the clinical determination of a subject's emotional state, opinions, or attempts to deceive.

Early experiments involving attempts to correlate voice quality changes with emotional stimuli have established that human speech is affected by strong emotion. Detectable changes in the voice occur much more rapidly, following stress stimulation, than do the classic indications of physiological manifestations resulting from the functioning of the autonomic nervous system.

Two types of voice change as a result of stress. The first of these is referred to as the gross change which usually occurs only as a result of a substantially stressful situation. This change manifests itself in audible perceptible changes in speaking rate, volume, voice tremor, change in spacing between syllables, and a change in the fundamental pitch or frequency of the voice. This gross change is subject to conscious control, at least in some subjects, when the stress level is below that of a total loss of control.

The second type of voice change is that of voice quality. This type of change is not discernible to the human ear, but is an apparently unconscious manifestation of the slight tensing of the vocal cords under even minor stress, resulting in a dampening of selected frequency variations. When graphically portrayed, the difference is readily discernible between unstressed or normal vocalization and vocalization under mild stress, attempts to deceive, or adverse attitudes. These patterns have held true over a wide range of human voices of both sexes, various ages, and under various situational conditions. This second type of change is not subject to conscious control.

There are two types of sound produced by the human vocal anatomy. The first type of sound is a product of the vibration of the vocal cords, which, in turn, is a product of partially closing the glottis and forcing air through the glottis by contraction of the lung cavity and the lungs. The frequencies of these vibrations can vary generally between 100 and 300 Hertz, depending upon the sex and age of the speaker and upon the intonations the speaker applies. This sound has a rapid decay time.

The second type of sound involves the formant frequencies. This constitutes sound which results from the resonance of the cavities in the head, including the throat, the mouth, the nose and the sinus cavities. This sound is created by excitation of the resonant cavities by a sound source of lower frequencies, in the case of the vocalized sound produced by the vocal cords, or by the partial restriction of the passage of air from the lungs, as in the case of unvoiced fricatives. Whichever the excitation source, the frequency of the formant is determined by the resonant frequency of the cavity involved. The formant frequencies appear generally about 800 Hertz and appear in distinct frequency bands which correspond to the resonant frequency of the individual cavities. The first, or lowest, formant is that created by the mouth and throat cavities and is notable for its frequency shift as the mouth changes its dimensions and volume in the formation of various sounds, particularly vowel sounds. The highest formant frequencies are more constant because of the more constant volume of the cavities. The formant wave forms are ringing signals, as opposed to the rapid decay signals of the vocal cords. When voiced sounds are uttered, the voice wave forms are imposed upon the formant wave forms as amplitude modulations.

It has been discovered that a third signal category exists in the human voice and that this third signal category is related to the second type of voice change discussed above. This is an infrasonic, or subsonic, frequency modulation which is present, in some degree, in both the vocal cord sounds and in the formant sounds. This signal is typically between 8 and 12 Hertz. Accordingly, it is not audible to the human ear. Because of the fact that this characteristic constitutes frequency modulation, as distinguished from amplitude modulation, it is not directly discernible on time-base/amplitude chart recordings. Because of the fact that this infrasonic signal is one of the more significant voice indicators of psychological stress, it will be dealt with in greater detail.

There are in existence several analogies which are used to provide schematic representations of the entire voice process. Both mechanical and electronic analogies are successfully employed, for example, in the design of computer voices. These analogies, however, consider the voiced sound source (vocal cords) and the walls of the cavities as hard and constant features. However, both the vocal cords and the walls of the major formant-producing cavities constitute, in reality, flexible tissue which is immediately responsive to the complex array of muscles which provide control of the tissue. Those muscles which control the vocal cords through the mechanical linkage of bone and cartilage allow both the purposeful and automatic production of voice sound and variation of voice pitch by an individual. Similarly, those muscles which control the tongue, lips and throat allow both the purposeful and the automatic control of the first formant frequencies. Other formants can be affected similarly to a more limited degree.

It is worthy of note that, during normal speech, these muscles are performing at a small percentage of their total work capability. For this reason, in spite of their being employed to change the position of the vocal cords and the positions of the lips, tongue, and inner throat walls, the muscles remain in, a relatively relaxed state. It has been determined that during this relatively relaxed state a natural muscular undulation occurs typically at the 8-12 Hertz 5 frequency previously mentioned. This undulation causes a slight variation in the tension of the vocal cords and causes shifts in the basic pitch frequency of the voice. Also, the undulation varies slightly the volume of the resonant cavity (particularly that associated with the first formant) and the elasticity of the cavity walls to cause shifts in the formant frequencies. These shifts about a central frequency constitute a frequency modulation of the central or carrier frequency.

It is important to note that neither of the shifts in the basic pitch frequency of the voice or in the formant frequencies is detectable directly by a listener, partly because the shifts are very small and partly because they exist primarily in the inaudible frequency range previously mentioned.

In order to observe this frequency modulation any one of several existing techniques for the demodulation of frequency modulation can be employed, bearing in mind, of course, that the modulation frequency is the nominal 8-12 Hertz and the carrier is one of the bands within the voice spectrum.

In order to more fully understand the above discussion, the concept of a "center of mass" of this wave form must be understood. It is possible to approximately determine the midpoint between the two extremes of any single excursion of the recording pen. If the midpoints between extremes of all excursions are marked and if those midpoints are then approximately joined by a continuous curve, it will be seen that a line approximating an average or "center of mass" of the entire wave form will result. Joining all such marks, with some smoothing, results in a smooth curved line. The line represents the infrasonic frequency modulation resulting from the undulations previously described.

As mentioned above, it has been determined that the array of muscles associated with the vocal cords and cavity walls is subject to mild muscular tension when slight to moderate psychological stress is created in the individual examination. This tension, indiscernible to the subject and similarly indiscernible by normal unaided observation techniques to the examiner, is sufficient to decrease or virtually eliminate the muscular undulations present in the unstressed subject, thereby removing the basis for the carrier frequency variations which produce the infrasonic frequency modulations.

While the use of the infrasonic wave form is unique to the technique of employing voice as the physiological medium for psychological stress evaluation, the voice does provide for additional instrumented indications of aurally indiscernible physiological changes as a result of psychological stress, which physiological changes are similarly detectable by techniques and devices in current use. Of the four most often used physiological changes previously mentioned (brain wave patterns, heart activity, skin conductivity and breathing activity) two of these, breathing activity and heart activity, directly and indirectly affect the amplitude and the detail of an oral utterance wave form and provide the basis for a more gross evaluation of psychological stress, particularly when the testing involves sequential vocal responses.

Figure 8:
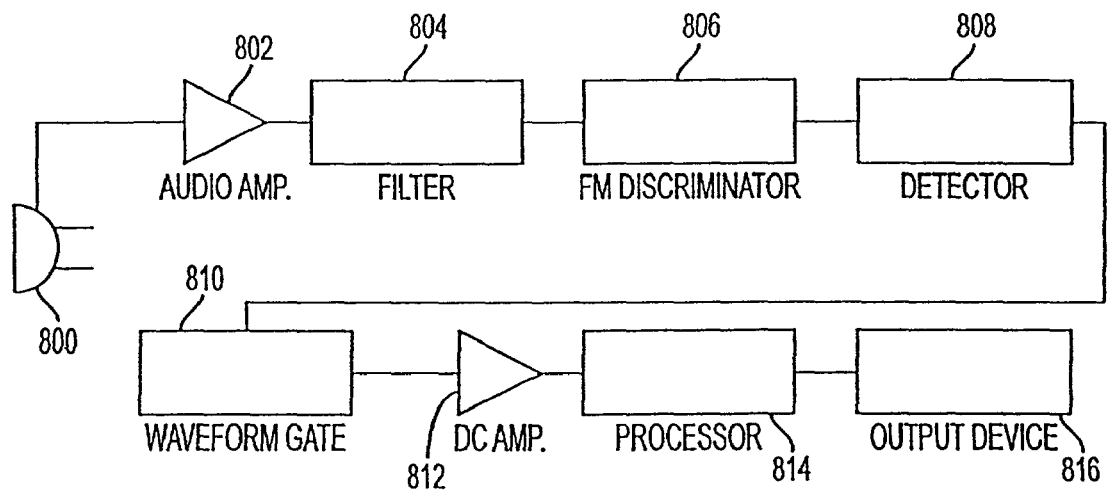
FIG. 8 is a flow diagram depicting an apparatus for detecting emotion from a voice sample in accordance with one embodiment of the present invention.

Another apparatus is shown in FIG. 8. As shown, a transducer 800 converts the sound waves of the oral utterances of the subject into electrical signals wherefrom they are connected to the input of an audio amplifier 802 which is simply for the purpose of increasing the power of electrical signals to a more stable, usable level. The output of amplifier 802 is connected to a filter 804 which is primarily for the purpose of eliminating some undesired low frequency components and noise components.

After filtering, the signal is connected to an FM discriminator 806 wherein the frequency deviations from the center frequency are converted into signals which vary in amplitude. The amplitude varying signals are then detected in a detector circuit 808 for the purpose of rectifying the signal and producing a signal which constitutes a series of half wave pulses. After detection, the signal is connected to an integrator circuit 810 wherein the signal is integrated to the desired degree. In circuit 810, the signal is either integrated to a very small extent, producing a wave form, or is integrated to a greater degree, producing a signal. After integration, the signal is amplified in an amplifier 812 and connected to a processor 814 which determines the emotion associated with the voice signal. An output device 816 such as a computer screen or printer is used to output the detected emotion. Optionally, statistical data may be output as well.

Figure 9:
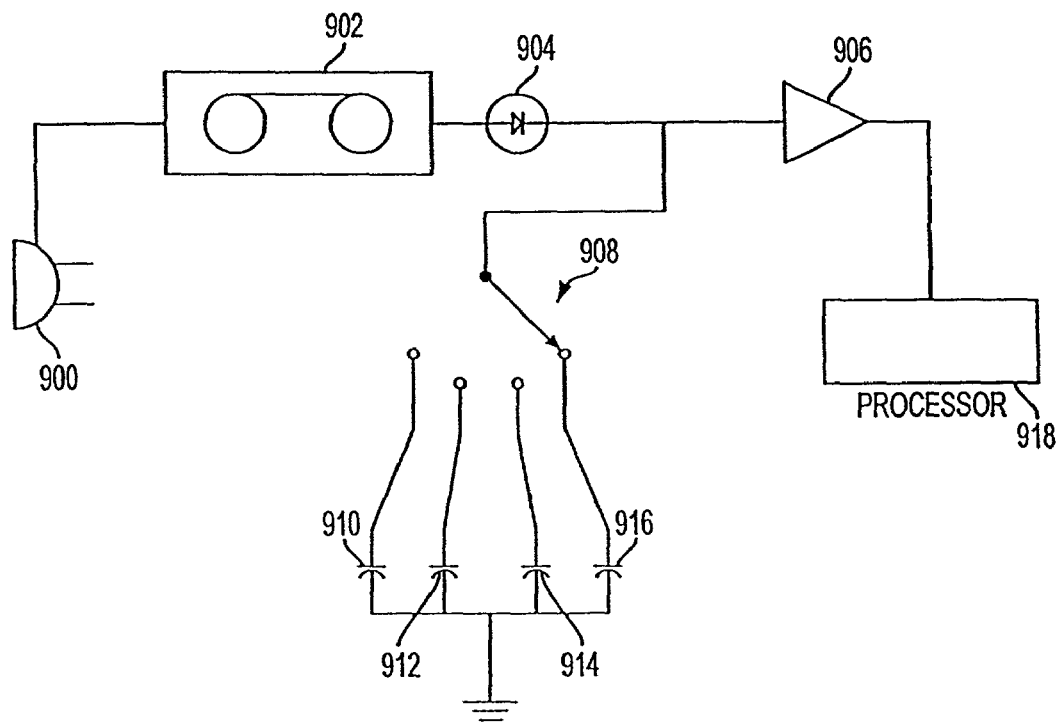
FIG. 9 is a flow diagram illustrating an apparatus for producing visible records from sound in accordance with one embodiment of the invention.

A somewhat simpler embodiment of an apparatus for producing visible records in accordance with the invention is shown in FIG. 9 wherein the acoustic signals are transduced by a microphone 900 into electrical signals which are magnetically recorded in a tape recording device 902. The signals can then be processed through the remaining equipment at various speeds and at any time, the play-back being connected to a conventional semiconductor diode 904 which rectifies the signals. The rectified signals are connected to the input of a conventional amplifier 906 and also to the movable contact of a selector switch indicated generally at 908. The movable contact of switch 908 can be moved to any one of a plurality of fixed contacts, each of which is connected to a capacitor. In FIG. 9 is shown a selection of four capacitors 910, 912, 914 and 916, each having one terminal connected to a fixed contact of the switch and the other terminal connected to ground. The output of amplifier 906 is connected to a processor 918.

A tape recorder that may be used in this particular assembly of equipment was a Uher model 4000 four-speed tape unit having its own internal amplifier. The values of capacitors 910-916 were 0.5, 3, 10 and 50 microfarads, respectively, and the input impedance of amplifier 906 was approximately 10,000 ohms. As will be recognized, various other components could be, or could have been, used in this apparatus.

In the operation of the circuit of FIG. 9, the rectified wave form emerging through diode 904 is integrated to the desired degree, the time constant being selected so that the effect of the frequency modulated infrasonic wave appears as a slowly varying DC level which approximately follows the line representing the "center of mass" of the waveform. The excursions shown in that particular diagram are relatively rapid, indicating that the switch was connected to one of the lower value capacitors. In this embodiment composite filtering is accomplished by the capacitor 910, 912, 914 or 916, and, in the case of the playback speed reduction, the tape recorder.

Telephonic Operation with Operator Feedback

Figure 10:
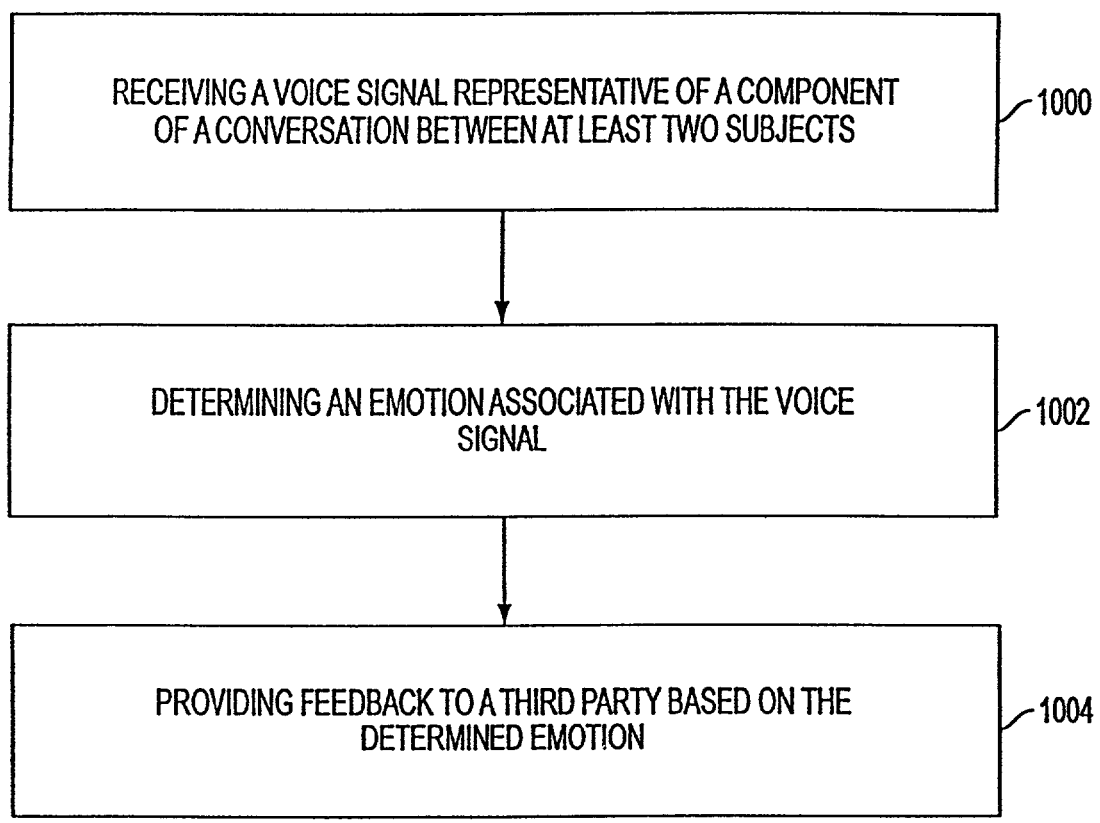
FIG. 10 is a flow diagram that illustrates one embodiment of the present invention that monitors emotions in voice signals and provides feedback based on the detected emotions.

FIG. 10 illustrates one embodiment of the present invention that monitors emotions in voice signals and provides operator feedback based on the detected emotions. First, a voice signal representative of a component of a conversation between at least two subjects is received in operation 1000. In operation 1002, an emotion associated with the voice signal is determined. Finally, in operation 1004, feedback is provided to a third party based on the determined emotion.

The conversation may be carried out over a telecommunications network, as well as a wide area network such as the internet when used with internet telephony. As an option, the emotions are screened and feedback is provided only if the emotion is determined to be a negative emotion selected from the group of negative emotions consisting of anger, sadness, and fear. The same could be done with positive or neutral emotion groups. The emotion may be determined by extracting a feature from the voice signal, as previously described in detail.

The present invention is particularly suited to operation in conjunction with an emergency response system, such as the 911 system. In such system, incoming calls could be monitored by the present invention. An emotion of the caller would be determined during the caller's conversation with the technician who answered the call. The emotion could then be sent via radio waves, for example, to the emergency response team, i.e., police, fire, and/or ambulance personnel, so that they are aware of the emotional state of the caller.

In another scenario, one of the subjects is a customer, another of the subjects is an employee such as one employed by a call center or customer service department, and the third party is a manager. The present invention would monitor the conversation between the customer and the employee to determine whether the customer and/or the employee are becoming upset, for example. When negative emotions are detected, feedback is sent to the manager, who can assess the situation and intervene if necessary.

Improving Emotion Recognition

Figure 11:
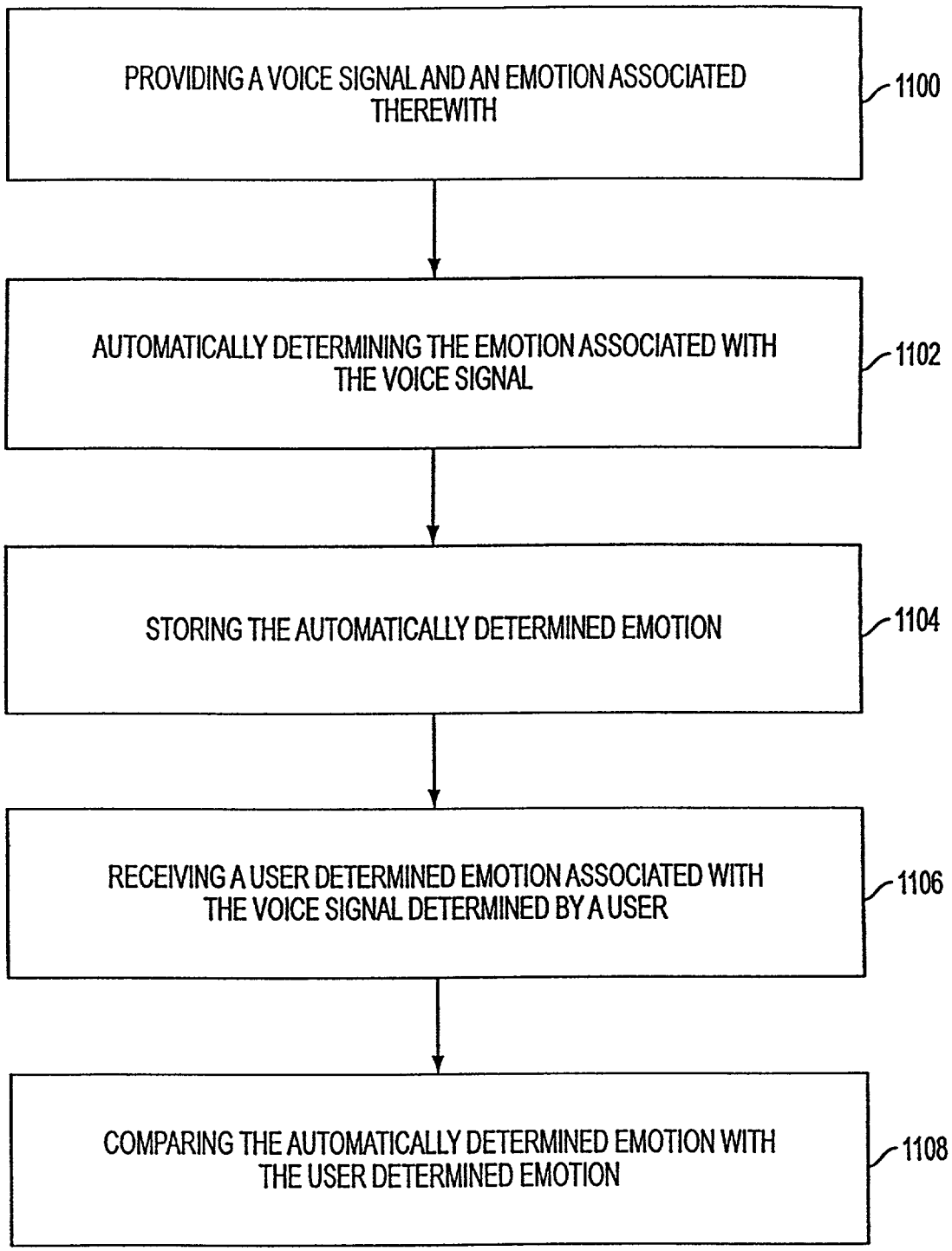
FIG. 11 is a flow chart illustrating an embodiment of the present invention that compares user vs. computer emotion detection of voice signals to improve emotion recognition of either the invention, a user, or both.

FIG. 11 illustrates an embodiment of the present invention that compares user vs. computer emotion detection of voice signals to improve emotion recognition of either the invention, a user, or both. First, in operation 1100, a voice signal and an emotion associated with the voice signal are provided. The emotion associated with the voice signal is automatically determined in operation 1102 in a manner set forth above. The automatically determined emotion is stored in operation 1104, such as on a computer readable medium. In operation 1106, a user-determined emotion associated with the voice signal determined by a user is received. The automatically determined emotion is compared with the user determined emotion in operation 1108.

The voice signal may be emitted from or received by the present invention. Optionally, the emotion associated with the voice signal is identified upon the emotion being provided. In such case, it should be determined whether the automatically determined emotion or the user-determined emotion matches the identified emotion. The user may be awarded a prize upon the user-determined emotion matching the identified emotion. Further, the emotion may be automatically determined by extracting at least one feature from the voice signals, such as in a manner discussed above.

To assist a user in recognizing emotion, an emotion recognition game can be played in accordance with one embodiment of the present invention. The game could allow a user to compete against the computer or another person to see who can best recognize emotion in recorded speech. One practical application of the game is to help autistic people in developing better emotional skills at recognizing emotion in speech.

In accordance with one embodiment of the present invention, an apparatus may be used to create data about voice signals that can be used to improve emotion recognition. In such an embodiment, the apparatus accepts vocal sound through a transducer such as a microphone or sound recorder. The physical sound wave, having been transduced into electrical signals are applied in parallel to a typical, commercially available bank of electronic filters covering the audio frequency range. Setting the center frequency of the lowest filter to any value that passes the electrical energy representation of the vocal signal amplitude that includes the lowest vocal frequency signal establishes the center values of all subsequent filters up to the last one passing the energy-generally between 8 kHz to 16 kHz or between 10 kHz and 20 kHz, and also determine the exact number of such filters. The specific value of the first filter's center frequency is not significant, so long as the lowest tones of the human voice is captured, approximately 70 Hz. Essentially any commercially available bank is applicable if it can be interfaced to any commercially available digitizer and then microcomputer. The specification section describes a specific set of center frequencies and microprocessor in the preferred embodiment. The filter quality is also not particularly significant because a refinement algorithm disclosed in the specification brings any average quality set of filters into acceptable frequency and amplitude values. The ratio 1/3, of course, defines the band width of all the filters once the center frequencies are calculated.

Following this segmentation process with filters, the filter output voltages are digitized by a commercially available set of digitizers or preferably multiplexer and digitizer, on in the case of the disclosed preferred embodiment, a digitizer built into the same identified commercially available filter bank, to eliminate interfacing logic and hardware. Again quality of digitizer in terms of speed of conversion or discrimination is not significant because average presently available commercial units exceed the requirements needed here, due to a correcting algorithm (see specifications) and the low sample rate necessary.

Any complex sound that is carrying constantly changing information can be approximated with a reduction of bits of information by capturing the frequency and amplitude of peaks of the signal. This, of course, is old knowledge, as is performing such an operation on speech signals. However, in speech research, several specific regions where such peaks often occur have been labeled "formant" regions. However, these region approximations do not always coincide with each speaker's peaks under all circumstances. Speech researchers and the prior inventive art, tend to go to great effort to measure and name "legitimate" peaks as those that fall within the typical formant frequency regions, as if their definition did not involve estimates, but rather absoluteness. This has caused numerous research and formant measuring devices to artificially exclude pertinent peaks needed to adequately represent a complex, highly variable sound wave in real time. Since the present disclosure is designed to be suitable for animal vocal sounds as well as all human languages, artificial restrictions such as formants, are not of interest and the sound wave is treated as a complex, varying sound wave which can analyze any such sound.

In order to normalize and simplify peak identification, regardless of variation in filter band width, quality and digitizer discrimination, the actual values stored for amplitude and frequency are "representative values". This is so that the broadness of upper frequency filters is numerically similar to lower frequency filter band width. Each filter is simply given consecutive values from 1 to 25, and a soft to loud sound is scaled from 1 to 40, for ease of CRT screen display. A correction on the frequency representation values is accomplished by adjusting the number of the filter to a higher decimal value toward the next integer value, if the filter output to the right of the peak filter has a greater amplitude than the filter output on the left of the peak filter. The details of a preferred embodiment of this algorithm is described in the specifications of this disclosure. This correction process must occur prior to the compression process, while all filter amplitude values are available.

Rather than slowing down the sampling rate, the preferred embodiment stores all filter amplitude values for 10 to 15 samples per second for an approximate 10 to 15 second speech sample before this correction and compression process. If computer memory space is more critical than sweep speed, the corrections and compression should occur between each sweep eliminating the need for a large data storage memory. Since most common commercially available, averaged price mini-computers have sufficient memory, the preferred and herein disclosed embodiment saves all data and afterwards processes the data.

Most vocal animal signals of interest including human contain one largest amplitude peak not likely on either end of the frequency domain. This peak can be determined by any simple and common numerical sorting algorithm as is done in this invention. The amplitude and frequency representative values are then placed in the number three of six memory location sets for holding the amplitudes and frequencies of six peaks.

The highest frequency peak above 8 k Hz is placed in memory location number six and labeled high frequency peak. The lowest peak is placed in the first set of memory locations. The other three are chosen from peaks between these. Following this compression function, the vocal signal is represented by an amplitude and frequency representative value from each of six peaks, plus a total energy amplitude from the total signal unfiltered for, say, ten times per second, for a ten second sample. This provides a total of 1300 values.

The algorithms allow for variations in sample length in case the operator overrides the sample length switch with the override off-switch to prevent continuation during an unexpected noise interruption. The algorithms do this by using averages not significantly sensitive to changes in sample number beyond four or five seconds of sound signal. The reason for a larger speech sample, if possible, is to capture the speaker's average "style" of speech, typically evident within 10 to 15 seconds.

The output of this compression function is fed to the element assembly and storage algorithm which assembles (a) four voice quality values to be described below; (b) a sound "pause" or on-to-off ratio; (c) "variability"—the difference between each peak's amplitude for the present sweep and that of the last sweep; differences between each peak's frequency number for the present sweep and that of the last sweep; and difference between the total unfiltered energy of the present sweep and that of the last sweep; (d) a "syllable change approximation" by obtaining the ratio of times that the second peak changes greater than 0.4 between sweeps to the total number of sweeps with sound; and (e) "high frequency analysis"—the ratio of the number of sound-on sweeps that contain a non-zero value in this peak for the number six peak amplitude. This is a total of 20 elements available per sweep. These are then passed to the dimension assembly algorithm.

The four voice quality values used as elements are (1) The "spread"—the sample mean of all the sweeps' differences between their average of the frequency representative values above the maximum amplitude peak and the average of those below, (2) The "balance"—the sample means of all the sweeps' average amplitude values of peaks 4, 5 & 6 divided by the average of peaks 1 & 2. (3) "envelope flatness high"—the sample mean of all the sweeps' averages of their amplitudes above the largest peak divided by the largest peak, (4) "envelope flatness low"—the sample mean of all the sweeps' averages of their amplitudes below the largest peak divided by the largest peak.

The voice-style dimensions are labeled "resonance" and "quality", and are assembled by an algorithm involving a coefficient matrix operating on selected elements.

The "speech-style" dimensions are labeled "variability-monotone", "choppy-smooth", "staccato-sustain", "attack-soft", "affectivity-control". These five dimensions, with names pertaining to each end of each dimension, are measured and assembled by an algorithm involving a coefficient matrix operating on 15 of the 20 sound elements, detailed in Table 6 and the specification section.

The perceptual-style dimensions are labeled "eco-structure", "invariant sensitivity", "other-self", "sensory-internal", "hate-love", independence-dependency" and "emotional-physical". These seven perceptual dimensions with names relating to the end areas of the dimensions, are measured and assembled by an algorithm involving a coefficient matrix and operating on selected sound elements of voice and speech (detailed in Table 7) and the specification section.

A commercially available, typical computer keyboard or keypad allows the user of the present disclosure to alter any and all coefficients for redefinition of any assembled speech, voice or perceptual dimension for research purposes. Selection switches allow any or all element or dimension values to be displayed for a given subject's vocal sample. The digital processor controls the analog-to-digital conversion of the sound signal and also controls the reassembly of the vocal sound elements into numerical values of the voice and speech, perceptual dimensions.

The microcomputer also coordinates the keypad inputs of the operator and the selected output display of values, and coefficient matrix choice to interact with the algorithms assembling the voice, speech and perceptual dimensions. The output selection switch simply directs the output to any or all output jacks suitable for feeding the signal to typical commercially available monitors, modems, printers or by default to a light-emitting, on-board readout array.

By evolving group profile standards using this invention, a researcher can list findings in publications by occupations, dysfunctions, tasks, hobby interests, cultures, languages, sex, age, animal species, etc. Or, the user may compare his/her values to those published by others or to those built into the machine.

Figure 12:
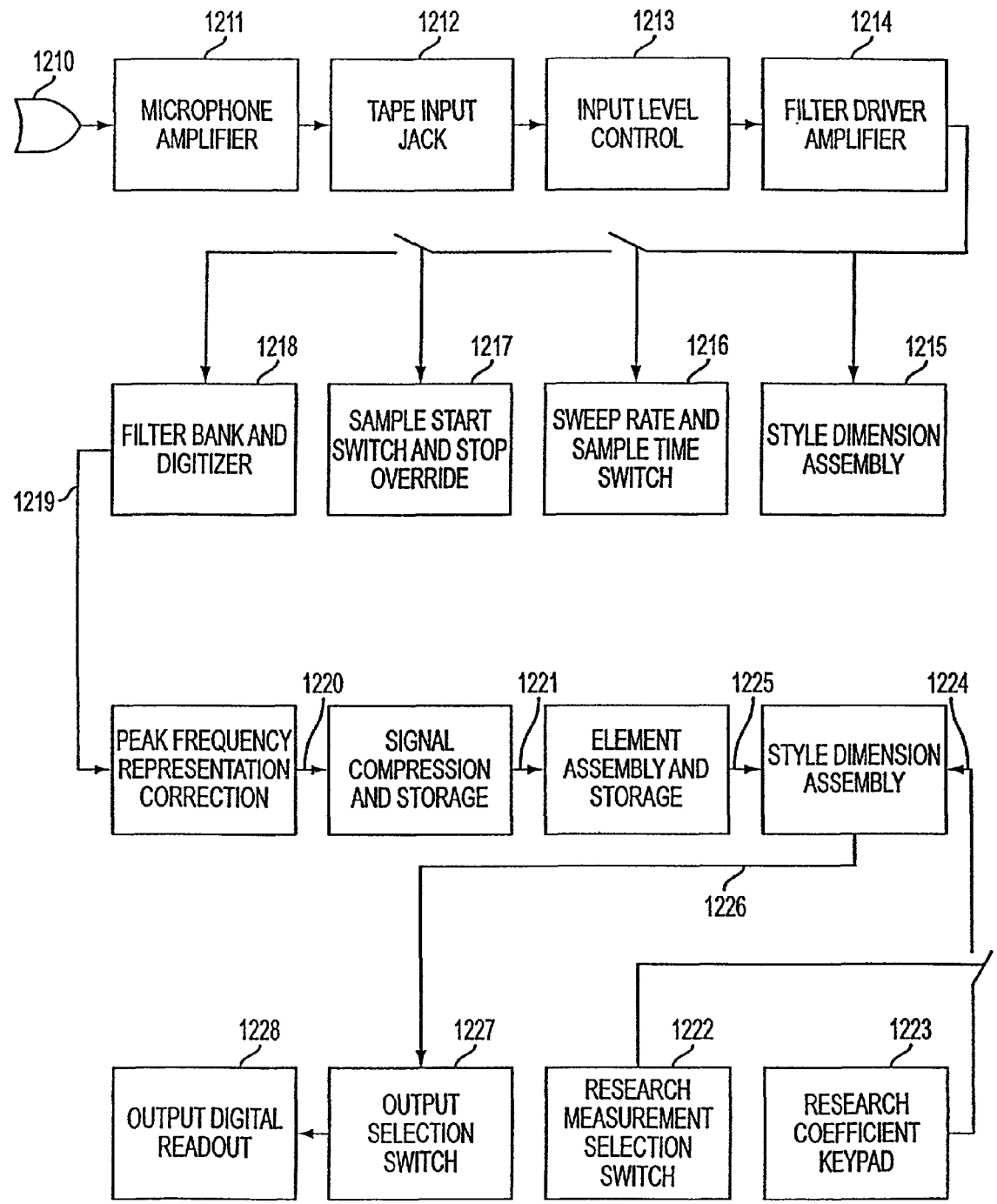
FIG. 12 is a schematic diagram in block form of a speech recognition apparatus in accordance with one embodiment of the invention.

Referring now to FIG. 12 of the drawings, a vocal utterance is introduced into the vocal sound analyzer through a microphone 1210, and through a microphone amplifier 1211 for signal amplification, or from taped input through tape input jack 1212 for use of a pre-recorded vocal utterance input. An input level control 1213 adjusts the vocal signal level to the filter driver amplifier 1214. The filter driver amplifier 1214 amplifies the signal and applies the signal to V.U. meter 1215 for measuring the correct operating signal level.

The sweep rate per second and the number of sweeps per sample is controlled by the operator with the sweep rate and sample time switch 1216. The operator starts sampling with the sample start switch and stop override 1217. The override feature allows the operator to manually override the set sampling time, and stop sampling, to prevent contaminating a sample with unexpected sound interference, including simultaneous speakers. This switch also, connects and disconnects the microprocessor's power supply to standard 110 volt electrical input prongs.

The output of the filter driver amplifier 1214 is also applied to a commercially available microprocessor-controlled filter bank and digitizer 1218, which segments the electrical signal into 1/3 octave regions over the audio frequency range for the organism being sampled and digitizes the voltage output of each filter. In a specific working embodiment of the invention, 25 1/3 octave filters of an Eventide spectrum analyzer with filter center frequencies ranging from 63 HZ to 16,000 HZ. Also utilized was an AKAI microphone and tape recorder with built in amplifier as the input into the filter bank and digitizer 1218. The number of sweeps per second that the filter bank utilizes is approximately ten sweeps per second. Other microprocessor-controlled filter banks and digitizers may operate at different speeds.

Any one of several commercially available microprocessors is suitable to control the aforementioned filter bank and digitizer.

As with any complex sound, amplitude across the audio frequency range for a "time slice" 0.1 of a second will not be constant or flat, rather there will be peaks and valleys. The frequency representative values of the peaks of this signal, 1219, are made more accurate by noting the amplitude values on each side of the peaks and adjusting the peak values toward the adjacent filter value having the greater amplitude. This is done because, as is characteristic of adjacent 1/3 octave filters, energy at a given frequency spills over into adjacent filters to some extent, depending on the cut-off qualities of the filters. In order to minimize this effect, the frequency of a peak filter is assumed to be the center frequency only if the two adjacent filters have amplitudes within 10% of their average. To guarantee discreet, equally spaced, small values for linearizing and normalizing the values representing the unequal frequency intervals, each of the 25 filters are given number values 1 through 25 and these numbers are used throughout the remainder of the processing. This way the 3,500 HZ difference between filters 24 and 25 becomes a value of 1, which in turn is also equal to the 17 HZ difference between the first and second filter.

To prevent more than five sub-divisions of each filter number and to continue to maintain equal valued steps between each sub-division of the 1 to 25 filter numbers, they are divided into 0.2 steps and are further assigned as follows. If the amplitude difference of the two adjacent filters to a peak filter is greater than 30% of their average, then the peak filter's number is assumed to be nearer to the half-way point to the next filter number than it is of the peak filter. This would cause the filter number of a peak filter, say filter number 6.0, to be increased to 6.4 or decreased to 5.6, if the bigger adjacent filter represents a higher, or lower frequency, respectively. All other filter values, of peak filters, are automatically given the value of its filter number +0.2 and −0.2 if the greater of the adjacent filter amplitudes represents a higher or lower frequency respectively.

The segmented and digitally represented vocal utterance signal 1219, after the aforementioned frequency correction 1220, is compressed to save memory storage by discarding all but six amplitude peaks. The inventor found that six peaks were sufficient to capture the style characteristics, so long as the following characteristics are observed. At least one peak is near the fundamental frequency; exactly one peak is allowed between the region of the fundamental frequency and the peak amplitude frequency, where the nearest one to the maximum peak is preserved; and the first two peaks above the maximum peak is saved plus the peak nearest the 16,000 HZ end or the 25th filter if above 8 kHz, for a total of six peaks saved and stored in microprocessor memory. This will guarantee that the maximum peak always is the third peak stored in memory and that the sixth peak stored can be used for high frequency analysis, and that the first one is the lowest and nearest to the fundamental.

Following the compression of the signal to include one full band amplitude value, the filter number and amplitude value of six peaks, and each of these thirteen values for 10 samples for a 10 second sample, (1300 values), 1221 of FIG. 12, sound element assembly begins.

To arrive at voice style "quality" elements, this invention utilizes relationships between the lower set and higher set of frequencies in the vocal utterance. The speech style elements, on the other hand, is determined by a combination of measurements relating to the pattern of vocal energy occurrences such as pauses and decay rates. These voice style "quality" elements emerge from spectrum analysis FIG. 13, 1330, 1331, and 1332. The speech style elements emerge from the other four analysis functions as shown in FIG. 13, 1333, 1334, 1335, and 1336 and Table 6.

The voice style quality analysis elements stored are named and derived as: (1) the spectrum "spread"—the sample mean of the distance in filter numbers between the average of the peak filter numbers above, and the average of the peak filter numbers below the maximum peak, for each sweep, FIG. 13, 1330; (2) the spectrum's energy "balance"—the mean for a sample of all the sweep's ratios of the sum of the amplitudes of those peaks above to the sum of the amplitudes below the maximum peak, 1331; (3) the spectrum envelope "flatness"—the arithmetic means for each of two sets of ratios for each sample—the ratios of the average amplitude of those peaks above (high) to the maximum peak, and of those below (low) the maximum peak to the maximum peak, for each sweep, 1332.

The speech style elements, that are stored, are named and derived respectively: (1) spectrum variability—the six means, of an utterance sample, of the numerical differences between each peak's filter number, on one sweep, to each corresponding peak's filter number on the next sweep, and also the six amplitude value differences for these six peaks and also including the full spectrum amplitude differences for each sweep, producing a sample total of 13 means, 1333; (2) utterance pause ratio analysis—the ratio of the number of sweeps in the sample that the full energy amplitude values were pauses (below two units of amplitude value) to the number that had sound energy (greater than one unit of value), 1334; (3) syllable change approximation—the ratio of the number of sweeps that the third peak changed number value greater than 0.4 to the number of sweeps having sound during the sample, 1335; (4) and, high frequency analysis—the ratio of the number of sweeps for the sample that the sixth peak had an amplitude value to the total number of sweeps, 1336.

Sound styles are divided into the seven dimensions in the method and apparatus of this invention, depicted in Table 6. These were determined to be the most sensitive to an associated set of seven perceptual or cognition style dimensions listed in Table 7.

Figure 13:
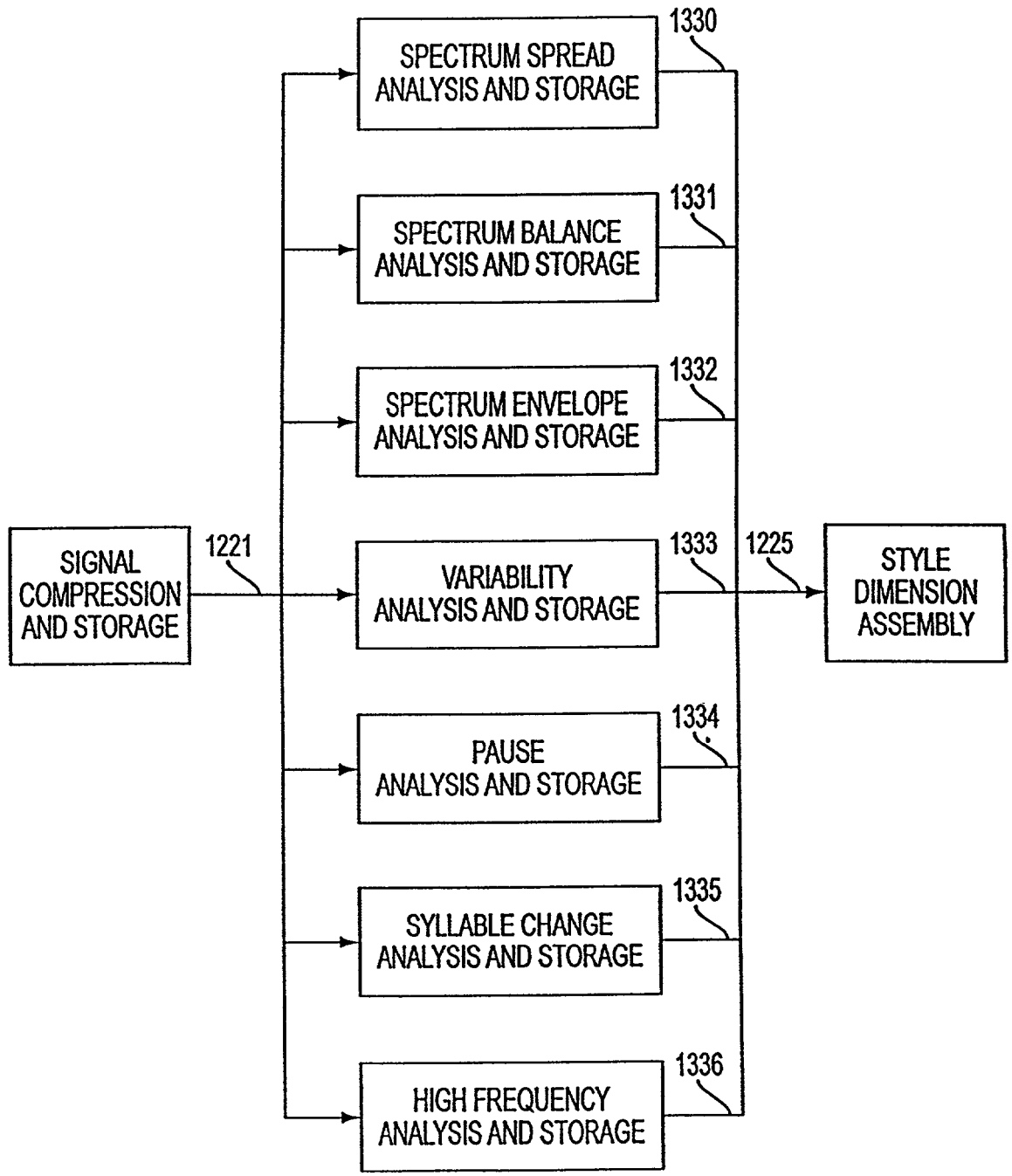
FIG. 13 is a schematic diagram in block form of the element assembly and storage block in FIG. 12.

The procedure for relating the sound style elements to voice, speech, and perceptual dimensions for output, FIG. 12, 1228, is through equations that determine each dimension as a function of selected sound style elements, FIG. 13, 1330, through 1336. Table 6 relates the speech style elements, 1333 through 1336 of FIG. 13, to the speech style dimensions.

Table 7 depicts the relationship between seven perceptual style dimensions and the sound style elements, 1330 through 1336. Again, the purpose of having an optional input coefficient array containing zeros is to allow the apparatus operator to switch or key in changes in these coefficients for research purposes, 1222, 1223. The astute operator can develop different perceptual dimensions or even personality or cognitive dimensions, or factors, (if he prefers this terminology) which require different coefficients altogether. This is done by keying in the desired set of coefficients and noting which dimension (1226) that he is relating these to. For instance, the other-self dimension of Table 7 may not be a wanted dimension by a researcher who would like to replace it with a user perceptual dimension that he names introvert-extrovert. By replacing the coefficient set for the other-self set, by trial sets, until an acceptably high correlation exists between the elected combination of weighted sound style elements and his externally determined introvert-extrovert dimension, the researcher can thusly use that slot for the new introvert-extrovert dimension, effectively renaming it. This can be done to the extent that the set of sound elements of this invention are sensitive to a user dimension of introvert-extrovert, and the researcher's coefficient set reflects the appropriate relationship. This will be possible with a great many user determined dimensions to a useful degree, thereby enabling this invention to function productively in a research environment where new perceptual dimensions, related to sound style elements, are being explored, developed, or validated.

TABLE 6

Speech Style Dimensions'
(DS#1) Coefficients
Elements
(Differences)

| ESi(2) | Csi1 | CSi2 | CSi3 | CSi4 | CSi5 |
|---|---|---|---|---|---|
| No.-1 | 0 | 0 | 0 | 0 | 0 |
| Amp-1 | 0 | 0 | 0 | 0 | 0 |
| No.-2 | 1 | 0 | 0 | 0 | 1 |
| Amp-2 | 1 | 0 | 0 | 1 | 0 |
| No.-3 | 0 | 0 | 0 | 0 | 0 |
| Amp-3 | 0 | 0 | 0 | 0 | 0 |
| No.-4 | 0 | 0 | 0 | 0 | 0 |
| Amp-4 | 0 | 0 | 0 | 0 | 0 |
| No.-5 | 0 | 0 | 0 | 0 | 1 |
| Amp-5 | 0 | 0 | 1 | 0 | 0 |
| No.-6 | 0 | 0 | 0 | 0 | 0 |
| Amp-6 | 0 | 0 | 0 | 0 | 0 |
| Amp-7 | 0 | 1 | 1 | 0 | −1 |
| Pause | 0 | 1 | 1 | 0 | 0 |
| Peak 6 | 0 | 0 | −1 | −1 | 1 |

STRI##
DS1 = Variability Monotone
DS2 = ChoppySmooth
DS3 = StaccatoSustain
DS4 = AttackSoft
DS5 = AffectivityControl.
(2)No. 1 through 6 = Peak Filter Differences 1–6, and Amp 1 through 6 = Peak Amplitude Differences 1–6.
Amp7 = Full Band Pass amplitude Differences.

TABLE 7

Perceptual Style
Dimension's (DPJ)(1) Coefficients
Elements Differences

| EN | CPi1 | CPi2 | CPi3 | CPi4 | CPi5 | CPi6 | CPi7 |
|---|---|---|---|---|---|---|---|
| Spread | 0 | 0 | 0 | 0 | 0 | 0 | 0 |
| Balance | 1 | 1 | 0 | 0 | 0 | 0 | 0 |
| Env-H | 0 | 1 | 0 | 0 | 0 | 0 | 0 |
| Env-L | 1 | 0 | 0 | 0 | 0 | 0 | 0 |
| No.-1 | 0 | 0 | 0 | 0 | 0 | 0 | 0 |
| Amp-1 | 0 | 0 | 0 | 0 | 0 | 0 | 0 |
| No.-2 | 0 | 0 | 1 | 0 | 0 | 0 | 1 |
| Amp-2 | 0 | 0 | 1 | 0 | 0 | 1 | 0 |
| No.-3 | 0 | 0 | 0 | 0 | 0 | 0 | 0 |
| Amp-3 | 0 | 0 | 0 | 0 | 0 | 0 | 0 |
| No.-4 | 0 | 0 | 0 | 0 | 0 | 0 | 0 |
| Amp-4 | 0 | 0 | 0 | 0 | 0 | 0 | 0 |
| No.-5 | 0 | 0 | 0 | 0 | 0 | 0 | 1 |
| Amp-5 | 0 | 0 | 0 | 0 | −1 | 0 | 0 |
| No.-6 | 0 | 0 | 0 | 0 | 0 | 0 | 0 |
| Amp-6 | 0 | 0 | 0 | 0 | 0 | 0 | 0 |
| Amp-7 | 0 | 0 | 0 | 1 | 1 | 0 | −1 |
| Pause | 0 | 0 | 0 | 1 | 1 | 0 | 0 |
| Peak 6 | 0 | 0 | 0 | 0 | −1 | −1 | 1 |

STR2##
DP1 = EcoStructure High-Low;
DP2 = Invariant Sensitivity High-Low;
DP3 = Other-Self;
DP4 = Sensory-Internal;
DP5 = Hate-Love;
DP6 Dependency-Independency;
DP7 = Emotional-Physical.
(2)No. 1 through 6 = Peak Filter Differences 1–6; Amp I Through 6 = Peak The primary results available to the user of this invention are the dimension values, 1226, available selectively by a switch, 1227, to be displayed on a standard light display, and also selectively for monitor, printer, modem, or other standard output devices, 1228. These can be used to determine how close the subject's voice is on any or all of the sound or perceptual dimensions from the built-in or published or personally developed controls or standards, which can then be used to assist in improving emotion recognition.

In another exemplary embodiment of the present invention, bio-signals received from a user are used to help determine emotions in the user's speech. The recognition rate of a speech recognition system is improved by compensating for changes in the user's speech that result from factors such as emotion, anxiety or fatigue. A speech signal derived from a user's utterance is modified by a preprocessor and provided to a speech recognition system to improve the recognition rate. The speech signal is modified based on a bio-signal which is indicative of the user's emotional state.

Figure 14:
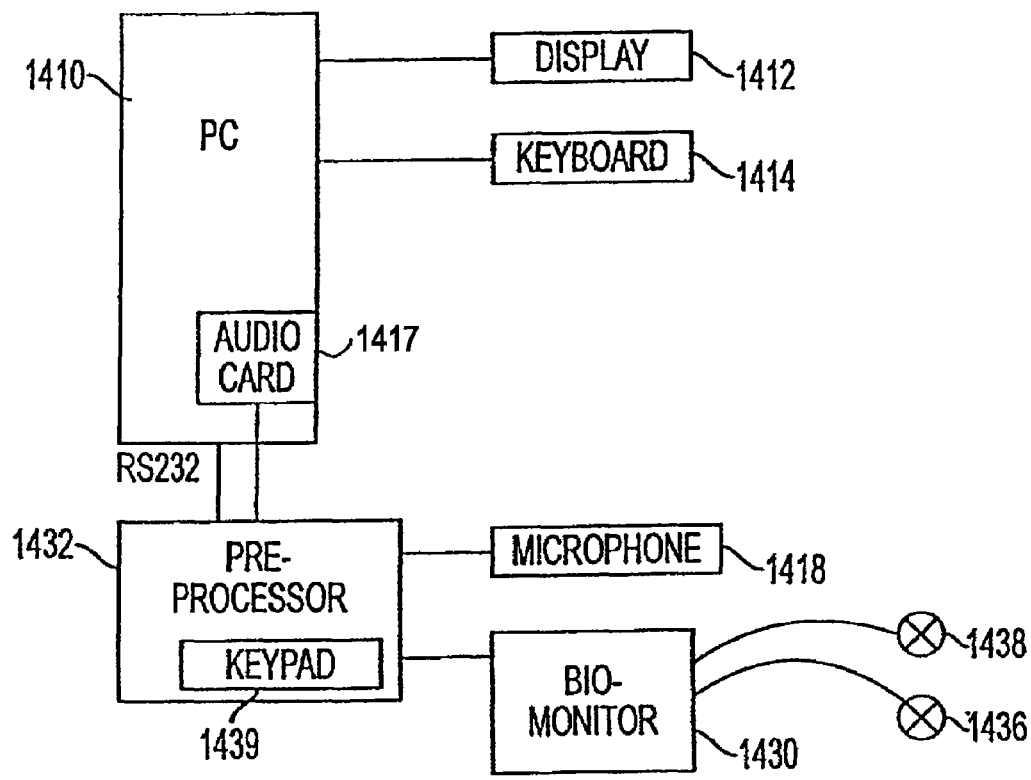
FIG. 14 illustrates a speech recognition system with a bio-monitor and a preprocessor in accordance with one embodiment of the present invention.

In more detail, FIG. 14 illustrates a speech recognition system where speech signals from microphone 1418 and bio-signals from bio-monitor 1430 are received by preprocessor 1432. The signal from bio-monitor 1430 to preprocessor 1432 is a bio-signal that is indicative of the impedance between two points on the surface of a user's skin. Bio-monitor 1430 measures the impedance using contact 1436 which is attached to one of the user's fingers and contact 1438 which is attached to another of the user's fingers. A bio-monitor such as a bio-feedback monitor sold by Radio Shack, which is a division of Tandy Corporation, under the trade name (MICRONATA® BIOFEEDBACK MONITOR) model number 63-664 may be used. It is also possible to attach the contacts to other positions on the user's skin. When user becomes excited or anxious, the impedance between points 1436 and 1438 decreases and the decrease is detected by monitor 1430 which produces a bio-signal indicative of a decreased impedance. Preprocessor 1432 uses the bio-signal from bio-monitor 1430 to modify the speech signal received from microphone 1418, the speech signal is modified to compensate for the changes in user's speech due to changes resulting from factors such as fatigue or a change in emotional state. For example, preprocessor 1432 may lower the pitch of the speech signal from microphone 1418 when the bio-signal from bio-monitor 1430 indicates that user is in an excited state, and preprocessor 1432 may increase the pitch of the speech signal from microphone 1418 when the bio-signal from bio-monitor 1430 indicates that the user is in a less excited state such as when fatigued. Preprocessor 1432 then provides the modified speech signal to audio card 1417 in a conventional fashion. For purposes such as initialization or calibration, preprocessor 1432 may communicate with PC 1410 using an interface such as an RS232 interface. A user may communicate with preprocessor 1432 by observing display 1412 and by entering commands using keyboard 1414 or keypad 1439 or a mouse.

It is also possible to use the bio-signal to preprocess the speech signal by controlling the gain and/or frequency response of microphone 1418. The microphone's gain or amplification may be increased or decreased in response to the bio-signal. The bio-signal may also be used to change the frequency response of the microphone. For example, if microphone 1418 is a model ATM71 available from AUDIO-TECHNICA U.S., Inc., the bio-signal may be used to switch between a relatively flat response and a rolled-off response, where the rolled-off response provided less gain to low frequency speech signals.

Figure 15:
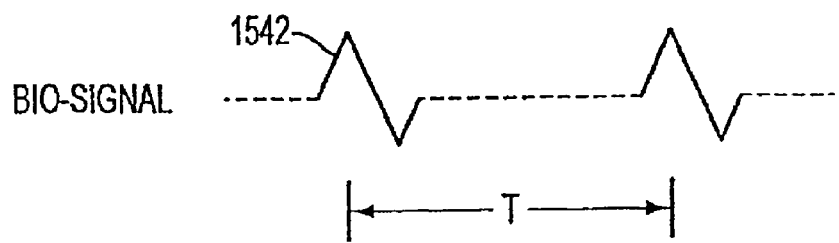
FIG. 15 illustrates a bio-signal produced by the bio-monitor of FIG. 14.

When bio-monitor 1430 is the above-referenced monitor available from Radio Shack, the bio-signal is in the form of a series of ramp-like signals, where each ramp is approximately 0.2 in sec. in duration. FIG. 15 illustrates the bio-signal, where a series of ramp-like signals 1542 are separated by a time T. The amount of time T between ramps 1542 relates to the impedance between points 1438 and 1436. When the user is in a more excited state, the impedance between points 1438 and 1436 is decreased and time T is decreased. When the user is in a less excited state, the impedance between points 1438 and 1436 is increased and the time T is increased.

The form of a bio-signal from a bio-monitor can be in forms other than a series of ramp-like signals. For example, the bio-signal can be an analog signal that varies in periodicity, amplitude and/or frequency based on measurements made by the bio-monitor, or it can be a digital value based on conditions measured by the bio-monitor.

Figure 16:
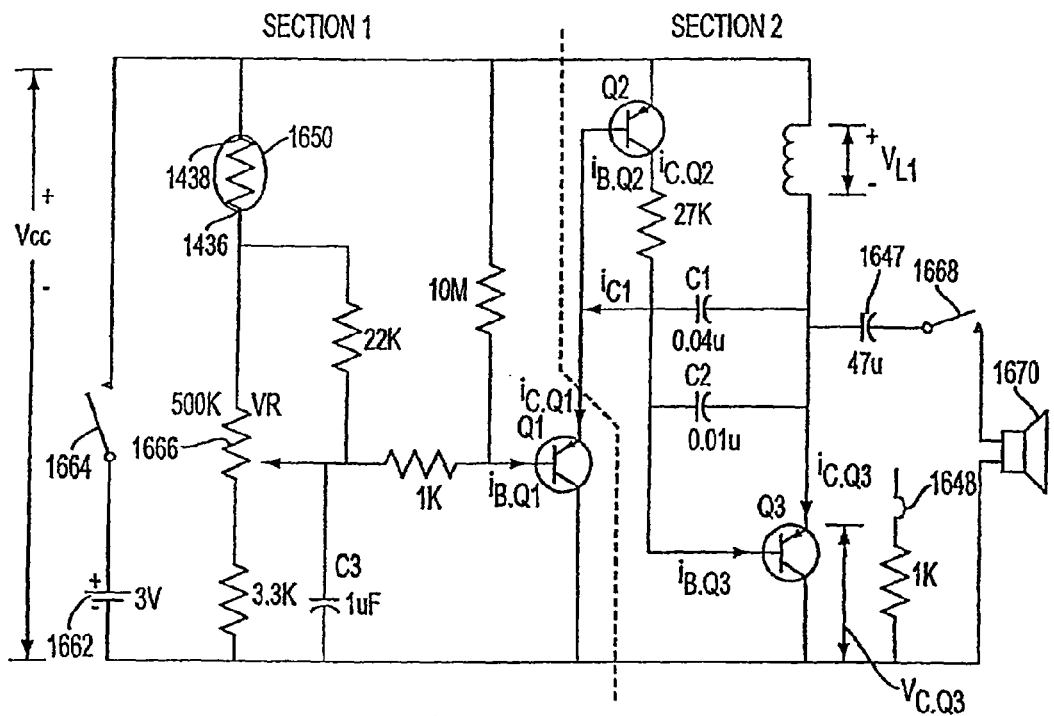
FIG. 16 illustrates a circuit within the bio-monitor.

Bio-monitor 1430 contains the circuit of FIG. 16 which produces the bio-signal that indicates the impedance between points 1438 and 1436. The circuit consists of two sections. The first section is used to sense the impedance between contacts 1438 and 1436, and the second section acts as an oscillator to produce a series of ramp signals at output connector 1648, where the frequency of oscillation is controlled by the first section.

The first section controls the collector current $I_{c,Q1}$ and voltage $V_{c,Q1}$ of transistor Q1 based on the impedance between contacts 1438 and 1436. In this embodiment, impedance sensor 1650 is simply contacts 1438 and 1436 positioned on the speaker's skin. Since the impedance between contacts 1438 and 1436 changes relatively slowly in comparison to the oscillation frequency of section 2, the collector current $I_{c,Q1}$ and voltage $V_{c,Q1}$ are virtually constant as far as section 2 is concerned. The capacitor C3 further stabilizes these currents and voltages.

Section 2 acts as an oscillator. The reactive components, L1 and C1, turn transistor Q3 on and off to produce an oscillation. When the power is first turned on, $I_{c,Q1}$ turns on Q2 by drawing base current $I_{b,Q2}$. Similarly, $I_{c,Q2}$ turns on transistor Q3 by providing base current $I_{b,Q3}$. Initially there is no current through inductor L1. When Q3 is turned on, the voltage Vcc less a small saturated transistor voltage $V_{c,Q3}$, is applied across L1. As a result, the current $I_{L1}$ increases in accordance with $$L \frac{dI_{L1}}{dt} = VL1$$

As current $I_{L1}$ increases, current $I_{c1}$ through capacitor C1 increases. Increasing the current $I_{c1}$ reduces the base current $I_{B,Q2}$ from transistor Q2 because current $I_{c,Q1}$ is virtually constant. This in turn reduces currents $I_{c,Q2}$, $I_{b,Q3}$ and $I_{c,Q3}$. As a result, more of current $I_{L1}$ passes through capacitor C1 and further reduces current $I_{c,Q3}$. This feedback causes transistor Q3 to be turned off. Eventually, capacitor C1 is fully charged and currents $I_{L1}$ and $I_{c1}$ drop to zero, and thereby permit current $I_{c,Q1}$ to once again draw base current $I_{b,Q2}$ and turn on transistors Q2 and Q3 which restarts the oscillation cycle.

Current $I_{c,Q1}$, which depends on the impedance between contacts 1438 and 1436, controls the frequency on duty cycle of the output signal. As the impedance between points 1438 and 1436 decreases, the time T between ramp signals decreases, and as the impedance between points 1438 and 1436 increases, the time T between ramp signals increases.

The circuit is powered by three-volt battery source 1662 which is connected to the circuit via switch 1664. Also included is variable resistor 1666 which is used to set an operating point for the circuit. It is desirable to set variable resistor 1666 at a position that is approximately in the middle of its range of adjustability. The circuit then varies from this operating point as described earlier based on the impedance between points 1438 and 1436. The circuit also includes switch 1668 and speaker 1670. When a mating connector is not inserted into connector 1648, switch 1668 provides the circuit's output to speaker 1670 rather than connector 1648.

Figure 17:
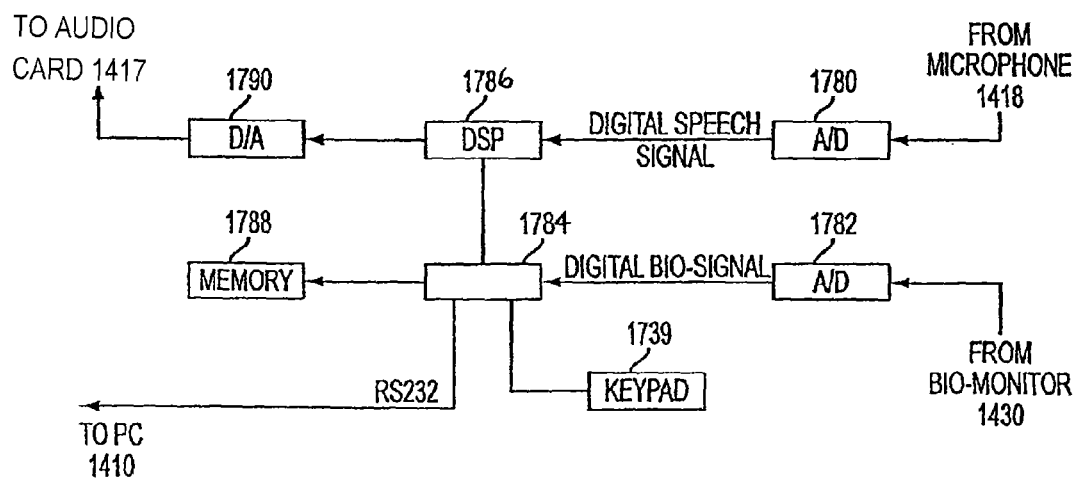
FIG. 17 is a block diagram of the preprocessor.

FIG. 17 is a block diagram of preprocessor 1432. Analog-to-digital (A/D) converter 1780 receives a speech or utterance signal from microphone 1418, and analog-to-digital (A/D) converter 1782 receives a bio-signal from bio-monitor 1430. The signal from A/D 1782 is provided to microprocessor 1784. Microprocessor 1784 monitors the signal from A/D 1782 to determine what action should be taken by digital signal processor (DSP) device 1786. Microprocessor 1784 uses memory 1788 for program storage and for scratch pad operations. Microprocessor 1784 communicates with PC 1410 using an RS232 interface. The software to control the interface between PC 1410 and microprocessor 1784 may be ran on PC 1410 in a multi-application environment using a software package such as a program sold under the trade name (WINDOWS) by Microsoft Corporation. The output from DSP 1786 is converted back to an analog signal by digital-to-analog converter 1790. After DSP 1786 modifies the signal from A/D 1780 as commanded by microprocessor 1784, the output of D/A converter 1790 is sent to audio card 1417. Microprocessor 1784 can be one of the widely available microprocessors such as the microprocessors available from Intel Corporation, and DSP 1786 can be one of the widely available digital signal processing chips available from companies such as Texas Instruments' TMS320CXX series of devices.

It is possible to position bio-monitor 1430 and preprocessor 1432 on a single card that is inserted into an empty card slot in PC 1410. It is also possible to perform the functions of microprocessor 1784 and digital signal processor 1786 using PC 1410 rather than specialized hardware.

Microprocessor 1784 monitors the bio-signal from A/D 1782 to determine what action should be taken by DSP 1786. When the signal from A/D 1782 indicates that user is in a more excited state, microprocessor 1784 indicates to DSP 1786 that it should process the signal from A/D 1780 so that the pitch of the speech signal is decreased. When the bio-signal from A/D 1782 indicates that the user is in a less excited or fatigued state, microprocessor 1784 instructs DSP 1786 to increase the pitch of the speech signal.

DSP 1786 modifies the pitch of the speech signal by creating a speech model. The DSP then uses the model to recreate the speech signal with a modified pitch. The speech model is created using one of the linear predictive coding techniques which are well-known in the art. One such technique is disclosed in an Analog Device, Inc. application book entitled "Digital Signal Processing Applications Using the ADSP 2 100 Family", pp. 355-372, published by Prentice-Hall, Englewood Cliffs, N.J., 1992. This technique involves modeling the speech signal as a FIR (finite impulse response) filter with time varying coefficients, where the filter is excited by a train of impulses. The time T between the impulses is a measure of pitch or fundamental frequency. The time varying coefficients may be calculated using a technique such as the Levinson-Durbin recursion which is disclosed in the above-mentioned Analog Device, Inc. publication. A time T between the impulses composing the train of impulses which excite the filter may be calculated using an algorithm such as John D. Markel's SIFT (simplified inverse filter tracking) algorithm which is disclosed in "The SIFT Algorithm for Fundamental Frequency Estimation" by John D. Markel, IEEE Transactions on Audio and Electroacoustics, Vol. AU-20, No. 5, December, 1972. DSP 1786 modifies the pitch or fundamental frequency of the speech signal by changing the time T between impulses when it excites the FIR filter to recreate the speech signal. For example, the pitch may be increased by 1% by decreasing the time T between impulses by 1%.

It should be noted that the speech signal can be modified in ways other than changes in pitch. For example, pitch, amplitude, frequency and/or signal spectrum may be modified. A portion of the signal spectrum or the entire spectrum may be attenuated or amplified.

It is also possible to monitor bio-signals other than a signal indicative of the impedance between two points on a user's skin. Signals indicative of autonomic activity may be used as bio-signals. Signals indicative of autonomic activity such as blood pressure, pulse rate, brain wave or other electrical activity, pupil size, skin temperature, transparency or reflectivity to a particular electromagnetic wavelength or other signals indicative of the user's emotional state may be used.

Figure 18:
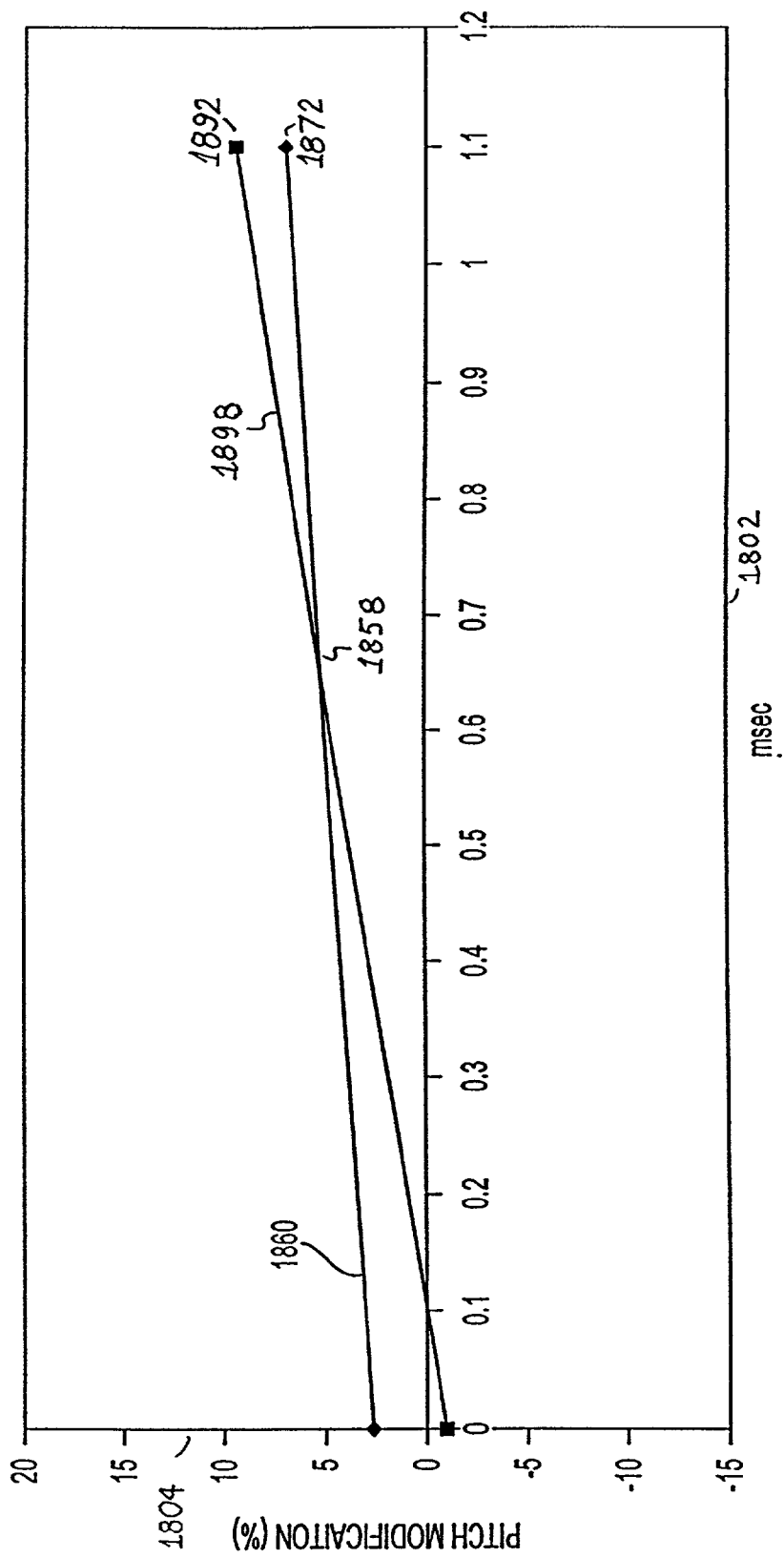
FIG. 18 illustrates a relationship between pitch modification and the bio-signal.

FIG. 18 illustrates pitch modification curves that microprocessor 1784 uses to instruct DSP 1786 to change the pitch of the speech signal based on the time period T associated with the bio-signal. Horizontal axis 1802 indicates time period T between ramps 1442 of the bio-signal and vertical axis 1804 indicates the percentage change in pitch that is introduced by DSP 1786.

Figure 19:
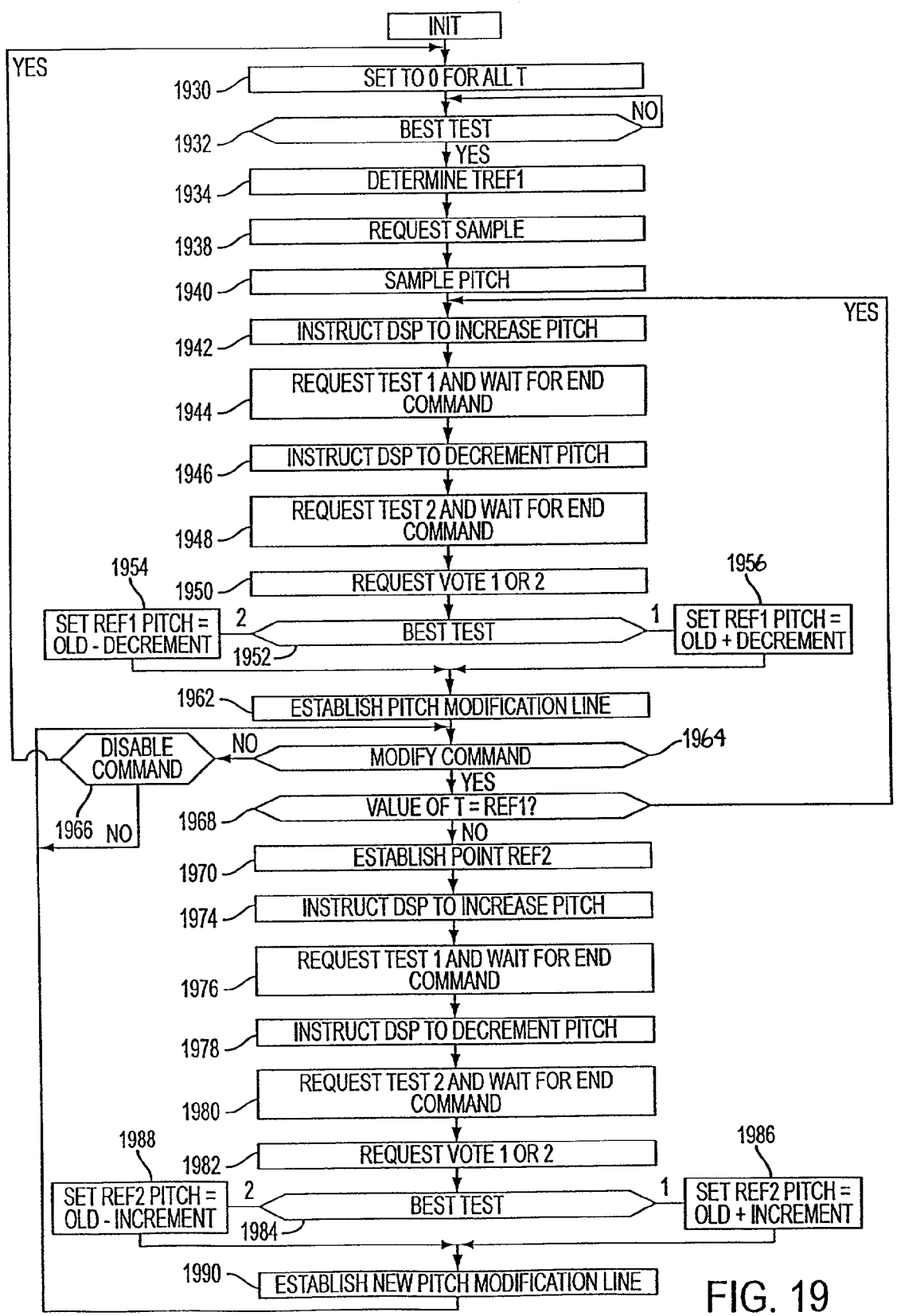
FIG. 19 is a flow chart of a calibration program.

FIG. 19 illustrates a flow chart of the commands executed by microprocessor 1784 to establish an operating curve illustrated in FIG. 18. After initialization, step 1930 is executed to establish a line that is co-linear with axis 1802. This line indicates that zero pitch change is introduced for all values of T from the bio-signal. After step 1930, decision step 1932 is executed where microprocessor 1784 determines whether a modify command has been received from keyboard 1414 or keypad 1439. If no modify command has been received, microprocessor 1784 waits in a loop for a modify command. If a modify command is received, step 1934 is executed to determine the value of $T=T_{ref1}$ that will be used to establish a new reference point $Ref_1$. The value $T_{ref1}$ is equal to the present value of T obtained from the bio-signal. For example, $T_{ref1}$ may equal 0.6 m sec. After determining the value $T_{ref1}$, microprocessor 1784 executes step 1938 which requests the user to state an utterance so that a pitch sample can be taken in step 1940. It is desirable to obtain a pitch sample because that pitch sample is used as a basis for the percentage changes in pitch indicated along axis 1804. In step 1942, microprocessor 1784 instructs DSP 1786 to increase the pitch of the speech signal by an amount equal to the present pitch change associated with point Ref1, plus an increment of five percent; however, smaller or larger increments may be used. (At this point, the pitch change associated with point $Ref_1$ is zero. Recall step 1930.) In step 1944, microprocessor 1784 requests the user to run a recognition test by speaking several commands to the speech recognition system to determine if an acceptable recognition rate has been achieved. When the user completes the test, the user can indicate completion of the test to microprocessor 1784 by entering a command such as "end", using keyboard 1414 or keypad 1439.

After executing step 1944, microprocessor 1784 executes step 1946 in which it instructs DSP 1786 to decrease the pitch of the incoming speech signal by the pitch change associated with point $Ref_1$, minus a decrement of five percent; however, smaller or larger amounts may be used. (Note that the pitch change associated with point $Ref_1$ is zero as a result of step 1930). In step 1948, microprocessor 1784 requests that the user perform another speech recognition test and enter an "end" command when the test is completed. In step 1950 microprocessor 1784 requests that the user vote for the first or second test to indicate which test had superior recognition capability. In step 1952 the results of the user's vote is used to select between steps 1954 and 1956. If test 1 was voted as best, step 1956 is executed and the new percentage change associated with point $Ref_1$ is set equal to the prior value of point $Ref_1$ plus five percent or the increment that was used in step 1942. If test 2 is voted best, step 1954 is executed and the new percentage change value associated with $Ref_1$ is set equal to the old value of $Ref_1$ minus five percent or the decrement that was used in step 1946. Determining a percentage change associated with $T=T_{ref1}$ establishes a new reference point $Ref_1$. For example, if test 1 was voted best, point $Ref_1$. is located at point 1858 in FIG. 18. After establishing the position of point 1858 which is the newly-established $Ref_1$, line 1860 is established in step 1962. Line 1860 is the initial pitch modification line that is used to calculate pitch changes for different values of T from the bio-signal. Initially, this line may be given a slope such as plus five percent per millisecond; however, other slopes may be used.

After establishing this initial modification line, microprocessor 1784 goes into a wait loop where steps 1964 and 1966 are executed. In step 1964, microprocessor 1784 checks for a modify command, and in step 1966, it checks for a disable command. If a modify command is not received in step 1964, the processor checks for the disable command in step 1966. If a disable command is not received, microprocessor returns to step 1964, and if a disable command is received, the microprocessor executes step 1930 which sets the change in pitch equal to zero for all values of T from the bio-signal. The processor stays in this loop of checking for modify and disable commands until the user becomes dissatisfied with the recognition rate resulting from the preprocessing of the speech signal using curve 1860.

If in step 1964 a modify command is received, step 1968 is executed. In step 1968, the value of T is determined to check if the value of T is equal to, or nearly equal to the value $T_{ref1}$ of point $Ref_1$. If the value of T corresponds to $Ref_1$, step 1942 is executed. If the value of T does not correspond to $Ref_1$, step 1970 is executed. In step 1970, the value of $T_{ref2}$ for a new reference point $Ref_2$ is established. For the purposes of an illustrative example, we will assume that $T_{ref2}$=1.1 m sec. In reference to FIG. 18, this establishes point $Ref_2$ as point 1872 on line 1860. In step 1974, microprocessor 1784 instructs the DSP 1786 to increase the pitch change associated with point $Ref_2$ by plus 2.5 percent (other values of percentage may be used). (Other values of percentage may be used). In step 1976, the user is requested to perform a recognition test and to enter the "end" command when completed. In step 1978, microprocessor 1784 instructs DSP 1786 to decrease the pitch of the speech signal by an amount equal to the pitch change associated with $Ref_2$ minus 2.5 percent. In step 1980, the user is again requested to perform a recognition test and to enter an "end" command when completed. In step 1982 the user is requested to indicate whether the first or second test had the most desirable results. In step 1984, microprocessor 1784 decides to execute step 1986 if test 1 was voted best, and step 1988, if test 2 was voted best. In step 1986, microprocessor 1784 sets the percentage change associated with point $Ref_2$ to the prior value associated with $Ref_2$ plus 2.5 percent or the increment that was used in step 1974. In step 1988, the percentage change associated with $Ref_2$ is set equal to the prior value associated with $Ref_2$ minus 2.5 percent or the decrement that was used in step 1978. After completing steps 1986 or 1988, step 1990 is executed. In step 1990, a new pitch modification line is established. The new line uses the point associated with $Ref_1$ and the new point associated with $Ref_2$. For example, if it is assumed that the user selected test 1 in step 1984, the new point associated with $Ref_2$ is point 1892 of FIG. 18. The new pitch conversion line is now line 1898 which passes through points 1892 and 1858. After executing step 1990 microprocessor 1784 returns to the looping operation associated with steps 1964 and 1966.

It should be noted that a linear modification line has been used; however, it is possible to use non-linear modification lines. This can be done by using points 1858 and 196 to establish a slope for a line to the right of point 1858, and by using another reference point to the left of point 1858 to establish a slope for a line extending to the left of point 1858. It is also possible to place positive and negative limits on the maximum percentage pitch change. When the pitch modification line approaches these limits, they can approach it asymptotically, or simply change abruptly at the point of contact with the limit.

Figure 20:
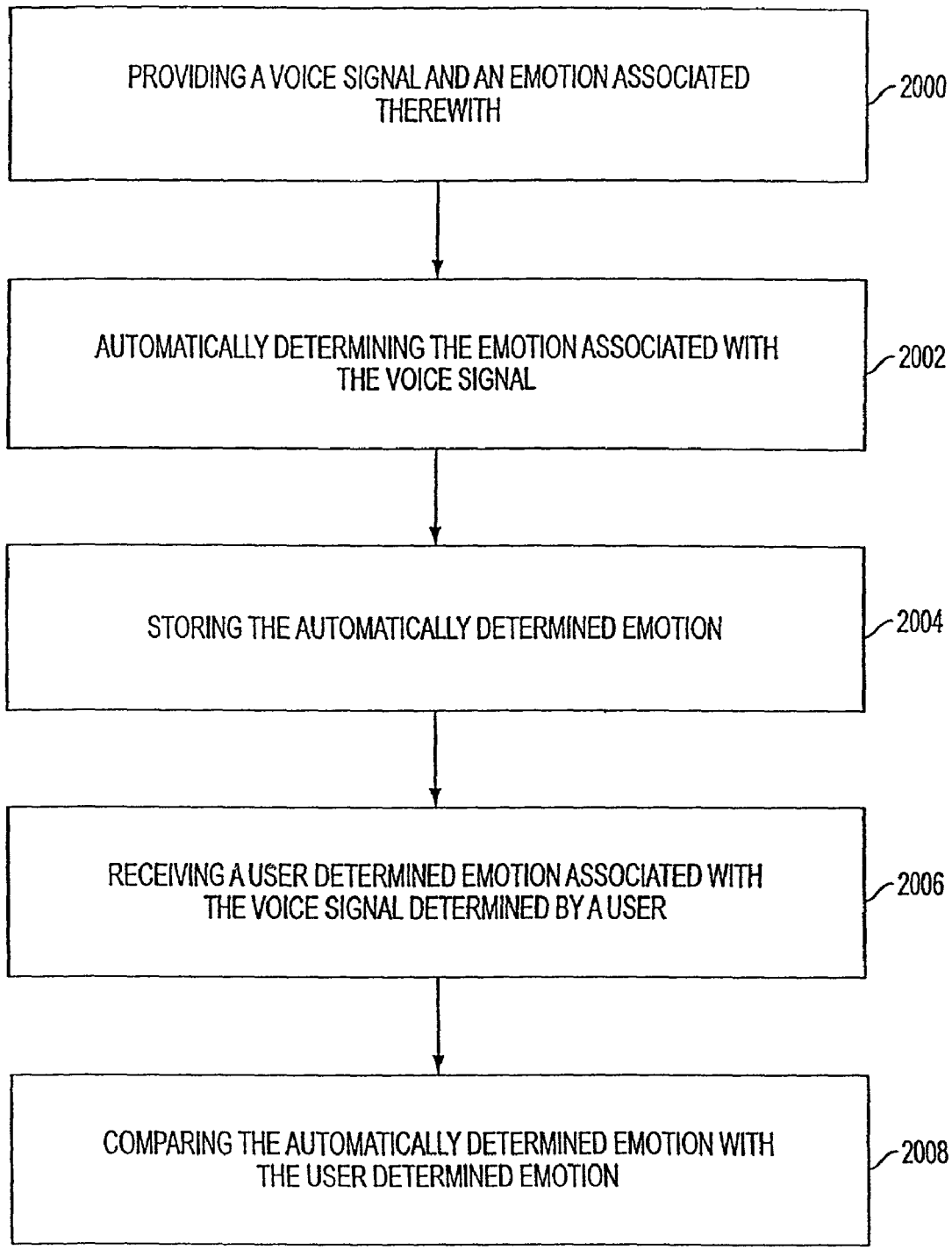
FIG. 20 shows generally the configuration of the portion of the system of the present invention wherein improved selection of a set of pitch period candidates is achieved.

It is also possible to use a fixed modification curve, such as curve 1800, and then adjust variable resistor 1666 until an acceptable recognition rate is achieved Voice Messaging System FIG. 20 depicts an embodiment of the present invention that manages voice messages based on emotion characteristics of the voice messages. In operation 2000, a plurality of voice messages that are transferred over a telecommunication network are received. In operation 2002, the voice messages are stored on a storage medium such as the tape recorder set forth above or a hard drive, for example. An emotion associated with voice signals of the voice messages is determined in operation 2004. The emotion may be determined by any of the methods set forth above.

The voice messages are organized in operation 2006 based on the determined emotion. For example, messages in which the voice displays negative emotions, e.g., sadness, anger or fear, can be grouped together in a mailbox and/or database. Access to the organized voice messages is allowed in operation 2008.

The voice messages may follow a telephone call. Optionally, the voice messages of a similar emotion can be organized together. Also optionally, the voice messages may be organized in real time immediately upon receipt over the telecommunication network. Preferably, a manner in which the voice messages are organized is identified to facilitate access to the organized voice messages. Also preferably, the emotion is determined by extracting at least one feature from the voice signals, as previously discussed.

In one exemplary embodiment of a voice messaging system in accordance with the present invention, pitch and LPC parameters (and usually other excitation information too) are encoded for transmission and/or storage, and are decoded to provide a close replication of the original speech input.

The present invention is particularly related to linear predictive coding (LPC systems for (and methods of) analyzing or encoding human speech signals. In LPC modeling generally, each sample in a series of samples is modeled (in the simplified model) as a linear combination of preceding samples, plus an excitation function:

$$S_k = \sum_{j=1}^{N} ajSk - j + uk$$

where $u_k$ is the LPC residual signal. That is, $u_k$ represents the residual information in the input speech signal which is not predicted by the LPC model. Note that only N prior signals are used for prediction. The model order (typically around 10) can be increased to give better prediction, but some information will always remain in the residual signal $u_k$ for any normal speech modelling application.

Within the general framework of LPC modeling, many particular implementations of voice analysis can be selected. In many of these, it is necessary to determine the pitch of the input speech signal. That is, in addition to the formant frequencies, which in effect correspond to resonances of the vocal tract, the human voice also contains a pitch, modulated by the speaker, which corresponds to the frequency at which the larynx modulates the air stream. That is, the human voice can be considered as an excitation function applied to an acoustic passive filter, and the excitation function will generally appear in the LPC residual function, while the characteristics of the passive acoustic filter (i.e., the resonance characteristics of mouth, nasal cavity, chest, etc.) will be molded by the LPC parameters. It should be noted that during unvoiced speech, the excitation function does not have a well-defined pitch, but instead is best modeled as broad band white noise or pink noise.

Estimation of the pitch period is not completely trivial. Among the problems is the fact that the first formant will often occur at a frequency close to that of the pitch. For this reason, pitch estimation is often performed on the LPC residual signal, since the LPC estimation process in effect deconvolves vocal tract resonances from the excitation information, so that the residual signal contains relatively less of the vocal tract resonances (formants) and relatively more of the excitation information (pitch). However, such residual-based pitch estimation techniques have their own difficulties.

The LPC model itself will normally introduce high frequency noise into the residual signal, and portions of this high frequency noise may have a higher spectral density than the actual pitch which should be detected. One solution to this difficulty is simply to low pass filter the residual signal at around 1000 Hz. This removes the high frequency noise, but also removes the legitimate high frequency energy which is present in the unvoiced regions of speech, and renders the residual signal virtually useless for voicing decisions.

A cardinal criterion in voice messaging applications is the quality of speech reproduced. Prior art systems have had many difficulties in this respect. In particular, many of these difficulties relate to problems of accurately detecting the pitch and voicing of the input speech signal.

It is typically very easy to incorrectly estimate a pitch period at twice or half its value. For example, if correlation methods are used, a good correlation at a period P guarantees a good correlation at period 2P, and also means that the signal is more likely to show a good correlation at period P/2. However, such doubling and halving errors produce very annoying degradation in voice quality. For example, erroneous halving of the pitch period will tend to produce a squeaky voice, and erroneous doubling of the pitch period will tend to produce a coarse voice. Moreover, pitch period doubling or halving is very likely to occur intermittently, so that the synthesized voice will tend to crack or to grate, intermittently.

The present invention uses an adaptive filter to filter the residual signal. By using a time-varying filter which has a single pole at the first reflection coefficient ($k_1$ of the speech input), the high frequency noise is removed from the voiced periods of speech, but the high frequency information in the unvoiced speech periods is retained. The adaptively filtered residual signal is then used as the input for the pitch decision.

It is necessary to retain the high frequency information in the unvoiced speech periods to permit better voicing/unvoicing decisions. That is, the "unvoiced" voicing decision is normally made when no strong pitch is found, that is when no correlation lag of the residual signal provides a high normalized correlation value. However, if only a low-pass filtered portion of the residual signal during unvoiced speech periods is tested, this partial segment of the residual signal may have spurious correlations. That is, the danger is that the truncated residual signal which is produced by the fixed low-pass filter of the prior art does not contain enough data to reliably show that no correlation exists during unvoiced periods, and the additional band width provided by the high-frequency energy of unvoiced periods is necessary to reliably exclude the spurious correlation lags which might otherwise be found.

Improvement in pitch and voicing decisions is particularly critical for voice messaging systems, but is also desirable for other applications. For example, a word recognizer which incorporated pitch information would naturally require a good pitch estimation procedure. Similarly, pitch information is sometimes used for speaker verification, particularly over a phone line, where the high frequency information is partially lost. Moreover, for long-range future recognition systems, it would be desirable to be able to take account of the syntactic information which is denoted by pitch. Similarly, a good analysis of voicing would be desirable for some advanced speech recognition systems, e.g., speech to text systems.

The first reflection coefficient $k_1$ is approximately related to the high/low frequency energy ratio and a signal. See R. J. McAulay, "Design of a Robust Maximum Likelihood Pitch Estimator for Speech and Additive Noise," Technical Note, 1979-28, Lincoln Labs, Jun. 11, 1979, which is hereby incorporated by reference. For $k_1$ close to −1, there is more low frequency energy in the signal than high-frequency energy, and vice versa for $k_1$ close to 1. Thus, by using $k_1$ to determine the pole of a 1-pole deemphasis filter, the residual signal is low pass filtered in the voiced speech periods and is high pass filtered in the unvoiced speech periods. This means that the formant frequencies are excluded from computation of pitch during the voiced periods, while the necessary high-bandwidth information is retained in the unvoiced periods for accurate detection of the fact that no pitch correlation exists.

Preferably a post-processing dynamic programming technique is used to provide not only an optimal pitch value but also an optimal voicing decision. That is, both pitch and voicing are tracked from frame to frame, and a cumulative penalty for a sequence of frame pitch/voicing decisions is accumulated for various tracks to find the track which gives optimal pitch and voicing decisions. The cumulative penalty is obtained by imposing a frame error is going from one frame to the next. The frame error preferably not only penalizes large deviations in pitch period from frame to frame, but also penalizes pitch hypotheses which have a relatively poor correlation "goodness" value, and also penalizes changes in the voicing decision if the spectrum is relatively unchanged from frame to frame. This last feature of the frame transition error therefore forces voicing transitions towards the points of maximal spectral change.

The voice messaging system of the present invention includes a speech input signal, which is shown as a time series $S_i$, is provided to an LPC analysis block. The LPC analysis can be done by a wide variety of conventional techniques, but the end product is a set of LPC parameters and a residual signal $U_1$. Background on LPC analysis generally, and on various methods for extraction of LPC parameters, is found in numerous generally known references, including Markel and Gray, Linear Prediction of Speech (1976) and Rabiner and Schafer, Digital Processing of Speech Signals (1978), and references cited therein, all of which are hereby incorporated by reference.

In the presently preferred embodiment, the analog speech waveform is sampled at a frequency of 8 KHz and with a precision of 16 bits to produce the input time series $S_1$. Of course, the present invention is not dependent at all on the sampling rate or the precision used, and is applicable to speech sampled at any rate, or with any degree of precision, whatsoever.

In the presently preferred embodiment, the set of LPC parameters which is used includes a plurality of reflection coefficients $k_1$, and a 10th-order LPC model is used (that is, only the reflection coefficients $k_1$ through $k_{10}$ are extracted, and higher order coefficients are not extracted). However, other model orders or other equivalent sets of LPC parameters can be used, as is well known to those skilled in the art. For example, the LPC predictor coefficients $a_k$ can be used, or the impulse response estimates $e_k$. However, the reflection coefficients $k_i$ are most convenient.

In the presently preferred embodiment, the reflection coefficients are extracted according to the Leroux-Gueguen procedure, which is set forth, for example, in IEEE Transactions on Acoustics, Speech and Signal Processing, p. 257 (June 1977), which is hereby incorporated by reference. However, other algorithms well known to those skilled in the art, such as Durbin's, could be used to compute the coefficients.

A by-product of the computation of the LPC parameters will typically be a residual signal $U_k$. However, if the parameters are computed by a method which does not automatically pop out the $U_k$ as a by-product, the residual can be found simply by using the LPC parameters to configure a finite-impulse-response digital filter which directly computes the residual series $U_k$ from the input series $S_k$.

The residual signal time series $U_k$ is now put through a very simple digital filtering operation, which is dependent on the LPC parameters for the current frame. That is, the speech input signal $S_k$ is a time series having a value which can change once every sample, at a sampling rate of, e.g., 8 KHz. However, the LPC parameters are normally recomputed only once each frame period, at a frame frequency of, e.g., 100 Hz. The residual signal $U_k$ also has a period equal to the sampling period. Thus, the digital filter, whose value is dependent on the LPC parameters, is preferably not readjusted at every residual signal $U_k$. In the presently preferred embodiment, approximately 80 values in the residual signal time series $U_k$ pass through the filter 14 before a new value of the LPC parameters is generated, and therefore a new characteristic for the filter 14 is implemented.

More specifically, the first reflection coefficient $k_1$ is extracted from the set of LPC parameters provided by the LPC analysis section 12. Where the LPC parameters themselves are the reflection coefficients $k_1$, it is merely necessary to look up the first reflection coefficient $k_1$. However, where other LPC parameters are used, the transformation of the parameters to produce the first order reflection coefficient is typically extremely simple, for example, $$k_1 = a_1/a_0$$

Although the present invention preferably uses the first reflection coefficient to define a 1-pole adaptive filter, the invention is not as narrow as the scope of this principal preferred embodiment. That is, the filter need not be a single-pole filter, but may be configured as a more complex filter, having one or more poles and or one or more zeros, some or all of which may be adaptively varied according to the present invention.

It should also be noted that the adaptive filter characteristic need not be determined by the first reflection coefficient $k_1$. As is well known in the art, there are numerous equivalent sets of LPC parameters, and the parameters in other LPC parameter sets may also provide desirable filtering characteristics. Particularly, in any set of LPC parameters, the lowest order parameters are most likely to provide information about gross spectral shape. Thus, an adaptive filter according to the present invention could use $a_1$ or $e_1$ to define a pole, can be a single or multiple pole and can be used alone or in combination with other zeros and or poles. Moreover, the pole (or zero) which is defined adaptively by an LPC parameter need not exactly coincide with that parameter, as in the presently preferred embodiment, but can be shifted in magnitude or phase.

Thus, the 1-pole adaptive filter filters the residual signal time series $U_k$ to produce a filtered time series $u'_k$. As discussed above, this filtered time series $U_k$ will have its high frequency energy greatly reduced during the voiced speech segments, but will retain nearly the full frequency band width during the unvoiced speech segments. This filtered residual signal $u'_k$ is then subjected to further processing, to extract the pitch candidates and voicing decision.

A wide variety of methods to extract pitch information from a residual signal exist, and any of them can be used. Many of these are discussed generally in the Markel and Gray book incorporated by reference above.

In the presently preferred embodiment, the candidate pitch values are obtained by finding the peaks in the normalized correlation function of the filtered residual signal, defined as follows:

$$Ck = \frac{\sum_{j=0}^{m-1} uj \, uj-k}{\left(\sum_{j=0}^{m-1} uj2\right)^{1/2} \left(\sum_{j=0}^{m-1} uj^2 - k\right)} 1/2 \text{ for } km, n \le k \le K \max$$

where $u'_j$ is the filtered residual signal, $k_{min}$ and $k_{max}$, define the boundaries for the correlation lag k, and m is the number of samples in one frame period (80 in the preferred embodiment) and therefore defines the number of samples to be correlated. The candidate pitch values are defined by the lags k* at which value of C(k*) takes a local maximum, and the scalar value of C(k) is used to define a "goodness" value for each candidate k*.

Optionally a threshold value $C_{min}$ will be imposed on the goodness measure C(k), and local maxima of C(k) which do not exceed the threshold value $C_{min}$ will be ignored. If no k* exists for which C(k*) is greater than $C_{min}$, then the frame is necessarily unvoiced.

Alternately, the goodness threshold $C_{min}$ can be dispensed with, and the normalized autocorrelation function can simply be controlled to report out a given number of candidates which have the best goodness values, e.g., the 16 pitch period candidates k having the largest values of C(k).

In one embodiment, no threshold at all is imposed on the goodness value Ck), and no voicing decision is made at this stage. Instead, the 16 pitch period candidates $k^*_1$, $k^*_2$, etc., are reported out, together with the corresponding goodness value ($C(k^*_i)$) for each one. In the presently preferred embodiment, the voicing decision is not made at this stage, even if all of the C(k) values are extremely low, but the voicing decision will be made in the succeeding dynamic programming step, discussed below.

In the presently preferred embodiment, a variable number of pitch candidates are identified, according to a peak-finding algorithm. That is, the graph of the "goodness" values C(k) versus the candidate pitch period k is tracked. Each local maximum is identified as a possible peak. However, the existence of a peak at this identified local maximum is not confined until the function has thereafter dropped by a constant amount. This confirmed local maximum then provides one of the pitch period candidates. After each peak candidate has been identified in this fashion, the algorithm then looks for a valley. That is, each local minimum is identified as a possible valley, but is not confirmed as a valley until the function has thereafter risen by a predetermined constant value. The valleys are not separately reported out, but a confirmed valley is required after a confirmed peak before a new peak will be identified. In the presently preferred embodiment, where the goodness values are defined to be bounded by +1 or −1, the constant value required for confirmation of a peak or for a valley has been set at 0.2, but this can be widely varied. Thus, this stage provides a variable number of pitch candidates as output, from zero up to 15.

In the presently preferred embodiment, the set of pitch period candidates provided by the foregoing steps is then provided to a dynamic programming algorithm. This dynamic programming algorithm tracks both pitch and voicing decisions, to provide a pitch and voicing decision for each frame which is optimal in the context of its neighbors.

Given the candidate pitch values and their goodness values C(k), dynamic programming is now used to obtain an optimum pitch contour which includes an optimum voicing decision for each frame. The dynamic programming requires several frames of speech in a segment of speech to be analyzed before the pitch and voicing for the first frame of the segment can be decided. At each frame of the speech segment, every pitch candidate is compared to the retained pitch candidates from the previous frame. Every retained pitch candidate from the previous frame carries with it a cumulative penalty, and every comparison between each new pitch candidate and any of the retained pitch candidates also has a new distance measure. Thus, for each pitch candidate in the new frame, there is a smallest penalty which represents a best match with one of the retained pitch candidates of the previous frame. When the smallest cumulative penalty has been calculated for each new candidate, the candidate is retained along with its cumulative penalty and a back pointer to the best match in the previous frame. Thus, the back pointers define a trajectory which has a cumulative penalty as listed in the cumulative penalty value of the last frame in the project rate. The optimum trajectory for any given frame is obtained by choosing the trajectory with the minimum cumulative penalty. The unvoiced state is defined as a pitch candidate at each frame. The penalty function preferably includes voicing information, so that the voicing decision is a natural outcome of the dynamic programming strategy. In the presently preferred embodiment, the dynamic programming strategy is 16 wide and 6 deep. That is, 15 candidates (or fewer) plus the "unvoiced" decision (stated for convenience as a zero pitch period) are identified as possible pitch periods at each frame, and all 16 candidates, together with their goodness values, are retained for the 6 previous frames.

The decisions as to pitch and voicing are made final only with respect to the oldest frame contained in the dynamic programming algorithm. That is, the pitch and voicing decision would accept the candidate pitch at frame $F_K-5$ whose current trajectory cost was minimal. That is, of the 16 (or fewer) trajectories ending at most recent frame $F_K$, the candidate pitch in frame $F_K$ which has the lowest cumulative trajectory cost identifies the optimal trajectory. This optimal trajectory is then followed back and used to make the pitch/voicing decision for frame $F_K-5$. Note that no final decision is made as to pitch candidates in succeeding frames ($F_K-4$, etc.), since the optimal trajectory may no longer appear optimal after more frames are evaluated. Of course, as is well known to those skilled in the art of numerical optimization, a final decision in such a dynamic programming algorithm can alternatively be made at other times, e.g., in the next to last frame held in the buffer.

In addition, the width and depth of the buffer can be widely varied. For example, as many as 64 pitch candidates could be evaluated, or as few as two; the buffer could retain as few as one previous frame, or as many as 16 previous frames or more, and other modifications and variations can be instituted as will be recognized by those skilled in the art. The dynamic programming algorithm is defined by the transition error between a pitch period candidate in one frame and another pitch period candidate in the succeeding frame. In the presently preferred embodiment, this transition error is defined as the sum of three parts: an error $E_p$ due to pitch deviations, an error $E_s$, due to pitch candidates having a low "goodness" value, and an error $E_t$ due to the voicing transition.

The pitch deviation error $E_p$ is a function of the current pitch period and the previous pitch period as given by:

$$E_p = \min \left\{ \begin{array}{l} A_D + B_p \left| \ln \frac{tau}{tau_p} \right| \\ A_D + B_p \left| \ln \frac{tau}{tau_p} \right| + B_p \ln 2 \\ A_D + B_p \left[ \left| \ln \frac{tau}{tau_p} \right| + \ln(1/2) \right] \end{array} \right\}$$

if both frames are voiced, and $E_p = B_p.\text{times}.D_N$ otherwise; where tau is the candidate pitch period of the current frame, $tau_p$ is a retained pitch period of the previous frame with respect to which the transition error is being computed, and $B_p$, $A_D$, and $D_N$ are constants. Note that the minimum function includes provision for pitch period doubling and pitch period halving. This provision is not strictly necessary in the present invention, but is believed to be advantageous. Of course, optionally, similar provision could be included for pitch period tripling, etc.

The voicing state error, $E_s$, is a function of the "goodness" value $C(k)$ of the current frame pitch candidate being considered. For the unvoiced candidate, which is always included among the 16 or fewer pitch period candidates to be considered for each frame, the goodness value $C(k)$ is set equal to the maximum of $C(k)$ for all of the other 15 pitch period candidates in the same frame. The voicing state error $E_s$ is given by $E_s = B_s(R_v - C(tau))$, if the current candidate is voiced, and $E_s = B_s(C(tau) - R_U)$ otherwise, where $C(tau)$ is the "goodness value" corresponding to the current 5 pitch candidate tau, and $B_s$, $R_v$, and $R_U$ are constants.

The voicing transition error $E_T$ is defined in terms of a spectral difference measure T. The spectral difference measure T defined, for each frame, generally how different its spectrum is from the spectrum of the receiving frame. Obviously, a number of definitions could be used for such a spectral difference measure, which in the presently preferred embodiment is defined as follows:

$$T = \left( \log \left( \frac{E}{E_p} \right) \right)^2 = \sum_N (L(N) - L_p(N))^2$$

where E is the RMS energy of the current frame, $E_p$ is the energy of the previous frame, $L(N)$ is the Nth log area ratio of the current frame and $L_p(N)$ is the Nth log area ratio of the previous frame. The log area ratio $L(N)$ is calculated directly from the Nth reflection coefficient $k_N$ as follows:

$$L(N) = \ln \left( \frac{1 - k_N}{1 + k_N} \right)$$

The voicing transition error $E_T$ is then defined, as a function of the spectral difference measure T, as follows:

If the current and previous frames are both unvoiced, or if both are voiced, $E_T$ is set=to 0;

otherwise, $E_T = G_T + A_T/T$, where T is the spectral difference measure of the current frame. Again, the definition of the voicing transition error could be widely varied. The key feature of the voicing transition error as defined here is that, whenever a voicing state change occurs (voiced to unvoiced or unvoiced to voiced) a penalty is assessed which is a decreasing function of the spectral difference between the two frames. That is, a change in the voicing state is disfavored unless a significant spectral change also occurs.

Such a definition of a voicing transition error provides significant advantages in the present invention, since it reduces the processing time required to provide excellent voicing state decisions.

The other errors $E_s$ and $E_p$ which make up the transition error in the presently preferred embodiment can also be variously defined. That is, the voicing state error can be defined in any fashion which generally favors pitch period hypotheses which appear to fit the data in the current frame well over those which fit the data less well. Similarly, the pitch deviation error $E_p$ can be defined in any fashion which corresponds generally to changes in the pitch period. It is not necessary for the pitch deviation error to include provision for doubling and halving, as stated here, although such provision is desirable.

A further optional feature of the invention is that, when the pitch deviation error contains provisions to track pitch across doublings and halvings, it may be desirable to double (or halve) the pitch period values along the optimal trajectory, after the optimal trajectory has been identified, to make them consistent as far as possible.

It should also be noted that it is not necessary to use all of the three identified components of the transition error. For example, the voicing state error could be omitted, if some previous stage screened out pitch hypotheses with a low "goodness" value, or if the pitch periods were rank ordered by "goodness" value in some fashion such that the pitch periods having a higher goodness value would be preferred, or by other means. Similarly, other components can be included in the transition error definition as desired.

It should also be noted that the dynamic programming method taught by the present invention does not necessarily have to be applied to pitch period candidates extracted from an adaptively filtered residual signal, nor even to pitch period candidates which have been derived from the LPC residual signal at all, but can be applied to any set of pitch period candidates, including pitch period candidates extracted directly from the original input speech signal.

These three errors are then summed to provide the total error between some one pitch candidate in the current frame and some one pitch candidate in the preceding frame. As noted above, these transition errors are then summed cumulatively, to provide cumulative penalties for each trajectory in the dynamic programming algorithm.

This dynamic programming method for simultaneously finding both pitch and voicing is itself novel, and need not be used only in combination with the presently preferred method of finding pitch period candidates. Any method of finding pitch period candidates can be used in combination with this novel dynamic programming algorithm. Whatever the method used to find pitch period candidates, the candidates are simply provided as input to the dynamic programming algorithm.

In particular, while the embodiment of the present invention using a minicomputer and high-precision sampling is presently preferred, this system is not economical for large-volume applications. Thus, the preferred mode of practicing the invention in the future is expected to be an embodiment using a microcomputer based system, such as the TI Professional Computer. This professional computer, when configured with a microphone, loudspeaker, and speech processing board including a TMS 320 numerical processing microprocessor and data converters, is sufficient hardware to practice the present invention.

Voice-Based Identity Authentication for Data Access

Figure 21:
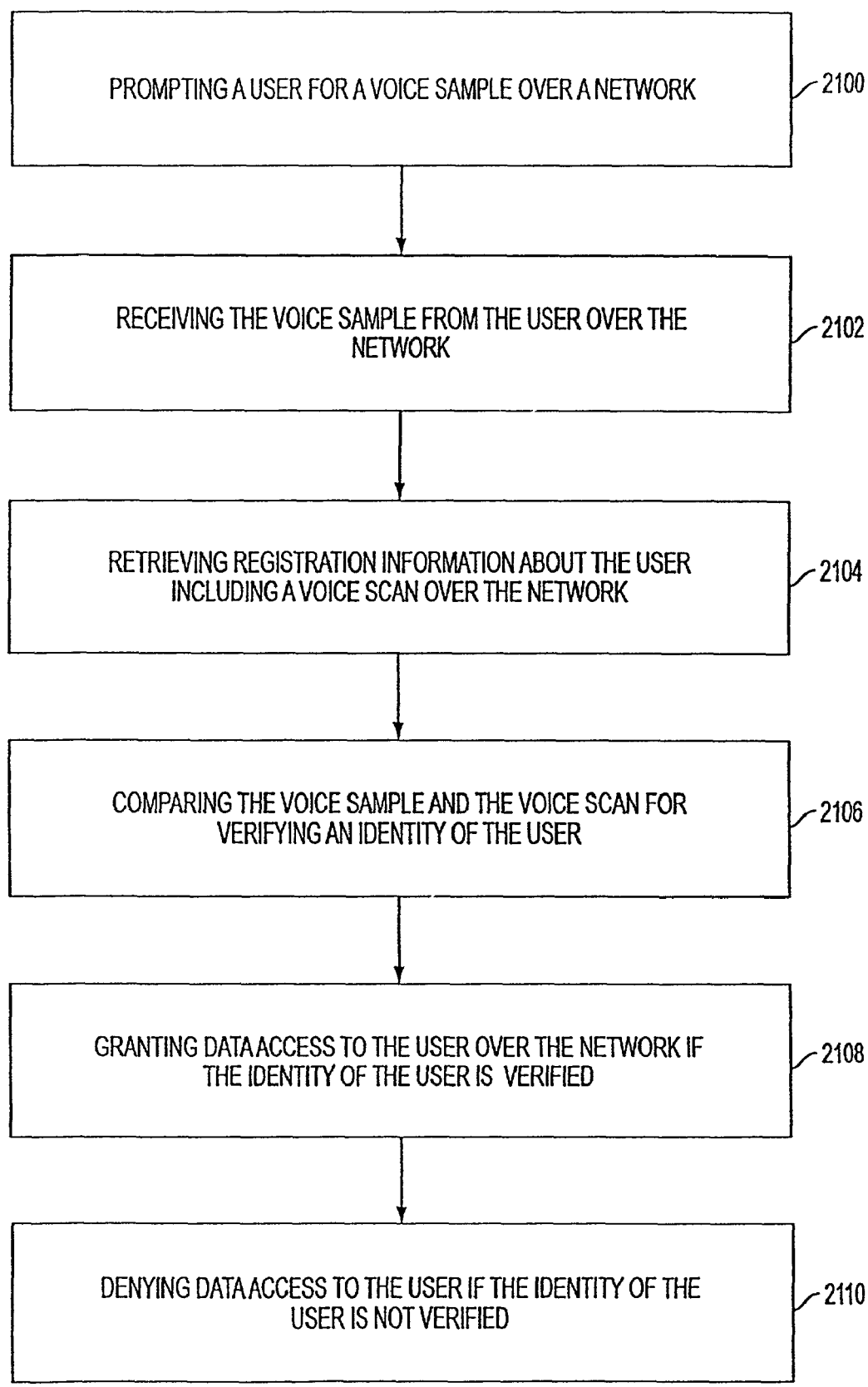
FIG. 21 is a flow diagram that illustrates an embodiment of the present invention that identifies a user through voice verification to allow the user to access data on a network.

FIG. 21 illustrates an embodiment of the present invention that identifies a user through voice verification to allow the user to access data on a network. When a user requests access to data, such as a website, the user is prompted for a voice sample in operation 2100. In operation 2102, the voice sample from the user is received over the network. Registration information about a user is retrieved in operation 2104. It should be noted that the information may be retrieved from a local storage device or retrieved over the network. Included in the registration information is a voice scan of the voice of the user. The voice sample from the user is compared with the voice scan of the registration information in operation 2106 to verify an identity of the user. Operation 2106 is discussed in more detail below. If the identity of the user is verified in operation 2106, data access is granted to the user in operation 2108. If the identity of the user is not verified in operation 2106, data access is denied in operation 2110. This embodiment is particularly useful in the eCommerce arena in that it eliminates the need for certificates of authentication and trusted third parties needed to issue them. A more detailed description of processes and apparatuses to perform these operations is found below, and with particular reference to FIGS. 22-27 and 29-34.

In one embodiment of the present invention, a voice of the user is recorded to create the voice scan, which is then stored. This may form part of a registration process. For example, the user could speak into a microphone connected to his or her computer when prompted to do so during a registration process. The resulting voice data would be sent over the network, e.g., Internet, to a website where it would be stored for later retrieval during a verification process. Then, when a user wanted to access the website, or a certain portion of the website, the user would be prompted for a voice sample, which would be received and compared to the voice data stored at the website. As an option, the voice scan could include a password of the user.

Preferably, the voice scan includes more than one phrase spoken by the user for added security. In such an embodiment, for example, multiple passwords could be stored as part of the voice scan and the user would be required to give a voice sample of all of the passwords. Alternatively, different phrases could be required for different levels of access or different portions of data. The different phrases could also be used as navigation controls, such as associating phrases with particular pages on a website. The user would be prompted for a password. Depending on the password received, the page of the website associated with that password would be displayed.

Allowing the voice scan to include more than one phrase also allows identity verification by comparing alternate phrases, such as by prompting the user to speak an additional phrase if the identity of the user is not verified with a first phrase. For example, if the user's voice sample almost matches the voice scan, but the discrepancies between the two are above a predetermined threshold, the user can be requested to speak another phrase, which would also be used to verify the identity of the user. This would allow a user more than one opportunity to attempt to access the data, and could be particularly useful for a user who has an illness, such as a cold, that slightly alters the user's voice. Optionally, the voice sample of the user and/or a time and date the voice sample was received from the user may be recorded.

With reference to operation 2106 of FIG. 21, an exemplary embodiment of the present invention is of a system and method for establishing a positive or negative identity of a speaker which employ at least two different voice authentication devices and which can be used for supervising a controlled access into a secured-system. Specifically, the present invention can be used to provide voice authentication characterized by exceptionally low false-acceptance and low false-rejection rates.

As used herein the term "secured-system" refers to any website, system, device, etc., which allows access or use for authorized individuals only, which are to be positively authenticated or identified each time one of them seeks access or use of the system or device.

The principles and operation of a system and method for voice authentication according to the present invention may be better understood with reference to the drawings and accompanying descriptions.

Figure 22:
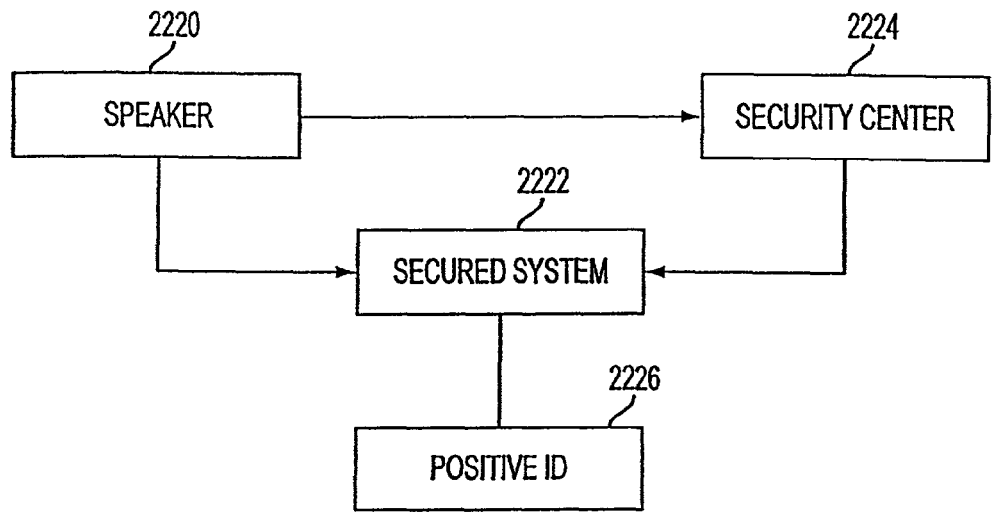
FIG. 22 illustrates the basic concept of a voice authentication system used for controlling an access to a secured-system.

Referring now to the drawings, FIG. 22 illustrates the basic concept of a voice authentication system used for controlling an access to a secured-system. A speaker, 2220, communicates, either simultaneously or sequentially, with a secured-system 2222 and a security-center 2224. The voice of speaker 2220 is analyzed for authentication by security-center 2224, and if authentication is positively established by security-center 2224, a communication command is transmitted therefrom to secured-system 2222, positive identification (ID) of speaker 2220, as indicated by 2226, is established, and access of speaker 2220 to secured-system 2222 is allowed.

The prior art system of FIG. 22 employs a single voice authentication algorithm. As such, this system suffers the above described tradeoff between false-acceptance and false-rejection rates, resulting in too high false-acceptance and/or too high false-rejection rates, which render the system non-secured and/or non-efficient, respectively.

The present invention is a system and method for establishing an identity of a speaker via at least two different voice authentication algorithms. Selecting the voice authentication algorithms significantly different from one another (e.g., text-dependent and text-independent algorithms) ensures that the algorithms are statistically not fully correlated with one another, with respect to false-acceptance and false-rejection events, i.e., $r<1.0$, wherein "r" is a statistical correlation coefficient.

Assume that two different voice authentication algorithms are completely decorrelated (i.e., $r=0$) and that the false rejection threshold of each of the algorithms is set to a low value, say 0.5%, then, according to the tradeoff rule, and as predicted by FIG. 1 of J. Guavain, L. Lamel and B. Prouts (March, 1995) LIMSI 1995 scientific report the false acceptance rate for each of the algorithms is expected to be exceptionally high, in the order of 8% in this case.

However, if positive identity is established only if both algorithms positively authenticate the speaker, then the combined false acceptance is expected to be (8%-2), or 0.6%, whereas the combined false rejection is expected to be 0.5%× 2, or 1%.

The expected value of the combined false acceptance is expected to increase and the expected value of the false rejection is expected to decrease as the degree of correlation between the algorithms increases, such that if full correlation is experienced (i.e., $r=1.0$), the combined values of the example given are reset at 0.5% and 8%.

Please note that the best EER value characterized the algorithms employed by B. Prouts was 3.5%. Extrapolating the plots of B. Prouts to similarly represent an algorithm with EER value of 2% (which is, at present, the state-of-the-art) one may choose to set false rejection at 0.3%, then false acceptance falls in the order of 4.6%, to obtain a combined false acceptance of 0.2% and a combined false rejection of 0.6%.

Thus, the concept of "different algorithms" as used herein in the specification and in the claims section below refers to algorithms having a correlation of $r<1.0$.

Figure 23:
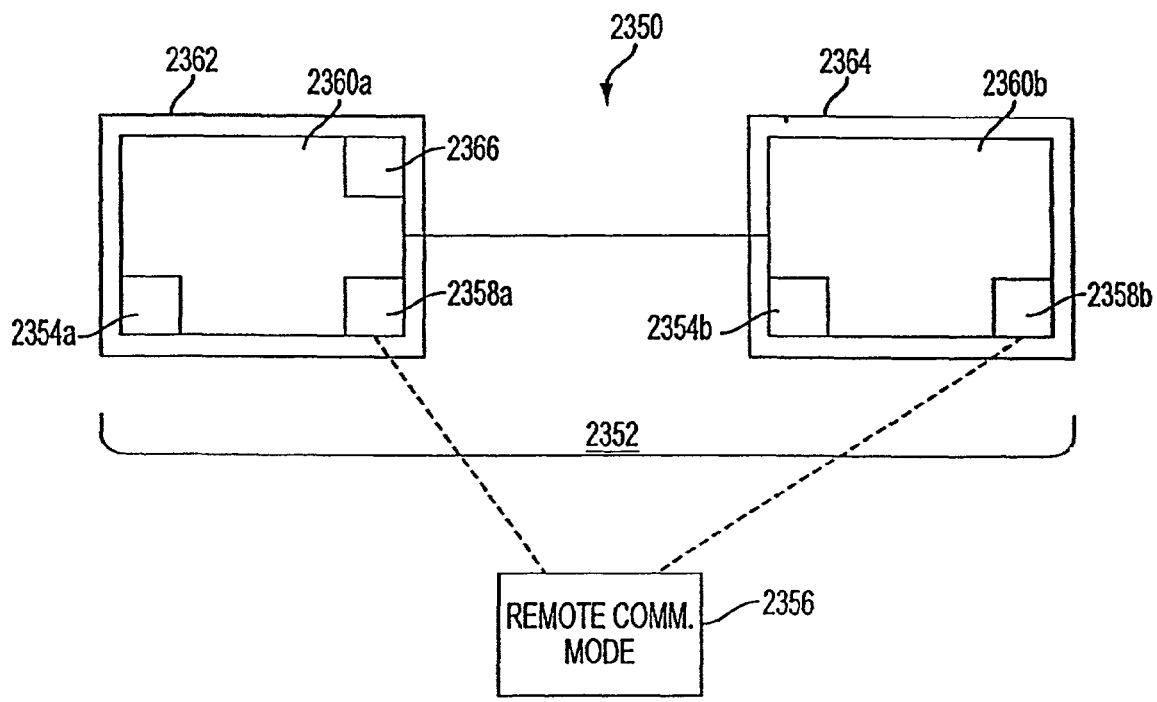
FIG. 23 depicts a system for establishing an identity of a speaker according to the present invention.

With reference now to FIG. 23, presented is a system for establishing an identity of a speaker according to the present invention, which is referred to hereinbelow as system 2350.

Thus, system 2350 includes a computerized system 2352, which includes at least two voice authentication algorithms 2354, two are shown and are marked 2354a and 2354b.

Algorithms 2354 are selected different from one another, and each serves for independently analyzing a voice of the speaker, for obtaining an independent positive or negative authentication of the voice by each. If every one of algorithms 2354 provide a positive authentication, the speaker is positively identified, whereas, if at least one of algorithms 2354 provides negative authentication, the speaker is negatively identified (i.e., identified as an impostor). Both text-dependent and text-independent voice authentication algorithms may be employed. Examples include feature extraction followed by pattern matching algorithms, as described, for example, in U.S. Pat. No. 5,666,466, neural network voice authentication algorithms, as described, for example, in U.S. Pat. No. 5,461,697, Dynamic Time Warping (DTW) algorithm, as described, for example, in U.S. Pat. No. 5,625,747, Hidden Markov Model (HMM) algorithm, as described, for example, in U.S. Pat. No. 5,526,465, and vector quantization (VQ) algorithm, as described, for example, in U.S. Pat. No. 5,640,490. All patents cited are incorporated by reference as if fully set forth herein.

According to a preferred embodiment of the present invention a false rejection threshold of each of algorithms 2354 is set to a level below or equals 0.5%, preferably below or equals 0.4%, more preferably below or equals 0.3%, most preferably below or equals 0.2% or equals about 0.1%.

Depending on the application, the voice of the speaker may be directly accepted by system 2352, alternatively the voice of the speaker may be accepted by system 2352 via a remote communication mode.

Thus, according to a preferred embodiment, the voice of the speaker is accepted for analysis by computerized system 2352 via a remote communication mode 2356. Remote communication mode 2356 may, for example, be wire or cellular telephone communication modes, computer phone communication mode (e.g., Internet or Intranet) or a radio communication mode. These communication modes are symbolized in FIG. 23 by a universal telephone symbol, which is communicating, as indicated by the broken lines, with at least one receiver 2358 (two are shown, indicated 2358a and 2358b) implemented in computerized system 2352.

According to yet another preferred embodiment of the present invention, computerized system 2352 includes at least two hardware installations 2360 (two, 2360a and 2360b, are shown), each of installations 2360 serves for actuating one of voice authentication algorithms 2354. Hardware installations 2360 may be of any type, including, but not limited to, a personal computer (PC) platform or an equivalent, a dedicated board in a computer, etc. Hardware installations 2360 may be remote from one another. As used herein "remote" refers to a situation wherein installations 2360 communicate thereamongst via a remote communication medium.

In one application of the present invention at least one of hardware installations 2360, say 2360a, is implemented in a secured-system 2362, whereas at least another one of hardware installations 2360, say 2360b, is implemented in a securing-center 2364. In a preferred embodiment hardware installation 2360b which is implemented in securing-center 2364 communicates with hardware installation 2360a which implemented in secured-system 2362, such that all positive or negative identification data of the speaker is eventually established in secured-system 2362.

The term "securing-center" as used herein in the specification and in the claims section below refers to computer system which serves for actuating at least one voice authentication algorithm, and therefore serves part of the process of positively or negatively identifying the speaker.

According to a preferred embodiment of the invention, computerized system 2352 further includes a voice recognition algorithm 2366. Algorithm 2366 serves for recognizing verbal data spoken by the speaker (as opposed to identifying the speaker by his voice utterance) and thereby to operate secured-system 2362. Algorithm 2366 preferably further serves for positively or negatively recognizing the verbal data, and if the positive identity has been established via algorithms 2354, as described above, positively or negatively correlating between at least some of the verbal data and the authenticated speaker, where only if such correlation is positive, the speaker gains access to secured-system 2366.

The verbal data spoken by the speaker may include any spoken phrase (at least one word), such as, but not limited to, a name, an identification number, and a request.

In a preferred embodiment of the invention a single security-center 2364 having one voice authentication algorithm 2354 implemented therein communicates with a plurality of secured-systems 2362, each of which having a different (second) voice authentication algorithm 2354, such that a speaker can choose to access any one or a 15 subset of the plurality of secured-systems 2362 if authenticated.

EXAMPLE

Reference is now made to the following example, which together with the above descriptions, illustrate the invention in a non limiting fashion.

FIGS. 24-27 describe a preferred embodiment of the system and method according to the present invention.

Figure 24:
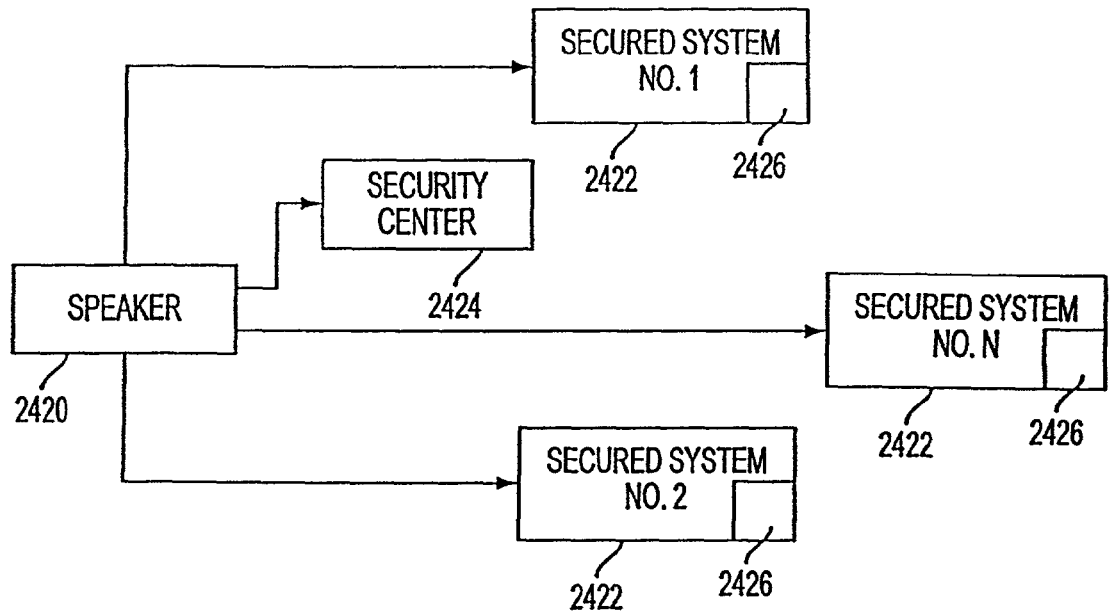
FIG. 24 shows the first step in an exemplary system of identifying a speaker according to the present invention.

Thus, as shown in FIG. 24, using his voice alone or in combination with a communication device, such as, but not limited to, a computer connected to a network, a wire telephone, a cellular wireless telephone, a computer phone, a transmitter (e.g., radio transmitter), or any other remote communication medium, a user, such as speaker 2420, communicates with a security-center 2424 and one or more secured-systems 2422, such as, but not limited to, a computer network (secured-system No. 1), a voice mail system (secured-system No. 2) and/or a bank's computer system (secured-system No. N).

In a preferred embodiment the speaker uses a telephone communication mode, whereas all secured-systems 2422 and security-center 2424 have an identical telephone number, or the same frequency and modulation in case radio communication mode is employed. In any case, preferably the user simultaneously communicates with secured-systems 2422 and security-center 2424. In a preferred embodiment of the invention, for the purpose of the voice verification or authentication procedure, each of secured-systems 2422 includes only a receiver 2426, yet is devoid of a transmitter.

Figure 25:
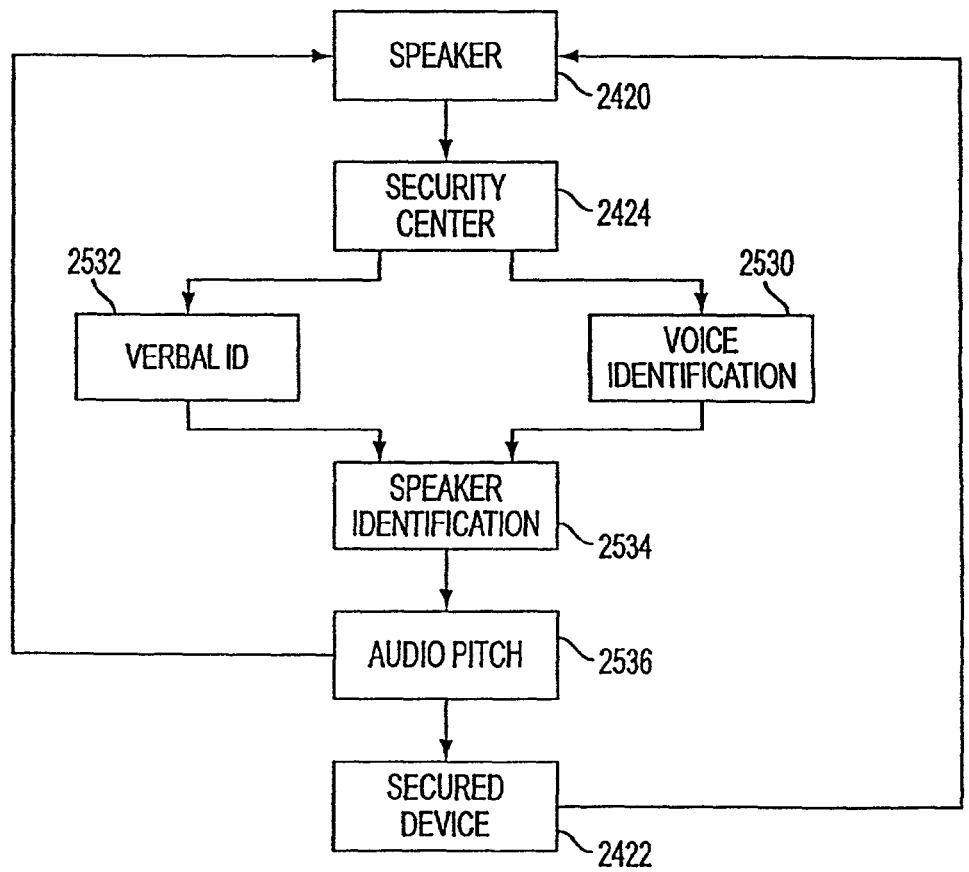
FIG. 25 illustrates a second step in the system set forth in FIG. 24.

FIG. 25 describes the next step in the process. Security-center 2424 performs a voice analysis of the incoming voice, using, for example, (i) any prior art algorithm of voice authentication 2530 and (ii) a conventional verbal recognition algorithm 2532 which includes, for example, verbal identification of the required secured-system 2422 (No. 1, 2, . . . , or N) access code (which also forms a request), a password and the social security number of speaker 2420. The false rejection threshold is set to a low level, say, below 0.5%, preferably about 0.3%, which renders the false acceptance level in the order of 4.6%.

After positive identification of the incoming voice is established, security-center 2424 acknowledges the speaker identification 2534 by, for example, transmitting an audio pitch 2536. Audio pitch 2536 is received both by speaker 2420 and by the specific secured-system 2422 (e.g., according to the system access code used by speaker 2420).

Figure 26:
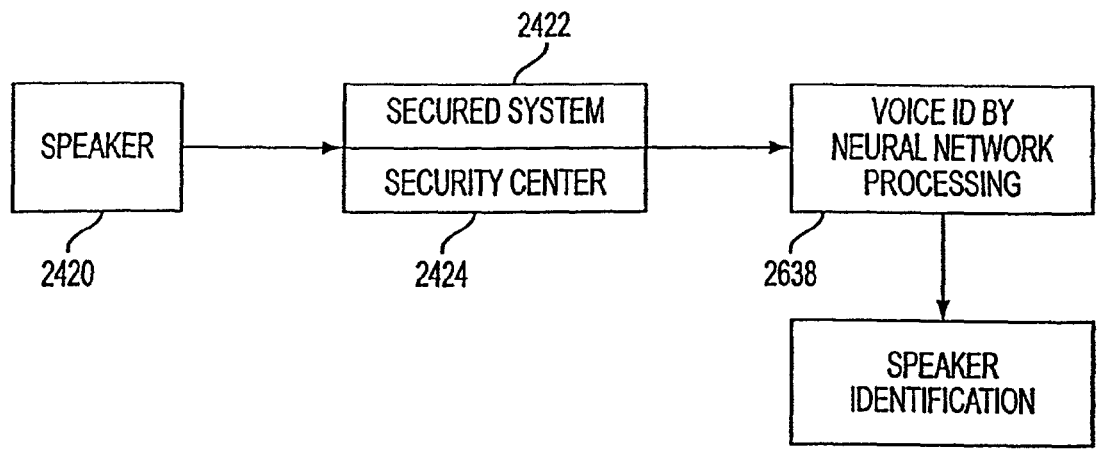
FIG. 26 illustrates a third step in the system set forth in FIG. 24.

FIG. 26 describes what follows. Security-center 2424, or preferably secured-system 2422, performs voice authentication of the incoming voice using a second voice authentication algorithm 2638, which is different from voice authentication algorithm 2530 used by security-center 2424, as described above with respect to FIG. 25.

For example, voice authentication algorithm 2638 may be a neural network voice authentication algorithm, as, for example, described in U.S. Pat. No. 5,461,697.

Again, the false rejection threshold is set to a low level, say below 0.5%, preferably 0.3 or 0.1%. Following the above rational and calculations, as a result, for algorithms having EER value of about 2%, the false acceptance level (e.g., for 0.3%) falls in the order of 4.6%.

In a preferred embodiment of the invention security-center 2424 and secured-system 2422 are physically removed. Since the process of identification in security-center 2424 prolongs some pre-selected time interval, activation of the simultaneous voice verification in secured-system 2422 occurs at t=.DELTA.T after the receipt of audio pitch 2536 at secured-system 2422. This time delay ensures that no identification will occur before the acknowledgment from security-center 2422 has been received.

Figure 27:
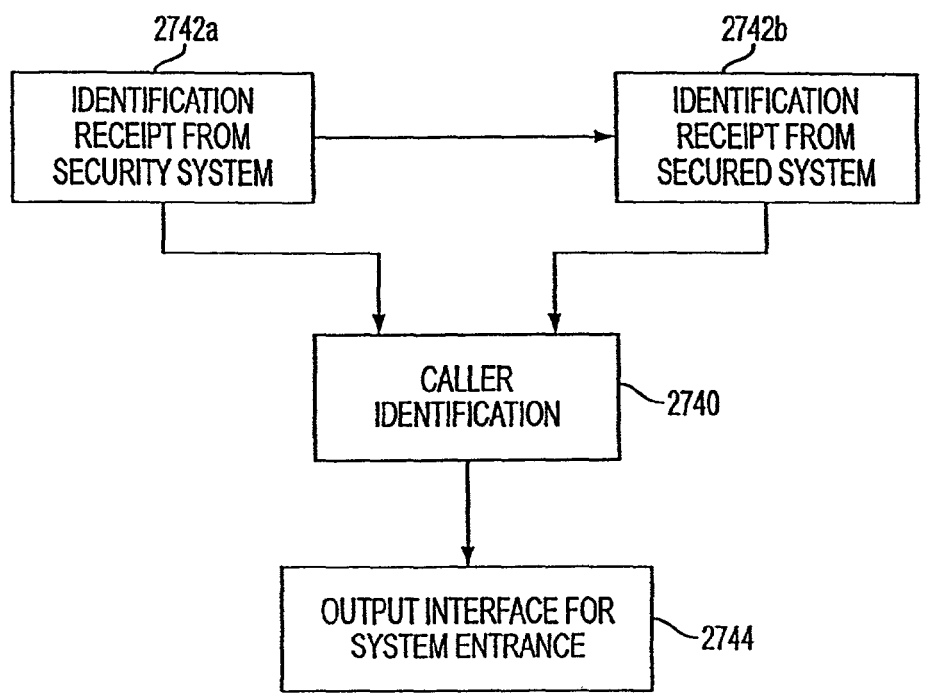
FIG. 27 illustrates a fourth step in the system of identifying a speaker set forth in FIG. 24.

As shown in FIG. 27, final speaker identification 2740 is established only when identification 2742a and 2742b is established by both security system 2424 and secured-system 2422, which results in accessibility of the speaker to secured-system 2422.

Thus, only if both security-center 2424 and secured-system 2422 have established positive voice verification, the speaker has been positively identified and the process has been positively completed and access to secured-system 2422 is, therefore, allowed, as indicated by 2744.

If one of the systems 2422 and 2424 fails to verify the speaker's voice, the process has not been positively completed and access to secured-system 2422 is, therefore, denied.

Voice Based System for Regulating Border Crossing

Figure 28:
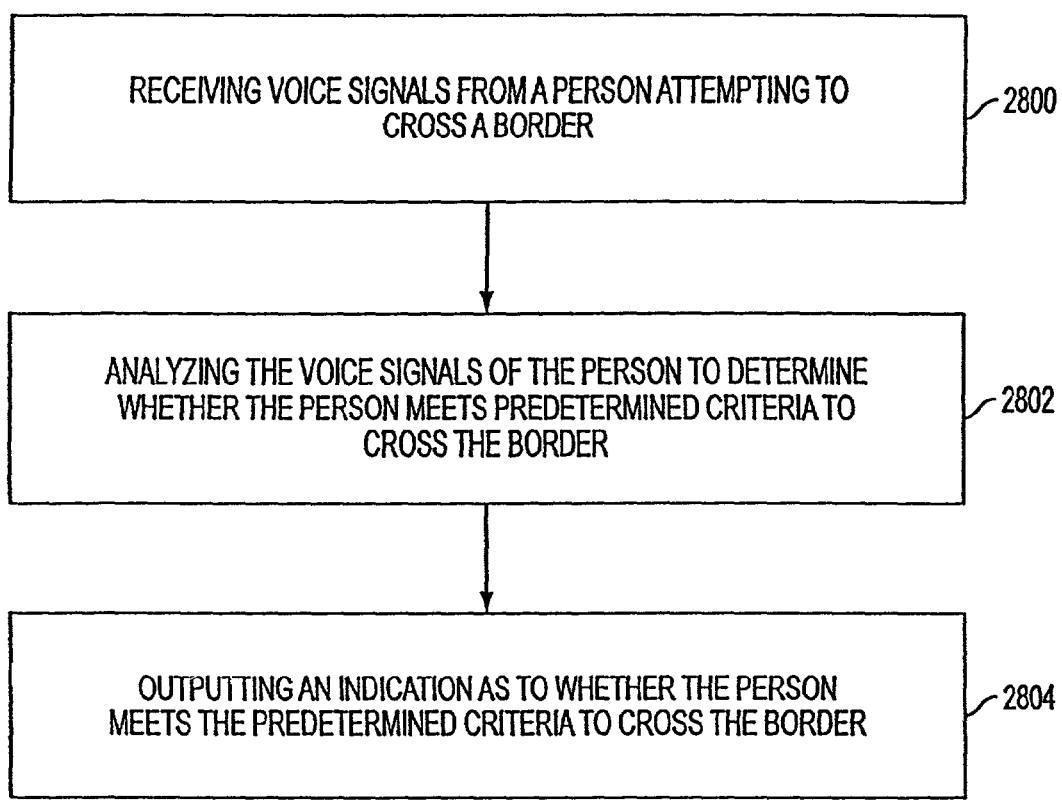
FIG. 28 is a flow chart depicting a method for determining eligibility of a person at a border crossing to cross the border based on voice signals.

FIG. 28 depicts a method for determining eligibility of a person at a border crossing to cross the border based on voice signals. First, in operation 2800, voice signals are received from a person attempting to cross a border. The voice signals of the person are analyzed in operation 2802 to determine whether the person meets predetermined criteria to cross the border. Then, in operation 2804, an indication is output as to whether the person meets the predetermined criteria to cross the border. A more detailed description of processes and apparatuses to perform these operations is found below.

In one embodiment of the present invention described in FIG. 28, an identity of the person is determined from the voice signals. This embodiment of the present invention could be used to allow those persons approved to cross a border pass across the border and into another country without having to present document-type identification. In such an embodiment, the predetermined criteria may include having an identity that is included on a list of persons allowed to cross the border. See the section entitled "VOICE-BASED IDENTITY AUTHENTICATION FOR DATA ACCESS" above for more detail on processes and apparatuses for identifying a person by voice as well as the methods and apparatus set forth above with reference to FIGS. 22-27 and below with reference to FIGS. 29-34.

The voice signals of the person are compared to a plurality of stored voice samples to determine the identity of the person. Each of the plurality of voice samples is associated with an identity of a person. The identity of the person is output if the identity of the person is determined from the comparison of the voice signal with the voice samples. Alternatively to or in combination with the identity of the person, the output could include a display to a border guard indicating that the person is allowed to pass. Alternatively, the output could unlock a gate or turnstile that blocks the person from crossing the border or otherwise hinders passage into a country's interior.

In another embodiment of the present invention described in FIG. 28, emotion is detected in the voice signals of the person. Here, the predetermined criteria could include emotion-based criteria designed to help detect smuggling and other illegal activities as well as help catch persons with forged documents. For example, fear and anxiety could be detected in the voice of a person as he or she is answering questions asked by a customs officer, for example. Another of the emotions that could be detected is a level of nervousness of the person. See the previous sections about detecting emotion in voice signals for more detail on how such an embodiment works.

Figure 29:
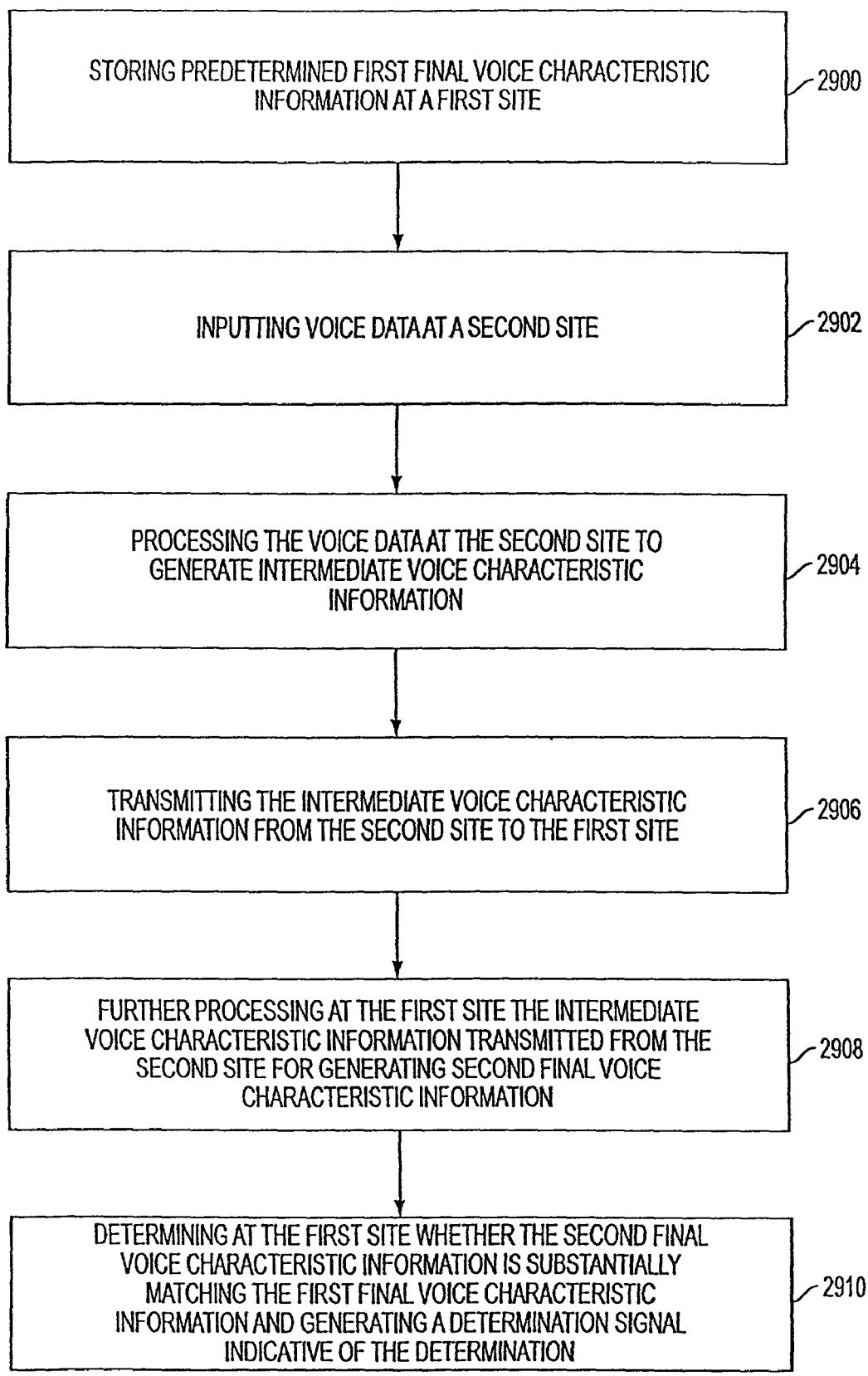
FIG. 29 illustrates a method of speaker recognition according to one aspect of the present invention.

FIG. 29 illustrates a method of speaker recognition according to one aspect of the current invention. In operation 2900, predetermined first final voice characteristic information is stored at a first site. Voice data is input at a second site in operation 2902. The voice data is processed in operation 2904 at the second site to generate intermediate voice characteristic information. In operation 2906, the intermediate voice characteristic information is transmitted from the second site to the first site. In operation 2908, a further processing at the first site occurs of the intermediate voice characteristic information transmitted from the second site for generating second final voice characteristic information. In operation 2910, it is determined at the first site whether the second final voice characteristic information is substantially matching the first final voice characteristic information and a determination signal indicative of the determination is generated.

Figure 30:
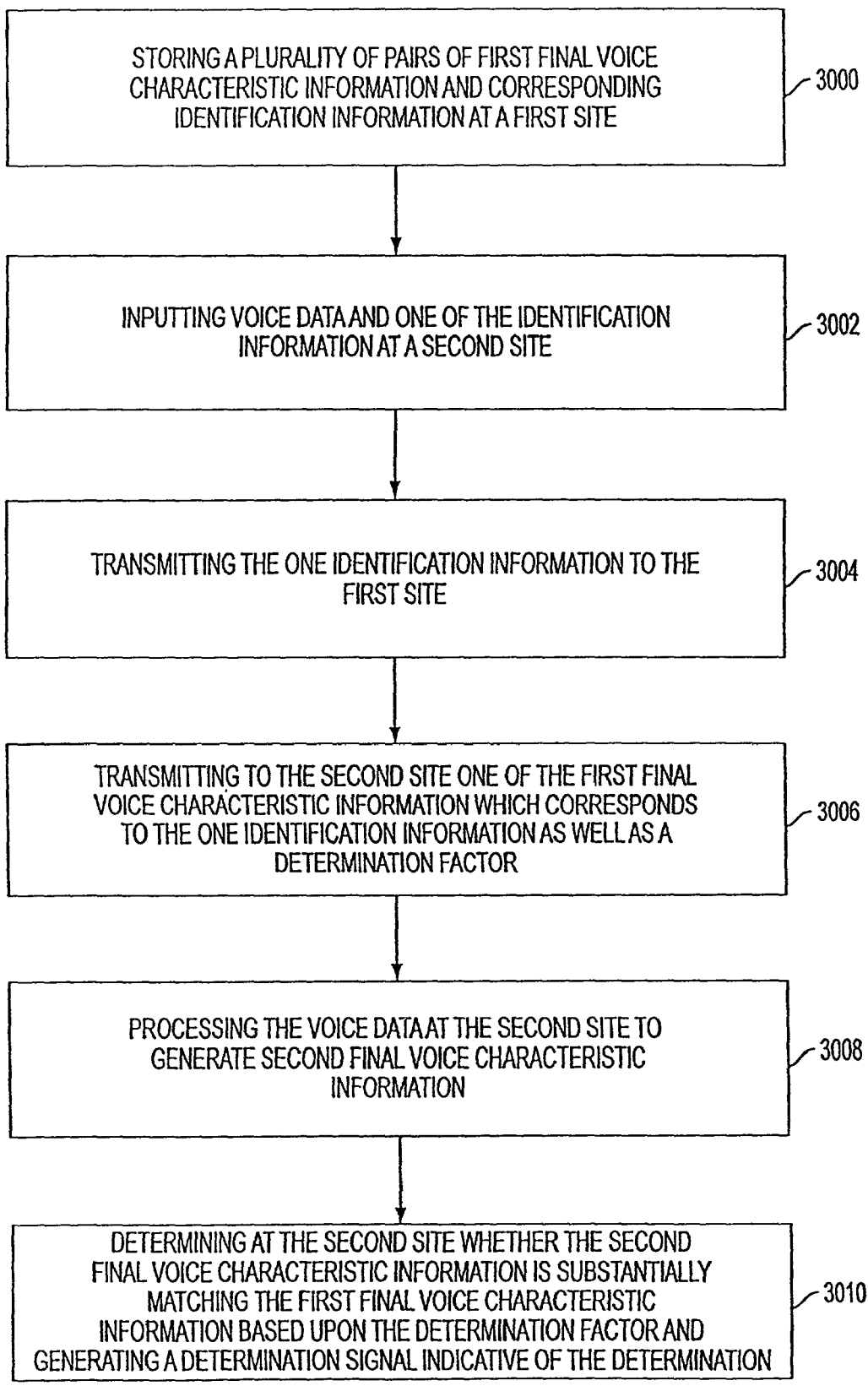
FIG. 30 illustrates another method of speaker recognition according to one aspect of the present invention.

According to a second aspect of the current invention, FIG. 30 depicts a method of speaker recognition. In operation 3000, a plurality of pairs of first final voice characteristic information and corresponding identification information is stored at a first site. In operation 3002, voice data and one of the identification information are input at a second site. The one identification information is transmitted to the first site in operation 3004. In operation 3006, transmitted to the second site is one of the first final voice characteristic information which corresponds to the one identification information as well as a determination factor. The voice data is processed in operation 3008 at the second site to generate second final voice characteristic information. In operation 3010, it is determined at the second site whether the second final voice characteristic information is substantially matching the first final voice characteristic information based upon the determination factor and generating a determination signal indicative of the determination.

According to a third aspect of the current invention, a speaker recognition system, includes: a registration unit for processing voice data to generate standard voice characteristic information according the voice data and storing the standard voice characteristic information therein; a first processing unit for inputting test voice data and for processing the test voice data to generate intermediate test voice characteristic information; and; a second processing unit communicatively connected to the first processing unit for receiving the intermediate test voice characteristic information and for further processing the intermediate test voice characteristic information to generate test voice characteristic information, the processing unit connected to the registration processing unit for determining if the test voice characteristic information substantially matches the standard voice characteristic information.

According to a fourth aspect of the current invention, a speaker recognition system, includes: a first processing unit for processing voice data to generate standard voice characteristic information according the voice data and storing the standard voice characteristic information with an associated id information, a second processing unit operationally connected to the first processing unit for inputting the associated id information and test voice data, the second processing unit transmitting to the first processing unit the associated id information, the second processing unit retrieving the standard voice characteristic information, the second processing unit generating a test voice characteristic information based upon the test voice data and determining that the standard voice characteristic information substantially matches the test voice characteristic information.

Figure 31:
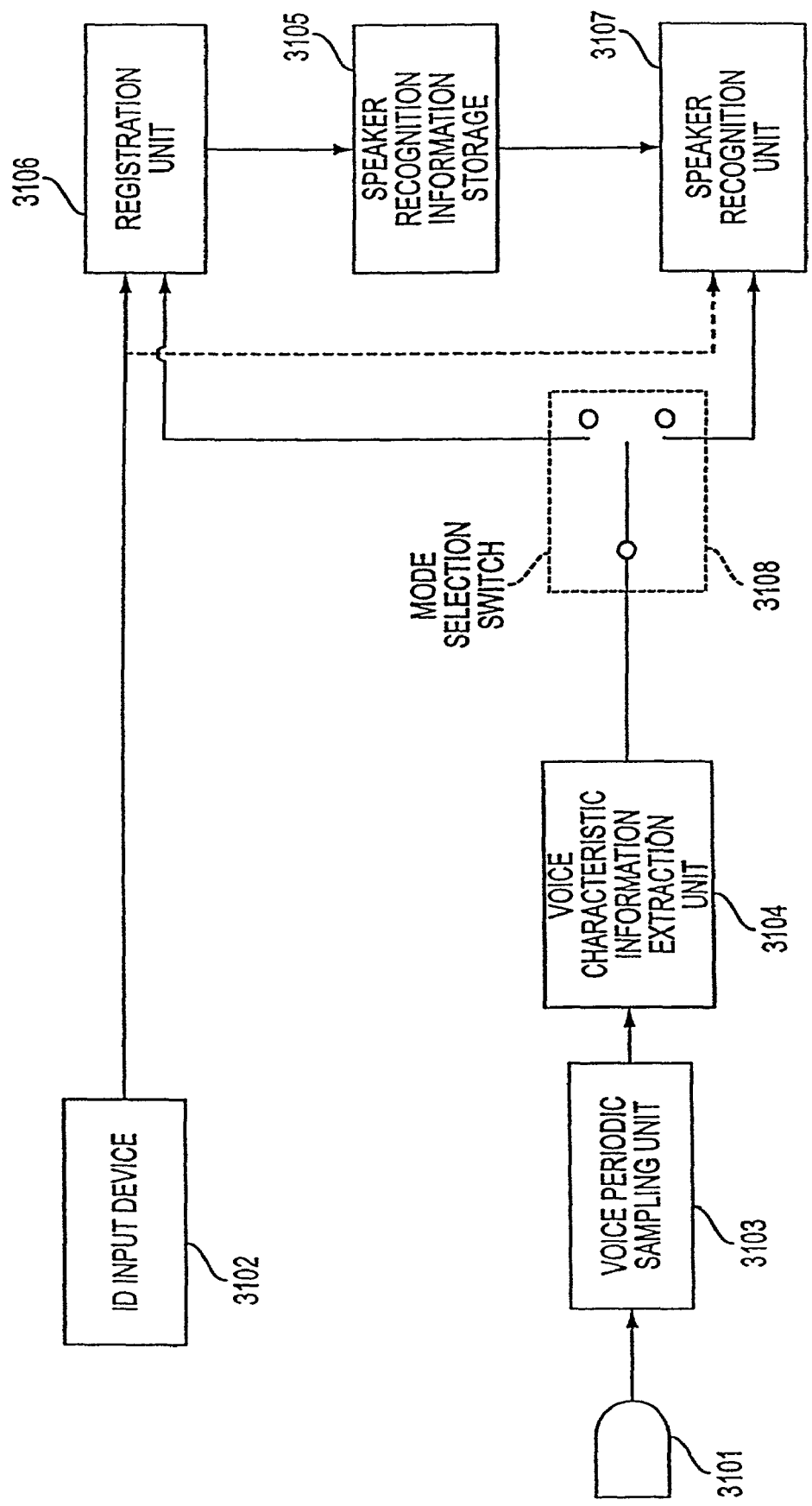
FIG. 31 illustrates basic components of a speaker recognition system.

Referring now to the drawings and referring in particular to FIG. 31, to describe the basic components of the speaker recognition, a user speaks to a microphone 3101 to input his or her voice. A voice periodic sampling unit 3103 samples voice input data at a predetermined frequency, and a voice characteristic information extraction unit 3104 extracts predetermined voice characteristic information or a final voice characteristic pattern for each sampled voice data set. When the above input and extraction processes are performed for a registration or initiation process, a mode selection switch 3108 is closed to connect a registration unit 3106 so that the voice characteristic information is stored as standard voice characteristic information of the speaker in a speaker recognition information storage unit 3105 along with speaker identification information.

Figure 32:
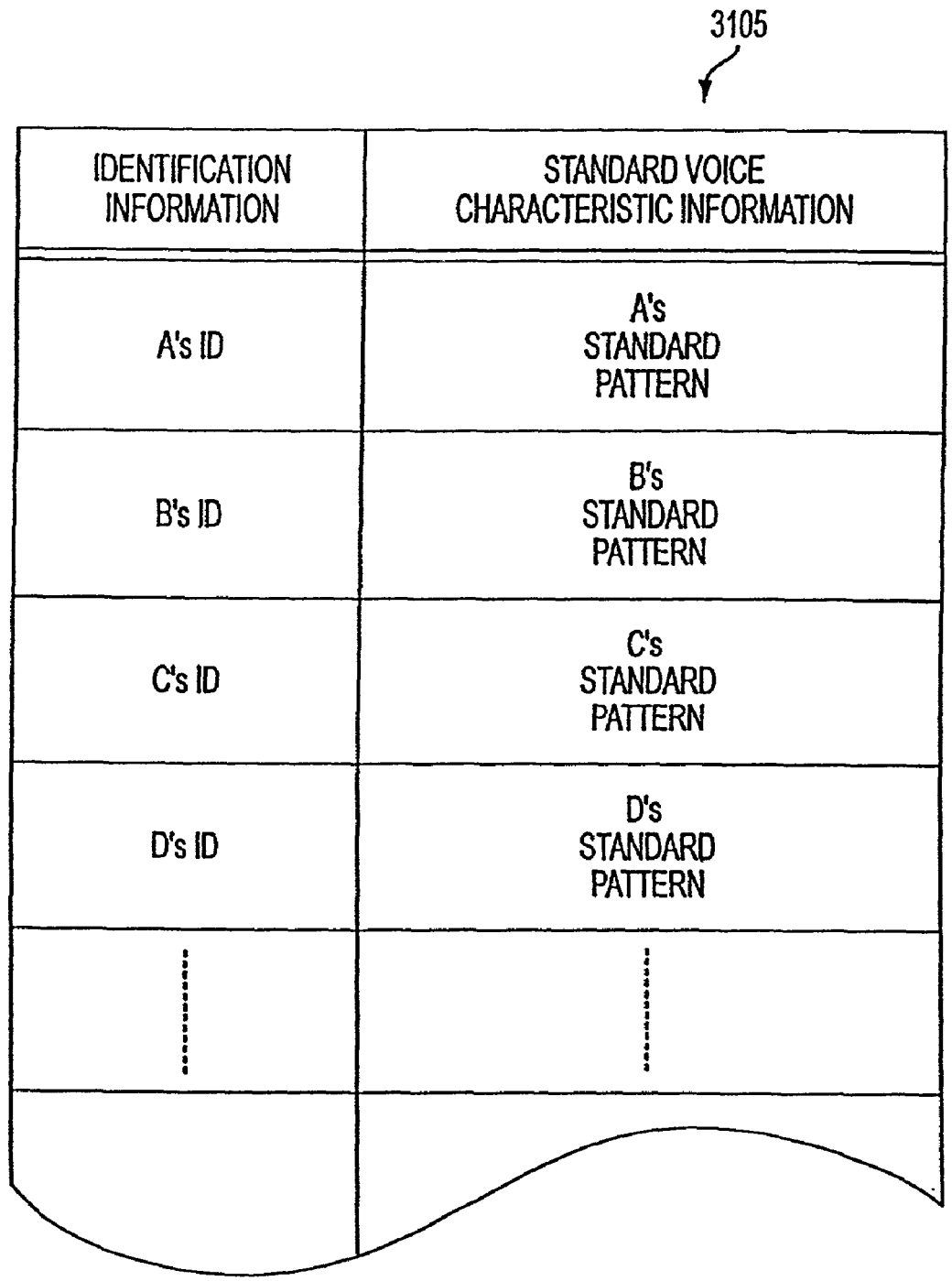
FIG. 32 illustrates an example of the stored information in the speaker recognition information storage unit of FIG. 31.

Referring now to FIG. 32, an example of the stored information in the speaker recognition information storage unit 3105 is illustrated. Speaker identification information includes a speaker's name, an identification number, the date of birth, a social security number and so on. In the stored information, corresponding to each of the above speaker identification information is the standard voice characteristic information of the speaker. As described above, the standard voice characteristic information is generated by the voice processing units 3103 and 3104 which extracts the voice characteristics pattern from the predetermined voice data inputted by the speaker during the registration process. The final voice characteristic information or the voice characteristic pattern includes a series of the above described voice parameters.

Referring back to FIG. 31, when the mode selection switch is closed to connect a speaker recognition unit 3107, a speaker recognition process is performed. To be recognized as a registered speaker, a user first inputs his or her speaker identification information such as a number via an identification input device 3102. Based upon the identification information, the registration unit 3106 specifies the corresponding standard voice characteristic information or a final voice characteristic pattern stored in the speaker recognition information storage unit 3105 and transmits it to a speaker recognition unit 3107. The user also inputs his or her voice data by uttering a predetermined word or words through the microphone 3101. The inputted voice data is processed by the voice periodic sampling unit 3103 and the voice characteristic parameter extraction unit 3104 to generate test voice characteristic information. The speaker recognition unit 3107 compares the test voice characteristic information against the above specified standard voice characteristic information to determine if they substantially match. Based upon the above comparison, the speaker recognition unit 3107 generates a determination signal indicative the above substantial matching status.

The above described and other elements of the speaker recognition concept are implemented for a computer or telephone networks according to the current invention. The computer-network based speaker recognition systems are assumed to have a large number of local processing units and at least one administrative processing unit. The network is also assumed to share a common data base which is typically located at a central administrative processing unit. In general, the computer-network based speaker recognition systems have two ends of a spectrum. One end of the spectrum is characterized by heavy local-processing of the voice input while the other end of the spectrum is marked by heavy central-processing of the voice input. In other words, to accomplish the speaker recognition, the voice input is processed primarily by the local-processing unit, the central-processing unit or a combination of both to determine whether it substantially matches a specified previously registered voice data. However, the computer networks used in the current invention is not necessarily limited to the above described central-to-terminal limitations and include other systems such as distributed systems.

Figure 33:
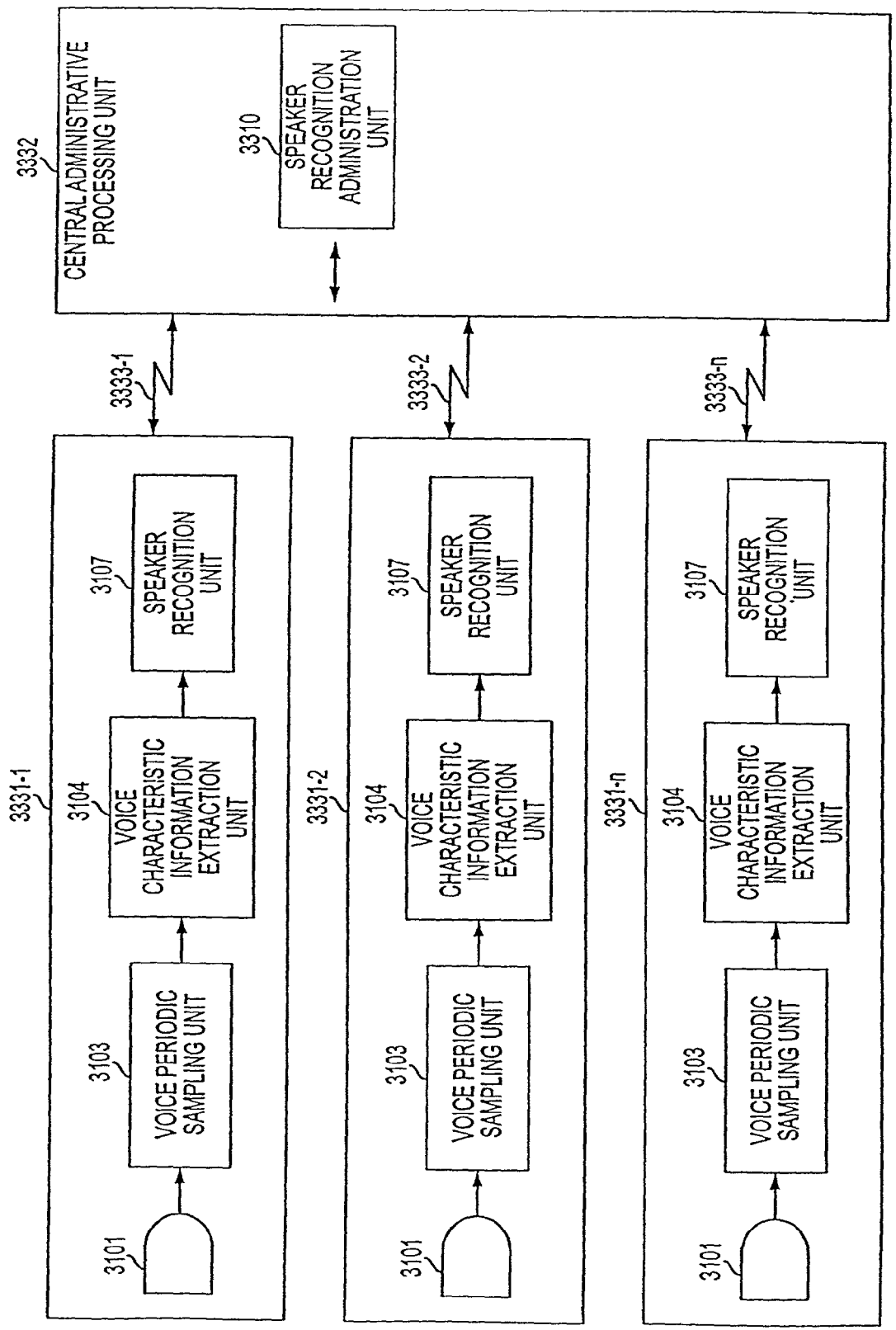
FIG. 33 depicts a preferred embodiment of a speaker recognition system in accordance with one embodiment of the present invention.

Now referring to FIG. 33, one preferred embodiment of the speaker recognition system is illustrated according to the current invention. Local-processing units 3331-1 through 3331-*n* are respectively connected to an administrative central processing unit 3332 by network lines 3333-1 through 3333-*n*. The local-processing units 3331-1 through 3331-*n* each contain a microphone 3101, a voice periodic sampling unit 3103, a voice characteristic parameter extraction unit 3104, and a speaker recognition unit 3107. Each of the local-processing units 3331-1 through 3331-*n* is capable of inputting voice data and processing the voice input to determine whether or its characteristic pattern substantially matches a corresponding standard voice characteristic pattern.

The administrative central processing unit 3332 includes a speaker recognition data administration unit 3310 for performing the administrative functions which include the registration and updating of the standard voice characteristic information.

Figure 34:
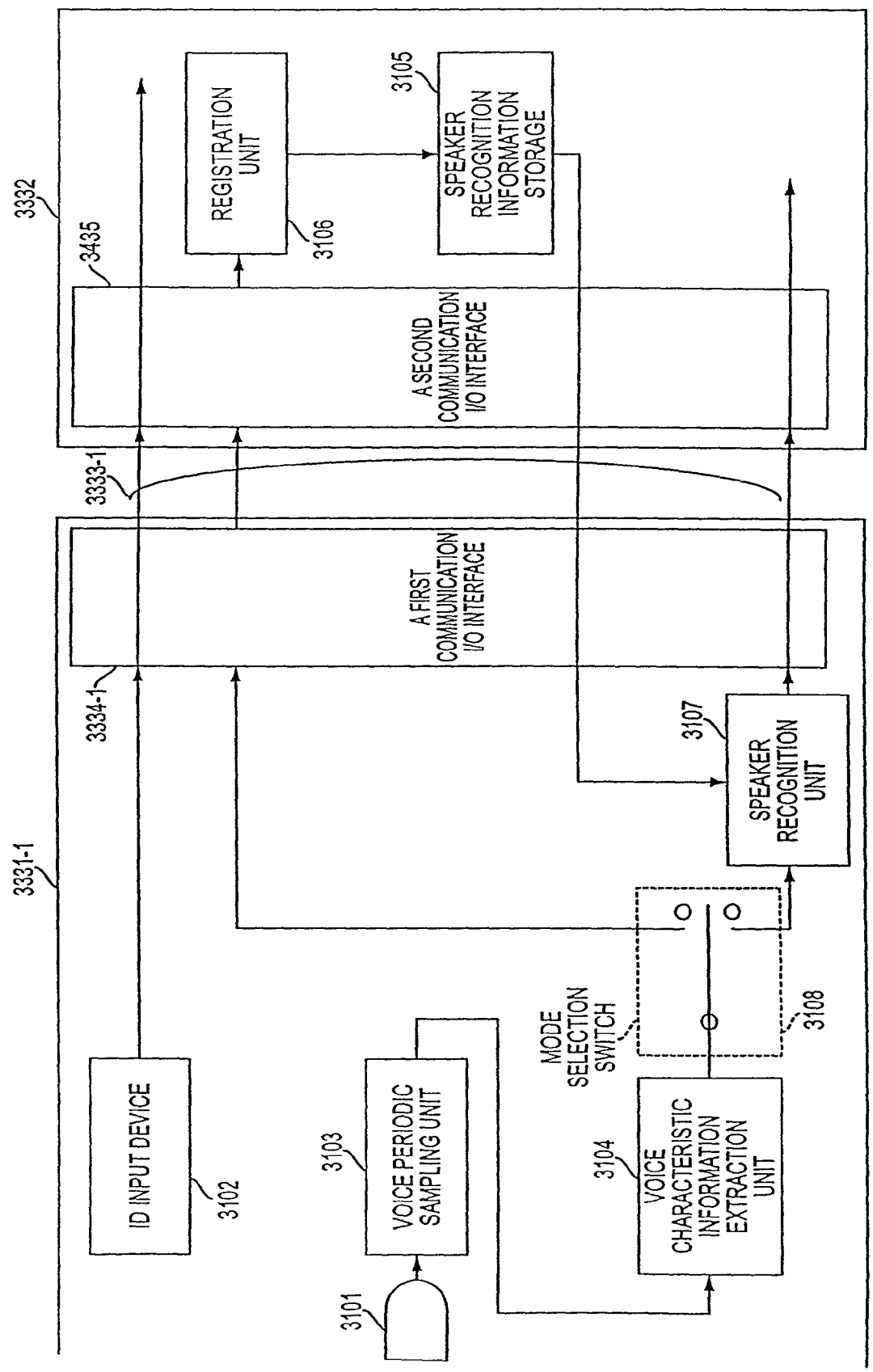
FIG. 34 describes in further detail the embodiment of the speaker recognition system of FIG. 33.

Now referring to FIG. 34, the above described preferred embodiment of the speaker recognition system is further described in details. For the sake of simplicity, only one local processing unit 3331-1 is further illustrated additional components. For the local processing unit 3331-1 to communicate with the administrative processing unit 3332 through the communication line 3333-1, the local processing unit 3334-1 provides a first communication input/output (I/O) interface unit 3334-1. Similarly, the administrative processing unit 3332 contains a second communication VO interface unit 3435 at the other end of the communication line 3333-1. In the following, the registration and the recognition processes are generally described using the above described preferred embodiment.

To register standard voice characteristic information, the user inputs voice data by uttering a predetermined set of words through the microphone 3101 and a user identification number through the ID input device 3102. The mode switch 3108 is placed in a registration mode for transmitting the processed voice characteristic information to the registration unit 3106 via the interfaces 3334-1, 3435 and the communication line 3333-1. The registration unit 3106 controls the speaker recognition information storage unit 3105 for storing the voice characteristic information along with the speaker identification number.

To later perform the speaker recognition process, a user specifies his or her user ID information via the user ID input device 3102. The input information is transmitted to the administrative processing unit 3332 through the interfaces 3334-1, 3435 and the communication line 3333-1. In response, the administrative processing unit 3332 sends to the speaker recognition unit 3107 the standard voice characteristic information corresponding to the specified user ID. The selection mode switch is set to the speaker recognition mode to connect the speaker recognition unit 3107. The user also inputs his or her voice input through the microphone 3101, and the periodic sampling unit 3103 and the voice characteristic information extraction unit 3104 process the voice input for generating the test voice characteristic information and outputting to the speaker recognition unit 3107. Finally, the speaker recognition unit 3107 determines as to whether the test voice characteristic information substantially match the selected standard voice characteristic information. The determination is indicated by an output determination signal for authorizing the local processing unit 3331-1 to proceed further transaction involving the administrative processing unit 3332. In summary, the above described preferred embodiment substantially processes the input voice data at the local processing unit.

Voice-Enabled Control And Navigation on the Internet

Figure 35:
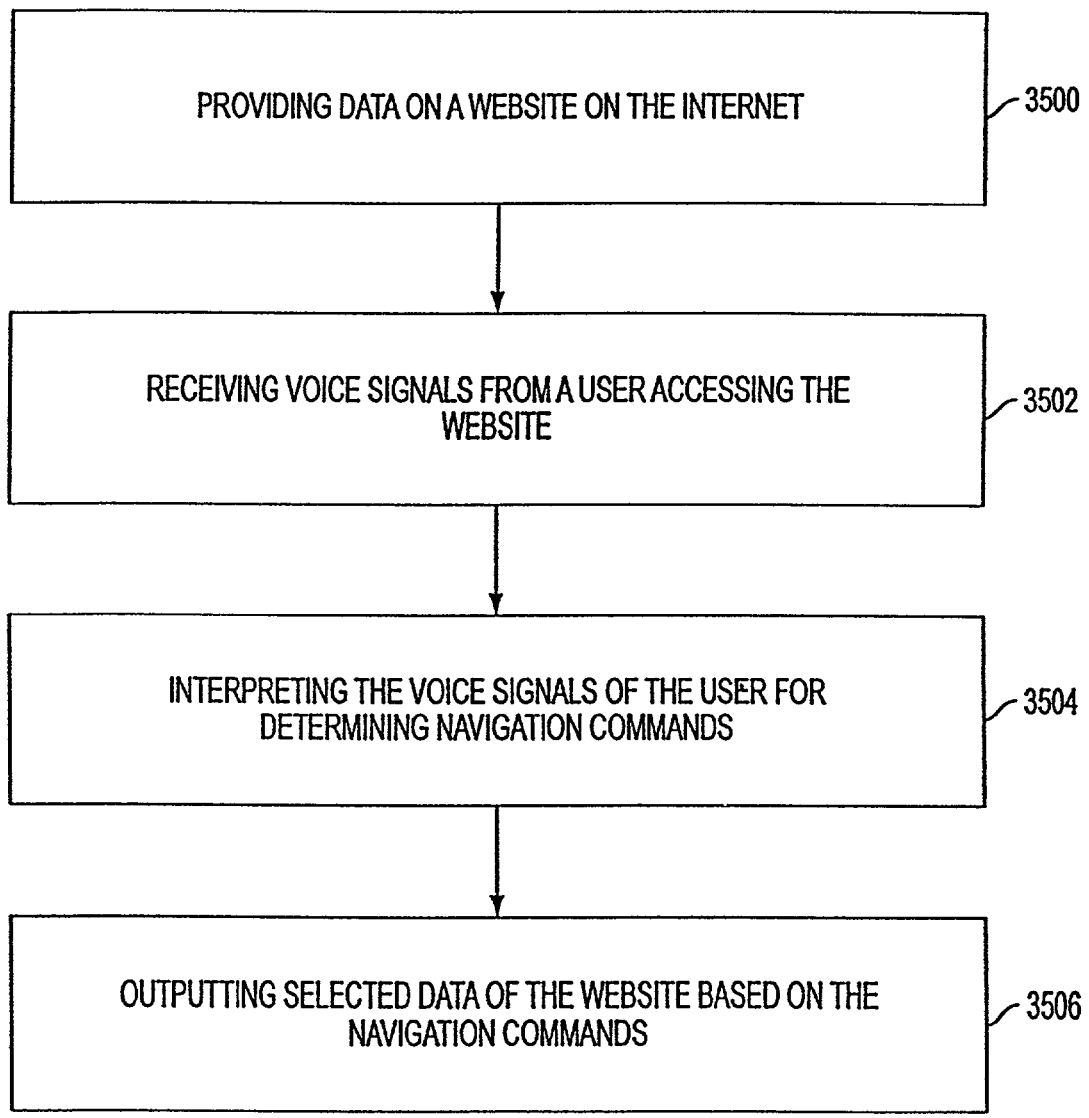
FIG. 35 is a flow chart that illustrates a method for recognizing voice commands for manipulating data on the Internet.

FIG. 35 illustrates a method for recognizing voice commands for manipulating data on the Internet. First, in operation 3500, data is provided on a website. In operation 3502, voice signals are received from a user who is accessing the website. These voice signals are interpreted in operation 3504 to determine navigation commands. Selected data of the website is output in operation 3506 based on the navigation commands.

In one embodiment of the present invention, the data includes a voice-activated application. In such an embodiment, the navigation commands may control execution of the application. In one example of an application of the invention, Internet banking via voice signals may be allowed.

The user may be allowed to access the website from either a computer or a telephone, or both. Optionally, the selected data may be output to a telephone. Such an embodiment could be used for messaging services. For example, speech to text technology may be used to "write" email over a telephone and without the need for a display. Text to speech technology could also be used to "read" email over a telephone.

A language may be determined from the voice signals. Then, the voice signals would be interpreted in the language being spoken by the user in order to determine the commands. This would be particularly useful in an international customer service system on the Internet. As an option, artificial intelligence may be utilized to interact with the user, including spoken replies and the like.

Voice Controlled Content and Applications

Figure 36:
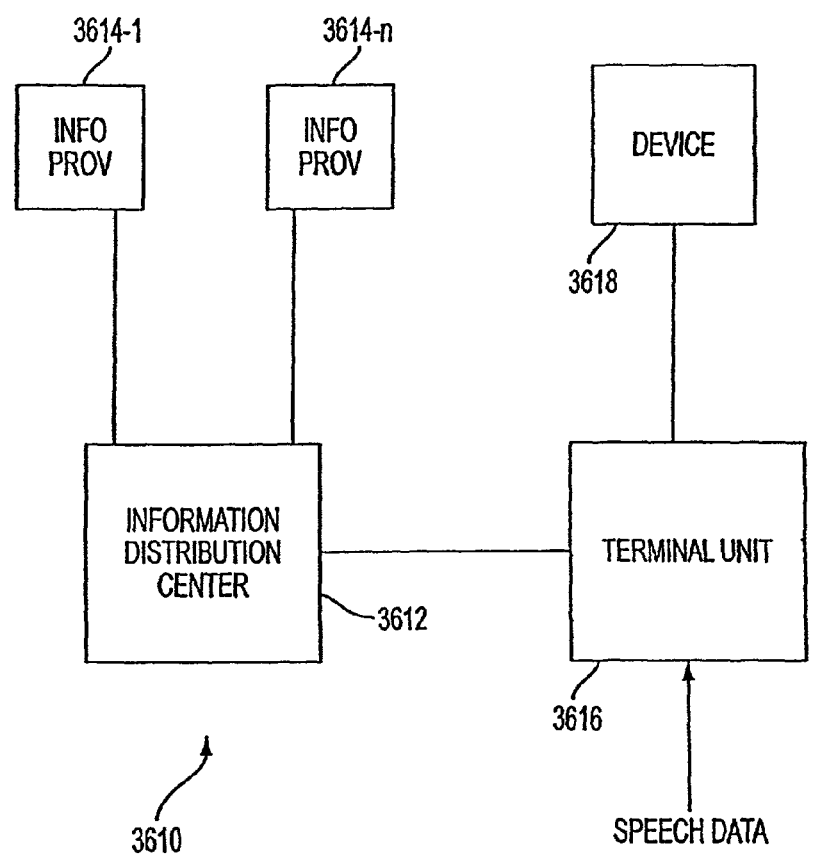
FIG. 36 is a generalized block diagram of an information system in accordance with an embodiment of the invention for controlling content and applications over a network via voice signals.

FIG. 36 is a generalized block diagram of an information system 3610 in accordance with an embodiment of the invention for controlling content and applications over a network via voice signals. Information system 3610 includes an information distribution center 3612 which receives information from one or more remotely located information providers 3614-1, . . . , 3614-*n* and supplies or broadcasts this information to a terminal unit 3616. "Information" as used herein includes, but is not limited to, analog video, analog audio, digital video, digital audio, text services such as news articles, sports scores, stock market quotations, and weather reports, electronic messages, electronic program guides, database information, software including game programs, and wide area network data. Alternatively or in addition, information distribution center 3612 may locally generate information and supply this locally generated information to terminal unit 3616.

The information transmitted by information distribution center 3612 to terminal unit 3616 includes vocabulary data representative of a vocabulary of spoken sounds or words ("utterances"). This vocabulary provides, for example, for spoken control of a device 3618 and for spoken control of access to the information transmitted by information distribution center 3612. Specifically, terminal unit 3616 receives vocabulary data from information distribution center 3612 and speech ("utterance") data from a user. Terminal unit 3616 includes a processor for executing a speech recognition algorithm for comparing the vocabulary data and the spoken command data to recognize, for example, commands for controlling device 3618 or commands for accessing information transmitted by information distribution center 3612. Terminal unit 3616 then appropriately generates a command for controlling device 3618 or for accessing information transmitted by information distribution center 3612. As used herein, a speech recognition algorithm refers to an algorithm which converts spoken audio input into text or corresponding commands. A speaker verification algorithm refers to an algorithm which verifies the claimed identity of a speaker based upon a sample of the claimant's speech. A speaker identification algorithm refers to an algorithm which identifies a speaker from a list of previously sampled alternatives based upon audio input from a speaker. A speaker identification algorithm may be used, for example, to limit the ability to control the device and/or access information to particular speakers.

The vocabulary data transmitted from information distribution center 3612 to terminal unit 3616 may, for example, be phoneme data. A phoneme is a member of the set of the smallest units of speech that serve to distinguish one utterance from another in a language or dialect. Each sound or spoken word in the vocabulary may thus be represented by a combination of phonemes. Alternatively, the vocabulary data may be template data generated by having a person or persons speak each sound or word. Each spoken sound or word in the vocabulary may thus be represented by a respective corresponding template. It should be noted that although the system of FIG. 36 illustrates a system in which information from information providers 3614-1, . . . , 3614-n and the vocabulary data are transmitted over the same communication link, the invention is not limited in this respect. Thus, information from information service providers 3614-1, . . . , 3614-n and the vocabulary data may be transmitted over different communications links.

Many different arrangements may be utilized to provide the speech data to terminal unit 3616. In a first illustrative, but non-limiting, arrangement, a remote control is provided which includes a wireless microphone or related transducer for transmitting sounds or words spoken by a user to terminal unit 3616 via electrical, optical, or radio frequency signals. Terminal unit 3616 then includes a receiver, an analog front end for conditioning the received signal, a codec for performing an analog-to-digital conversion of the conditioned signal, and an interface circuit for interfacing to the processor. By conditioning is meant noise cancellation, noise reduction, filtering, and other known techniques for, for example, modifying a received electrical signal originating from a voice transducer. In a second illustrative arrangement, a remote control is provided with a microphone, an analog receiver for conditioning the sound signal from the microphone, a codec for performing an analog-to-digital conversion of the conditioned signal, and a transmitter for transmitting the digitized sound data signal to terminal unit 3616 using, for example, infrared or radio frequency signals. Terminal unit 3616 then includes a receiver for receiving the digitized sound data signal and an interface circuit for interfacing to the processor. The digitized sound data signal will typically require a data transfer rate of at least 64 k bits per second. In a third illustrative arrangement, a remote control is provided with a microphone, an analog receiver for conditioning the sound signal from the microphone, a codec for performing an analog-to-digital conversion of the conditioned signal, a digital signal processor for analyzing the digitized sound signal to extract spectral data, and a transmitter for transmitting the spectral data to terminal unit 3616 using, for example, infrared signals. Terminal unit 3616 then includes a receiver for receiving the spectral data and an interface circuit for interfacing to the processor. Because spectral data is transmitted in this third arrangement as opposed to the digitized sound data in the second arrangement, the data rate is much lower, i.e., less than 3610 k bits per second. Because spectral analysis is performed in the remote control, the loading of the processor of terminal unit 3616 is reduced during the recognition operation by 30-50% as compared with the second arrangement. In a fourth illustrative arrangement, terminal unit 3616 is provided with a microphone, an analog front end to condition the sound signal from the microphone, a codec to perform an analog-to-digital conversion of the conditioned signal, and an interface circuit for interfacing to the processor. In a fifth illustrative arrangement, terminal unit 3616 is provided with a microphone, an analog front end to condition the sound signal from the microphone, a codec to perform an analog-to-digital conversion of the conditioned signal, a digital signal processor for analyzing the digitized sound signal to extract spectral data, and an interface circuit for interfacing to the processor bus. The digital signal processor in the fifth arrangement is used to lower loading on the processor of terminal unit 3616 as compared with the fourth arrangement. These various arrangements are illustrative only and other arrangements may be utilized to provide speech data to terminal unit 3616 within the scope of the instant invention.

The vocabulary data transmitted by information distribution center 3612 may define commands which a user may speak to control device 3618. Device 3618 may be any device which is capable of being operated in response to user-supplied commands and the instant invention is not limited in this respect. Thus, device 3618 may be, for example, a television, a stereo receiver, a video cassette recorder, an audio cassette recorder, a compact disc (CD) player, a video disc player, a video game player, or a computer. As an illustration, assume that device 3618 is a computer which is plugged into a switched power outlet of terminal unit 3616 and that it is desired to allow a user to control the on and off switching of the computer by speaking the commands "POWER ON" and "POWER OFF", respectively. Information distribution center 3612 would then transmit to terminal unit 3616 phonemic or template vocabulary data defining a command vocabulary having the words POWER, ON, and OFF. When the user says either "POWER ON" or "POWER OFF" and the speech data corresponding to the command is provided to terminal unit 3616 using any of the arrangements described above, the processor of terminal unit 3616 executes the speech recognition algorithm to compare the spoken command with the phonemic or template data representing the command vocabulary in order to recognize the spoken command. Terminal unit 3616 then appropriately controls device 3618, i.e., either switching the computer on or off. Since the computer is plugged into a switched power outlet of terminal unit 3616 as described above, the on and off switching of the computer is implemented internally to terminal unit 3616. However, the instant invention is also applicable to situations where the recognized command is passed to device 3618 for execution via a communication link. Such a communication link may, for example, be the Internet, an infrared link, an RF link, a coaxial cable, a telephone network, a satellite system, or an optical fiber and the invention is not limited in this respect.

The vocabulary data may alternatively or additionally define words and commands which a user may speak to access information transmitted from information distribution center 3612. This feature permits a user to perform tasks which would be very difficult to perform with a menu driven user interface. For example, this feature can be used to perform a keyword search of the titles of news articles transmitted from information distribution center 3612 using a "SEARCH KEYWORDS" command. Specifically, information distribution center 3612 determines which individual words are to serve as the keywords and generates a phonemic or template "dictionary" which maps these keywords to phonemes or templates. Information distribution center 3612 transmits the news articles and the dictionary to terminal unit 3616 where they are stored in memory. For each keyword, terminal unit 3616 generates the corresponding phonemic or template string using the dictionary. The string is then "registered" with the speech recognition algorithm as a single recognizable utterance, i.e., it becomes a basic part of the speech recognition algorithm's vocabulary. The registration includes specifying an identifier for the phonemic or template string which could be a numerical value or the keyword itself When the user then speaks the "SEARCH KEYWORDS" command, a display dedicated to this command is provided, for example, on a display device associated with terminal unit 3616 or on a computer connected to terminal unit 3616. The user may then speak a command "ONLY KEYWORD" to limit the search by terminal unit 3616 to news articles transmitted by information distribution center 3612 having the spoken KEYWORD in the title. The user may then speak additional keywords to refine the search or may view the news articles having the spoken keyword in the title. It can readily be seen that performing such a task using a conventional menu driven user interface would be extremely difficult.

Figure 37A:
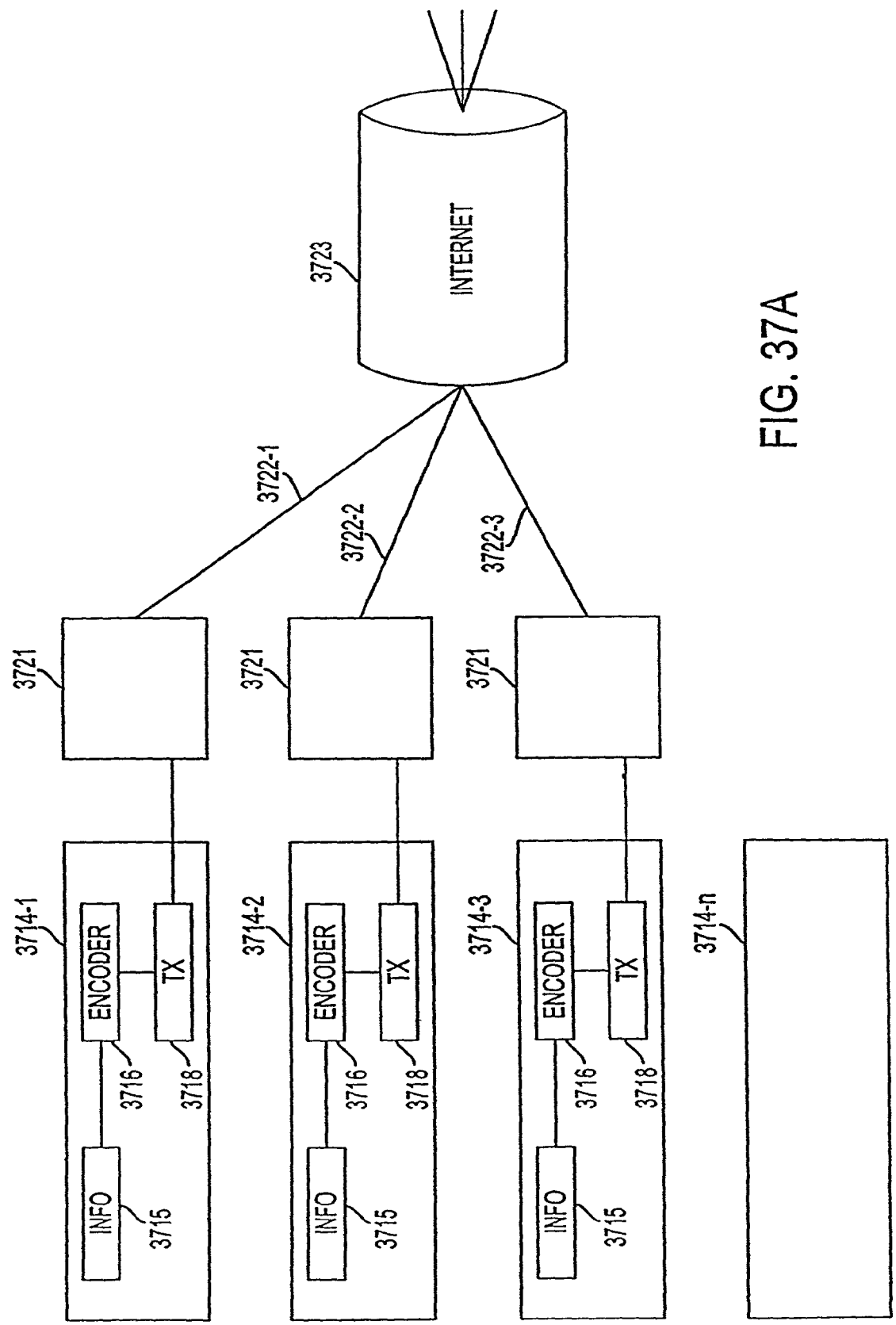
Figure 37B:
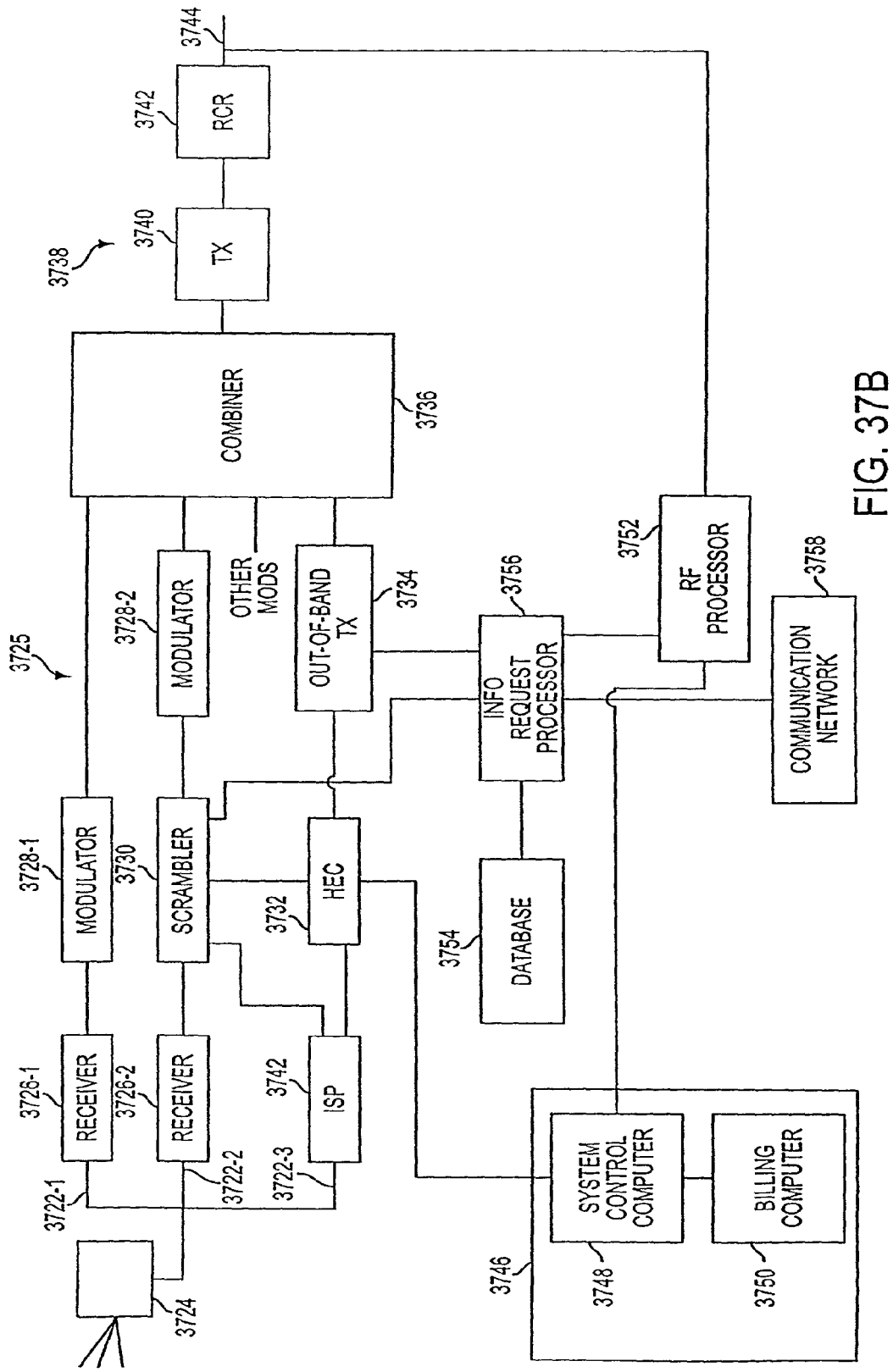

FIGS. 37A, 37B, and 37C are a block diagram of a subscription television system in which the instant invention is incorporated. It will of course be apparent that the instant invention may be applied to information systems other than a subscription television system and the invention is not limited in this respect. A subscription television system provides information to a plurality of subscriber locations, e.g., 3720-1, . . . , 3720-n (see FIG. 37C). The information may include, but is not limited to analog video, analog audio, digital video, digital audio, text services such as news articles, sports scores, stock market quotations, and weather reports, electronic messages, electronic program guides, database information, software including game programs, and wide area network data. Referring to FIG. 37A, subscription television system includes a plurality of information providers 3714-1, . . . , 3714-n each of which may supply one or more of the information types identified above. For example, information provider 3714-2 includes an information source 3715 for providing an analog television signal to a transmitter 3718. Transmitter 3718 is coupled to an Internet uplink 3721 which transmits an analog television signal 3722-2. Information providers 3714-1 and 3714-3 each provide digital information from an information source 3715 to a respective encoder 3716 that generates an encoded data stream for transmission. Information source 3715 of information providers 3714-1 and 3714-3 may be a memory such as an optical memory for storing information. If either of information providers 3714-1 and 3714-3 provides a variety of information, e.g., a plurality of different game programs or different types of text services or a plurality of digital television or audio programs, encoder 3716 may multiplex the information to generate a multiplexed data stream for transmission. The data stream from encoder 3716 is supplied to a transmitter 3718 and then to an Internet uplink 3721. By way of example FIG. 37A, the encoder 3716 operated by information provider 3714-1 generates a digital data signal 3722-1 and the encoder 3716 operated by information provider 3714-3 generates a digital data signal 3722-3. Each signal 3722-1, 3722-2, and 3722-3 is transmitted via the Internet 3723 to a head-end installation 3725 (see FIG. 37B). It is understood that there may be many information providers in the system of the instant invention, and therefore a plurality of signals may be transmitted via the Internet 3723 to locations such as head-end installation 3725. Although not shown, signals may be received at locations other than a head-end installation, such as, for example, at the locale of a direct broadcast service (DBS) subscriber. In addition, while the link between the information providers and the head-end installation is shown as a network link, the invention is not limited in this respect. Accordingly, this link may, for example, be a coaxial cable, a telephone network, a satellite system, the Internet, a radio frequency (RF) link, or an optical fiber or any combination thereof. Further, while the information providers of FIG. 37A are remotely located from head-end installation 3725, one or more information providers may be physically located at the same site as head-end installation 3725.

Referring to FIG. 37B, an Internet down-link 3724 at head-end installation 3725 provides received signals 3722-1, 3722-2, and 3722-3. Head-end installation 3725 serves as a communications hub, interfacing to the various information providers, and connecting them on a conditional basis to subscriber locations 3720-1, . . . , 3720-n. For example, received digital data signal 3722-1 is supplied to a receiver 3726-1 and then to a modulator 3728-1, where it is modulated onto a distinct cable channel. Modulator 3728-1 may employ any suitable modulation technique such as quadrature partial response (QPR) modulation. Received analog television signal 3722-2 is supplied to a receiver 3726-2, then to a scrambler 3730 for scrambling, and then to a modulator 3728-2, where it is modulated into a distinct cable channel. As will be discussed in detail below, scrambler 3730 also inserts in-band data into analog television signal 3722-2. It will be apparent that additional receivers, modulators, and, optionally, scramblers may be similarly provided for digital and analog information signals received from other information providers, either local or remote (not shown).

Received digital data signal 3722-3 is provided to an information signal processor (ISP) 3742 so that it may be transmitted using so-called in-band or out-of-band transmissions. Other data streams (not shown) from other information providers may also be provided to ISP 3742. ISP 3742 is responsible for receiving the one or more data signals and then transmitting data to the subscriber terminal locations as will now be described. ISP 3742 provides data to scrambler 3730. ISP 3742 may provide data to additional scramblers depending on factors such as the amount of data to be transmitted and the speed at which the data must be supplied and updated. Data is repetitively sent out by scrambler 3730. If there is only one scrambler and a large amount of data, the repetition rate will be slow. Use of more than one scrambler allows the data repetition rate to increase.

Specifically, scrambler 3730 places data in-band for transmission to subscribers, along with scrambling the associated analog television signal 3722-2. In one arrangement, data is placed in the vertical blanking interval of the television signal, but data may be placed elsewhere in the signal and the invention is not limited in this respect. For example, data could be amplitude modulated on a sound carrier as is well known. As herein described, in-band transmission means the transmission of data within the video television channel comprising both audio and video carriers. Thus, the data from ISP 3742 may be transmitted by amplitude modulation on the sound carrier, hereinafter in-band audio data, or in the vertical or horizontal blanking periods of an analog television signal, hereinafter in-band video data. ISP 3742 may also be arranged to supply the data for transmission during unused portions a digital data stream such as an MPEG compressed video data stream.

ISP 3742 can also receive and/or generate information locally. For example, ISP 3742 may generate messages for transmission to subscribers concerning upcoming events or service interruptions or changes. If received from an information service provider, the information may either be transmitted as received or be reformatted by ISP 3742, then supplied to scrambler 3730 for transmission to subscribers.

ISP 3742 also passes information to a head-end controller ("HEC") 3732, which is connected to scrambler 3730 and an out-of-band transmitter 3734. Although HEC 3732 is illustrated as being connected to the same scrambler as ISP 3742, HEC 3732 may in fact be connected to a different scrambler or scramblers. HEC 3732 may conveniently be a Scientific-Atlanta Model 8658 for controlling transmission of data to scrambler 3730 and out-of-band transmitter 3734. As noted above, scrambler 3730 places data in-band for transmission to subscribers, along with scrambling an associated television signal. Out-of-band transmitter 3734 transmits information on a separate carrier, i.e., not within a channel. In one implementation, the out-of-band carrier is at 108.2 MHz, but other out-of-band carriers may also be used. The information transmitted under the control of HEC 3732 may, for example, be descrambling data. In one arrangement, information is inserted in each vertical blanking interval to indicate the type of scrambling employed in the next video field. Scrambling systems are well known in the art. For example, sync suppression scrambling, video inversion scrambling, and the like, or some combination of scrambling techniques may be used. Further, authorization information can be transmitted. Authorization information authorizes subscribers to receive certain channels or programs. Information from ISP 3742 and/or HEC 3732 may also be transmitted over non-scrambled channels via data repeaters (not shown) such as a Scientific-Atlanta Model 8556-100 data repeater as either in-band audio or video data.

Some of the transmitted information is global, i.e., it is transmitted to every subscriber. For example, the descrambling data may be a global transmission. It is noted that just because each subscriber receives the descrambling data does not mean that each subscriber terminal unit can descramble a received signal. Rather, only authorized subscriber terminal units are capable of descrambling the received signal. On the other hand, some information transmissions may be addressed transmissions. For example, authorization information would normally be addressed to individual subscribers. That is, when transmitted, the data will have an address (for example, a subscriber terminal unit serial number) associated with it. The addressed subscriber terminal unit receives the information and responds accordingly. Other subscriber terminal units will ignore the data. Further, there can be group addressed data, which will affect groups of subscriber terminal units.

The outputs of modulators 3728-1, 3728-2, any additional modulators, and out-of-band transmitter 3734 are supplied to a combiner 3736 that combines the individual channels into a single wide-band signal that is then transmitted via distribution network 3738 to a plurality of subscriber locations 3720-1, ... 3720-n (see FIG. 37C). Distribution network 3738 may include, for example, one or more optical transmitters 3740, one or more optical receivers 3742, and a coaxial cable 3744.

As indicated in FIG. 37B, subscription television system may include a plurality of head-end installations which each provide information to locations in a particular city or geographic region. A central control 3746 may be provided to coordinate the operation of various head-end installations in subscription television system. Central control 3746 is often associated with the central office of a multi-service operator and may communicate with and control head-end installations in many cities. Central control 3746 includes a system control computer 3748 that directs the other components of central control 3746. One example of a system control computer 3748 is a Scientific-Atlanta System Manager 3610 network controller. Central control 3746 may, for example, provide billing services for the service provider, including billing for pay-per-view events. A billing computer 3750 stores billing data and may also format and print bills. Communication between system control computer 3748 and HEC 3732 may be via modem, although the invention is not limited in this respect. Authorization data may be transmitted from system control computer 3748 to HEC 3732. HEC then 3732 appropriately formats the authorization data and transmits the formatted authorization data to subscriber terminal units either in-band through scrambler 3730 or out-of-band through out-of-band data transmitter 3734 as discussed above.

Head-end installation 3725 also includes an RF processor 3752 for receiving reverse path data communications from subscriber locations 3720-1, ... , 3720-n. These data communications may include billing information for impulse-pay-per-view purchases which may be forwarded to system control computer 3748 and may also include subscriber requests for database information maintained at head-end installation 3725. For example, a database server 3754 such as an Oracle® database server may provide access to reference materials such as encyclopedias, atlases, dictionaries, and the like. The subscriber request is forwarded from RF processor 3752 to an information request processor 3756 which accesses database 3754 for the requested information and forwards the requested information to the requesting subscriber, for example, via an addressed in-band or out-of-band transaction as described above. In addition, information request processor 3756 may also access a communications network 3758 in order to provide subscriber access to other services such as Banking Services.

As the amount of the data transmitted between the head-end installation and the subscriber locations increases, increased use will likely be made of out-of-band and digital transmission. For example, 50 MHz of bandwidth may be dedicated to digital data (non-video) transmission, both forward channel (to the subscriber terminal unit) and reverse channel (from the subscriber terminal unit). 200 MHz or more may also allocated to digital video and 300 MHz to 500 MHz may be allocated for analog video. Accordingly, although various illustrative transmission techniques are discussed above, the present invention is not limited in any respect by the manner in which information is communicated between the head-end installation and the subscriber locations.

Referring to FIG. 37C, each subscriber location 3720-1, . . . , 3720-n includes a subscriber terminal unit 3760 connected to distribution network 3738. "Subscriber location" as used herein refers to any location which is remotely located with respect to head-end installation 3725. In accordance with the instant invention, a subscriber terminal may, for example, be located in a home, a classroom, a hotel room, a hospital room, or an office. Each subscriber terminal unit 3760 may be coupled to one or more devices 3762-1, . . . , 3762-n. Devices 3762-1, . . . , 3762-n may include devices which are capable of being operated in response to user-supplied commands and the instant invention is not limited in this respect. Thus, the devices may include televisions, stereo receivers, video cassette recorders (VCRs), audio cassette recorders, compact disc (CD) players, video disc players, video game players, computers, and the like. Certain ones of the devices may be operatively connected together. Thus, as shown in FIG. 37C, device 3762-1 is connected to device 3762-2. For example, device 3762-1 may be a television and device 3762-1 may be a video cassette recorder. For purposes of discussion, it will be assumed that device 3762-1 is a video cassette recorder and that device 3762-2 is a television. One or more of devices 3762-1, . . . , 3762-n may be connected to switched power outlets of subscriber terminal unit 3760, whereby subscriber terminal unit 3760 may internally effect the on and off switching of these devices. A remote control unit 3766 communicates information to subscriber terminal unit 3760 over a communication link 3768. Communication link 3768 may, for example, be an infrared link.

Language Translation

The system of the present invention makes use of a lexicon and a constrained set of grammar rules to translate a language. The lexicon comprises linguistic units divided into four classes. Each linguistic unit is (1) a single word, such as "dog" or "government"; or (2) a combination of words, such as "parking space" or "prime minister"; or (3) a proper name; or (4) a word with a definition unique to the invention; or (5) one form of a word with multiple meanings. In the latter case, each definition of the word represents a different linguistic unit, the various definitions may appear as entries in different form classes. For purposes of automation, each definition is distinguished, for example, by the number of periods appearing at the end of the word. The entry for the first (arbitrarily designated) definition is listed with no period, the entry representing the second definition is listed with one period at its end, and so on. Alternatively, different word senses can be identified numerically, e.g., using subscripts.

Words unique to the invention may make up a very small proportion of the total lexicon, and none of these words is specific to the invention or alien to the natural language upon which it is based. Instead, invention-specific words are broadened in connotation to limit the overall number of terms in the lexicon. For example, in a preferred implementation, the word "use" is broadened to connote employment of any object for its primary intended purpose, so that in the sentence "Jake use book," the term connotes reading. The word "on" may be used to connote time (e.g., (i go-to ballgame) on yesterday). If desired for ease of use, however, the invention-specific words can be eliminated altogether and the lexicon expanded accordingly.

The invention divides the global lexicon of allowed terms into four classes: "things" or nominal terms that connote, for example, people, places, items, activities or ideas, identified herein by the code T; "connectors" that specify relationships between two (or more) nominal terms (including words typically described as prepositions and conjunctions, and terms describing relationships in terms of action, being, or states of being), identified herein by C; "descriptors" modifying the state of one or more nominal terms (including words typically described as adjectives, adverbs and intransitive verbs), identified herein by D; and "logical connectors" establishing sets of the nominal terms, identified herein by C. The preferred logical connectors are "and" and "or."

Naturally, the lexicon cannot and does not contain a list of possible proper names; instead, proper names, like other words not recognized by the invention, are returned inside angle brackets to indicate that translation did not occur. The system also does not recognize verb tenses; connectors are phrased in the present tense, since tense is easily understood from context. Tense may nonetheless be indicated, however, by specifying a time, day and/or date.

Sentences in accordance with the invention are constructed from terms in the lexicon according to four expansion rules. The most basic sentences proceed from one of the following three constructions (any of which can be created from a T term in accordance with the expansion rules set forth hereinbelow). These structures, which represent the smallest possible sets of words considered to carry information, are the building blocks of more complex sentences. Their structural simplicity facilitates ready translation into conversational, natural-language sentences; thus, even complex sentences in accordance with the invention are easily transformed into natural-language equivalents through modular analysis of the more basic sentence components (a process facilitated by the preferred representations described later).

Basic Structure 1 (BS1) is formed by placing a descriptor after a nominal term to form the structure TD. BS1 sentences such as "dog brown" and "Bill swim" readily translate into the English sentence "the dog is brown" (or the phrase "the brown dog") and "Bill swims."

BS2 is formed by placing a connector between two nominal terms to form the structure TCT. BS2 sentences such as "dog eat food" readily translate into English equivalents.

BS3 is found by placing a logical connector between two nominal terms to form a series represented by the structure TCT . . . . The series can be a single conjunction, such as "Bob and Ted," or compound structure such as "Bob and Ted and Al and Jill" or "red or blue or green."

A sentence comprising one or more of the basic structures set forth above may be expanded using the following rules:

Rule I: To a nominal term, add a descriptor (T-->TD)

In accordance with Rule I, any linguistic unit from the nominal class can be expanded into the original item followed by a new item from the descriptor class, which modifies the original item. For example, "dog" becomes "dog big." Like all rules of the invention, Rule I is not limited in its application to an isolated nominal term (although this is how BS1 sentences are formed); instead, it can be applied to any nominal term regardless of location within a larger sentence. Thus, in accordance with Rule I, TD1-->(TD2)D1. For example, "dog big" becomes "(dog brown) big" (corresponding to English sentence, "the brown dog is big").

The order of addition may or may not be important in the case of consecutive adjectives, since these independently modify T; for example, in "(dog big) brown," the adjective "big" distinguishes this dog from other dogs, and "brown" may describe a feature thought to be otherwise unknown to the listener. The order of addition is almost always important where a D term is an intransitive verb. For example, expanding the TD sentence "dog run" (corresponding to "the dog runs" or "the running dog") by addition of the descriptor "fast" forms, in accordance with Rule I, "(dog fast) run" (corresponding to "the fast dog runs").

To express "the dog runs fast," it is necessary to expand the TD sentence "dog fast" with the descriptor "run" in the form "(dog run) fast."

Applying expansion Rule I to the structure BS2 produces TCT-->(TD)CT. For example, "dog eat food" becomes "(dog big) eat food." Rule I can also be applied to compound nominal terms of the form TCT, so that a structure of form BS3 becomes TCT-->(TCT)D. For example, "mother and father" becomes "(mother and father) drive." In this way, multiple nominal terms can be combined, either conjunctively or alternatively, for purposes of modification. It should also be noted that verbs having transitive senses, such as "drive," are included in the database as connectors as well as descriptors. Another example is the verb "capsize," which can be intransitive ("boat capsize") as well as transitive ("captain capsize boat").

Rule IIa: To a nominal term, add a connector and another nominal term (T-->TCT).

In accordance with Rule IIa, any linguistic unit from the nominal class can be replaced with a connector surrounded by two nominal entries, one of which is the original linguistic unit. For example, "house" becomes "house on hill." Applying expansion Rule IIa to BS1 produces TD-->(TCT)D; for example, "gloomy house" becomes "(house on hill) gloomy," or "the house on the hill is gloomy." Rule IIa can be used to add a transitive verb and its object. For example, the compound term "mother and father" can be expanded to "(mother and father) drive car."

Rule IIb: To a nominal term, add a logical connector and another nominal term (T-->TCT).

In accordance with Rule IIb, any linguistic unit from the nominal class can be replaced with a connector surrounded by two nominal entries, one of which is the original linguistic unit. For example, "dog" becomes "dog and cat."

Again, for purposes of Rule IIa and Rule IIb, a nominal term can be a composite consisting of two or more nominal terms joined by a connector. For example, the expansion "(john and bill) go-to market" satisfies Rule Ia. Subsequently applying Rule I, this sentence can be further expanded to "(john and bill) go-to market) together.

Rule III: To a descriptor, add a logical connector and another descriptor (D-->DCD).

In accordance with Rule III, a descriptor can be replaced with a logical connector surrounded by two descriptors, one of which is the original. For example, "big" becomes "big and brown." Applying expansion Rule III to BS1 produces TD-->T(DCD); for example "dog big" (equivalent to "the dog is big," or "the big dog") becomes "dog (big and brown)" (equivalent to "the dog is big and brown" or "the big brown dog").

Figure 38:
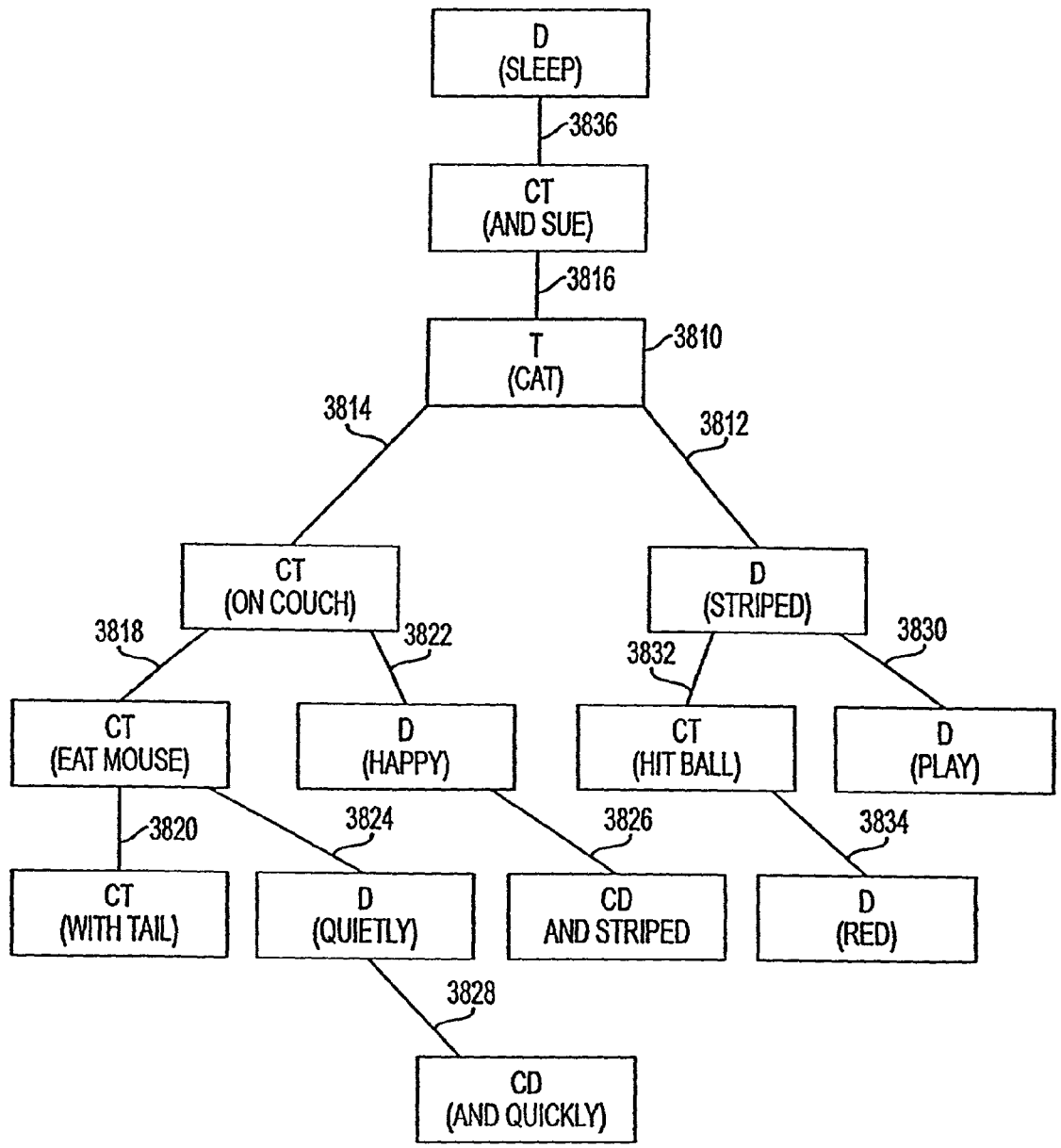
FIG. 38 depicts the manner in which rules are applied to form acceptable sentences in accordance with an embodiment of the invention that includes language translation capabilities.

The manner in which these rules are applied to form acceptable sentences in accordance with the invention is shown in FIG. 38. Beginning with a nominal term such as cat, shown at 3810, any of the three basic structures can be formed by following expansion Rules I, IIa and IIb as shown at 3812, 3814, 3816, respectively, to produce "cat striped" (BS1), "cat on couch" (BS2) or "cat and Sue" (BS3). Iterative application of expansion rule IIa at 3818 and 3820 produces structures of the forms TC1 T1-->(TCI T1)C2 T2 or "(cat on couch) eat mouse)" and (TC1 T1)C2 T2-->((TCI T1)C2 T2)C3 T3 or "(((cat on couch) eat mouse) with tail)." Expansion rule I can be applied at any point to a T linguistic unit as shown at 3822 (to modify the original T, cat, to produce "(happy cat) on couch") and 3824 (to modify "eat mouse"). Rule III can also be applied as shown at 3826 (to further modify cat to produce "(((happy and striped) cat) on couch)") and 3828 (to further modify "eat mouse").

Expansion Rule I can be applied iteratively as shown at 3812, 3830 to further modify the original T (although, as emphasized at 3830, a descriptor need not be an adjective). Expansion Rule IIa is available to show action of the modified T (as shown at 3832), and Rule I can be used to modify the newly introduced T (as shown at 3834). Rule I can also be used to modify (in the broad sense of the invention) a compound subject formed by Rule IIb, as shown at 3836. The order in which linguistic units are assembled can strongly affect meaning. For example, the expansion TCI TI-->(TCI T1)C2 T2 can take multiple forms. The construct "cat hit (ball on couch)" conveys a meaning different from "cat hit ball (on couch)." In the former the ball is definitely on the couch, and in the latter the action is taking place on the couch. The sentence "John want car) fast" indicates that the action should be accomplished quickly, while "John want (car fast))" means that the car should move quickly. A more elaborate example of the foregoing expansion rules, which illustrates the utility of the invention in representing a natural-language discussion, appears in the following table:

TABLE 8

Figure 39:
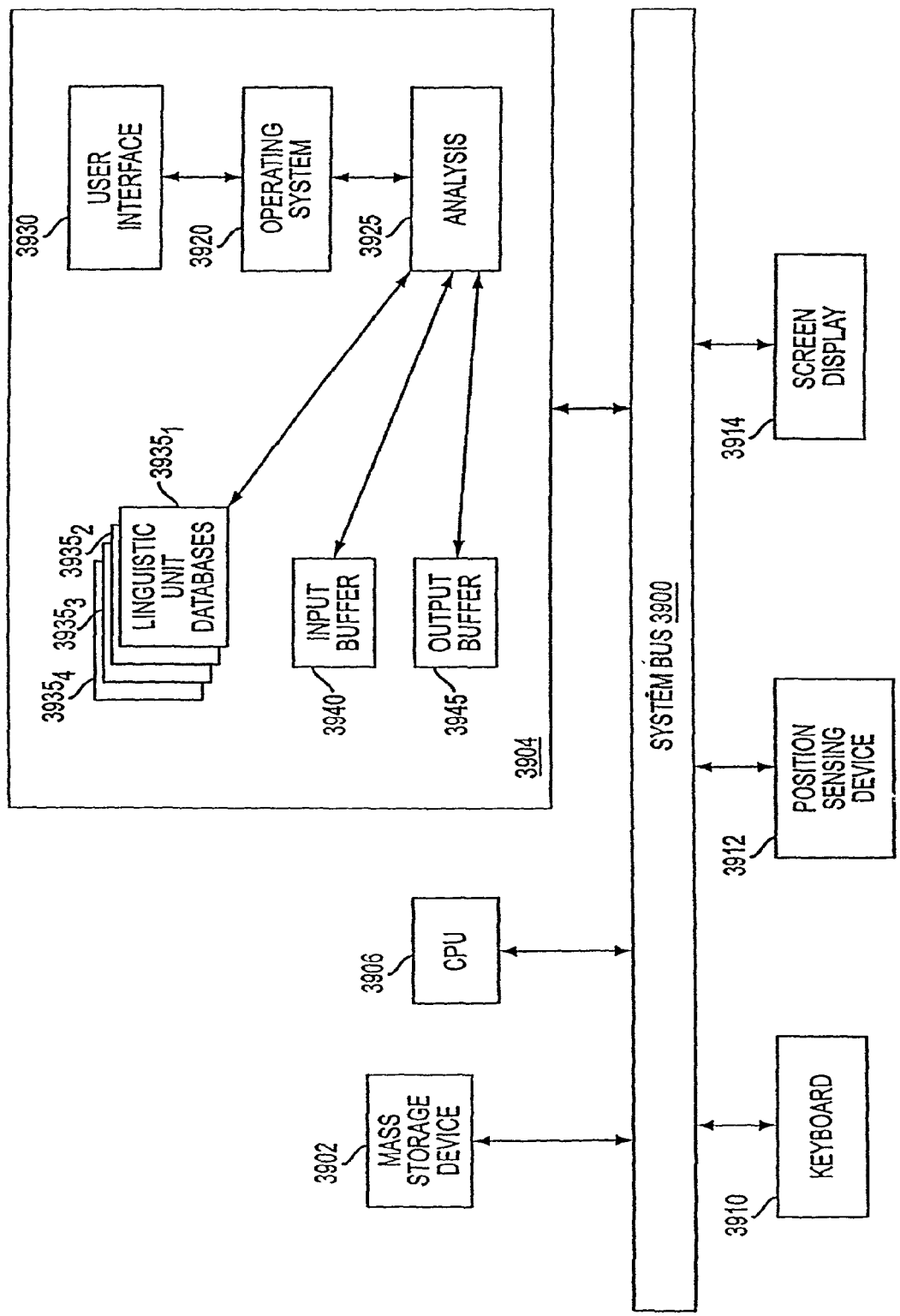
FIG. 39 illustrates a representative hardware implementation of an embodiment of the invention that includes language translation capabilities.

Zairian health officials said 97 people have died from the Ebola virus
so
far. Jean Tamfun, a virologist, who helped identify the virus in 1976,
criticized the government's quarantines and roadblocks as ineffective.
On
Saturday the quarantine on the Kikwith region was officially lifted.
health-official/s of zaire
*say*
people 97
*dead
*because-of*
virus named ebola
jean-tamfun be*
virologist in zaire
he help*
scientist/s identify*
virus named ebola
*in 1976
jean-tamfun criticize*
government of zaire
he say*
quarantine/s ineffective
*and*
roadblock/s ineffective
government end*
quarantine of*
region named kikwit
*on saturday A representative hardware implementation of the invention is shown in FIG. 39. As indicated therein, the system includes a main bi-directional bus 3900, over which all system components communicate. The main sequence of instructions effectuating the invention, as well as the databases discussed below, reside on a mass storage device (such as a hard disk or optical storage unit) 3902 as well as in a main system memory 3904 during operation. Execution of these instructions and effectuation of the functions of the invention is accomplished by a central-processing unit ("CPU") 3906. The user interacts with the system using a keyboard 3910 and a position-sensing device (e.g., a mouse) 3912. The output of either device can be used to designate information or select particular areas of a screen display 3914 to direct functions to be performed by the system. The main memory 3904 contains a group of modules that control the operation of CPU 3906 and its interaction with the other hardware components. An operating system 3920 directs the execution of low-level, basic system functions such as memory allocation, file management and operation of mass storage devices 3902. At a higher level, an analysis module 3925, implemented as a series of stored instructions, directs execution of the primary functions performed by the invention, as discussed below; and instructions defining a user interface 3930 allow straightforward interaction over screen display 3914. User interface 3930 generates words or graphical images on display 3914 to prompt action by the user, and accepts user commands from keyboard 3910 and/or position-sensing device 3912. Main memory 3904 also includes a partition defining a series of databases capable of storing the linguistic units of the invention, and representatively denoted by reference numerals $3935_1$, $3935_2$, $3935_3$, $3935_4$. These databases 3935, which may be physically distinct (i.e., stored in different memory partitions and as separate files on storage device 3902) or logically distinct (i.e., stored in a single memory partition as a structured list that may be addressed as a plurality of databases), each contain all of the linguistic units corresponding to a particular class in at least two languages. In other words, each database is organized as a table each of whose columns lists all of the linguistic units of the particular class in a single language, so that each row contains the same linguistic unit expressed in the different languages the system is capable of translating. In the illustrated implementation, nominal terms are contained in database $3935_1$, and a representative example of the contents of that database in a single language (English)—that is, the contents of one column in what would be a multi-column working database—appears in Table 9; connectors are contained in database $3935_2$, an exemplary column of which appears in Table 10; descriptors are contained in database $3935_3$ an exemplary column of which appears in Table 11; and logical connectors (most simply, "and" and "or") are contained in database $3935_4$.

TABLE 9

NOMINATIVE TERMS

| | | | | |
|---|---|---|---|---|
| actor | argument | bathrobe | boat | butter |
| address | arm | bathtub | body | butterfly |
| advertisement | army | battery | bolivia | button |
| advice | arrival | beach | bomb | cabbage |
| africa | art | bean | bone | cabin |
| afternoon | artist | bear | book | cafe |
| age | asia | beard | border | cake |
| aim | attic | bed | bottle | camel |
| air | august | bedroom | bottom | camera |
| airplane | aunt | bee | bowl | camp |
| airport | australia | beef | box | canada |
| algeria | austria | beer | boy | canal |
| altitude | author | beet | bracelet | candle |
| aluminum | authority | beginning | brain | cane |
| ambassador | avalanche | behavior | brake | capital |
| amount | baby | belgium | brass | captain |
| animal | back | bell | brazil | car |
| ankle | backpack | belt | bread | cardboard |
| answer | bag | benefit | breakfast | cargo |
| ant | baker | beverage | breath | carpenter |
| apartment | balcony | bicycle | brick | carpet |
| appetite | ball | bill | bridge | carrot |
| apple | banana | billiard | broom | cash |
| appointment | bandage | bird | brother | cat |
| apricot | bank | birth | brush | cattle |
| april | barley | birthday | building | cauliflower |
| architect | barn | bladder | bulgaria | cellar |
| argentina | barrel | blanket | bullet | cemetery |

TABLE 9-continued

NOMINATIVE TERMS

| | | | | |
|---|---|---|---|---|
| cheek | basket | blood | bus | chain |
| cheese | bath | blouse | butcher | chair |
| chemistry | copy | dinner | export | germany |
| cherry | corkscrew | direction | eye | gift |
| chess | corn | disease | face | girl |
| chest | cost | dish | factory | glass |
| chicken | cotton | distance | fall | glasses |
| child | couch | document | family | glove |
| chile | country | dog | farm | glue |
| chin | courage | donkey | father | goat |
| china | cousin | door | february | god |
| chocolate | cow | drawing | ferry | gold |
| christmas | cracker | dream | fig | goose |
| church | crane | dress | finger | government |
| cigar | cream | driver | fingernail | grape |
| cigarette | crib | drum | finland | grapefruit |
| circle | crime | duck | fire | grass |
| citizen | cuba | dust | fish | greece |
| clock | cucumber | eagle | fist | group |
| clothing | cup | ear | flea | guard |
| cloud | curtain | earring | flood | guest |
| clove | czechoslov | earthquake | floor | guide |
| club | asia | ecuador | flour | gun |
| coal | damage | education | flower | gymnastics |
| coat | dance | eel | flute | hail |
| cockroach | danger | egg | fly | hair |
| cocoa | date | egypt | food | hairdresser |
| coffee | daughter | elbow | foot | half |
| collar | day | electricity | football | hammer |
| colombia | death | elevator | forest | hand |
| color | debt | end | fork | handkerchief |
| comb | december | enemy | fox | harbor |
| comfort | decision | energy | france | harvest |
| competition | degree | engine | friday | hat |
| computer | denmark | engineer | friend | he |
| concert | dentist | england | frog | head |
| condition | departure | entrance | front | health |
| connection | desert | envelope | fruit | heart |
| conversation | dessert | ethiopia | funeral | heel |
| cook | diarrhea | europe | game | here |
| copper | dictionary | excuse | garden | highway |
| holland | digestion | exhibition | garlic | hole |
| honey | dining-room | exit | gasoline | holiday |
| horse | key | expense | gauge | pain |
| horse-race | kidney | lunch | mushroom | painting |
| hospital | kind | lung | mustard | pair |
| hotel | king | machine | nail | pakistan |
| hour | kitchen | magazine | nail-file | pancake |
| house | knee | magic | name | panic |
| hungary | knife | maid | nature | pants |
| husband | kuwait | mail | neck | paper |
| I | lace | malaysia | necklace | parachute |
| ice | ladder | malta | needle | parents |
| ice-cream | lake | man | neighbor | parking |
| iceland | lamb | map | nepal | part |
| idea | language | march | netherlands | partridge |
| import | lawyer | market | new-zealand | passport |
| india | lead | marriage | | pea |
| indonesia | leaf | match | newspaper | peace |
| information | leather | mattress | nicaragua | pear |
| ink | lebanon | may | nigeria | peasant |
| insect | leg | meat | night | pen |
| insurance | lemon | medicine | noodle | pencil |
| interpreter | letter | meeting | noon | people |
| invention | liberia | melon | north-america | pepper |
| iran | library | member | | persia |
| iraq | libya | memorial | north-pole | peru |
| ireland | license | metal | norway | pharmacy |
| iron | life | mexico | nose | philippines |
| island | light | middle | november | physician |
| isreal | light-bulb | milk | number | piano |
| it | lightning | minute | nurse | picture |
| italy | lime | mistake | nut | pig |
| january | linen | monday | oak | pigeon |
| japan | lion | money | oar | pillow |
| jewel | lip | monkey | oats | pilot |

TABLE 9-continued

NOMINATIVE TERMS

| | | | | |
|---|---|---|---|---|
| job | liquid | month | october | pin |
| joke | liver | moon | office | pine-tree |
| jordan | living-room | morning | oil | pipe |
| juice | lobster | morocco | olive | plant |
| july | lock | mosquito | onion | platform |
| june | look | mother | orange | play |
| kenya | loom | mountain | ore | playing-card |
| plum | love | mouse | ox | pleasure |
| pocket | luck | mouth | package | tin |
| poison | room | skin | story | tire |
| poland | root | skis | stove | toast |
| police-officer | rope | sky | street | tobacco |
| porter | rubber | sled | student | today |
| portugal | rumania | smell | subway | toe |
| post-office | russia | smoke | sugar | toilet |
| postcard | rust | snake | summer | tomato |
| pot | saddle | snow | sun | tomorrow |
| potato | sadness | soap | sunday | tongue |
| powder | safety | socks | surprise | tool |
| prison | safety-belt | soda | swamp | tooth |
| problem | sailor | soldier | sweden | toothbrush |
| property | salt | solution | switzerland | top |
| purse | sand | son | syria | towel |
| quarter | saturday | song | table | town |
| queen | sauce | sound | tail | toy |
| question | saudi-arabia | soup | tailor | train |
| rabbit | sausage | south-africa | taste | tree |
| radio | scale | south-america | tax | trip |
| rag | scarf | south-pole | tea | trouble |
| rain | school | soviet-union | teacher | truth |
| raincoat | science | space | telephone | Tuesday |
| rat | scissors | spain | television | tunisia |
| razor | scotland | spice | tent | turkey |
| receipt | screw | spoon | test | tv-show |
| record-player | sea | spoon | thailand | typewriter |
| refrigerator | self | spring | theater | umbrella |
| religion | september | staircase | they | uncle |
| rent | shape | stamp | thief | united-states |
| restaurant | she | star | thigh | uruguay |
| result | sheep | starch | thing | us |
| rice | shirt | station | thirst | vaccination |
| ring | shoe | steak | thread | vegetable |
| risk | shoulder | steel | thumb | velvet |
| river | side | stick | thunder | venezuela |
| rocket | signature | stock-market | Thursday | victim |
| roll | silk | stomach | ticket | view |
| roof | silver | stone | tie | village |
| voice | sister | store | tiger | vinegar |
| waiter | situation | storm | time | violin |
| wall | size | weight | timetable | work |
| war | water | wheat | window | year |
| waste | we | where? | winter | yesterday |
| watch | weather | who? | Woman | you |
| | wedding | wife | wood | yugoslavia |
| | week | wind | wool | |
| | | | word | |

TABLE 10

CONNECTORS

| | | | | |
|---|---|---|---|---|
| able-to | call | from | mix | shoot |
| about | called | from | more-than | should |
| above | capsize | fry | move | sing |
| across | capture | give | near | smell |
| afraid-of | carry | go-in | need | speak |
| after | catch | go-through | occupy | steal |
| against | cause | go-to | of | sting |
| allow | change | hang | on | stop |
| answer | climb | hate | outside | study |
| arrest | close | have | pay | take |
| arrive-at | cook | hear | play | teach |
| ask | count | help | prepare | throw |
| at | cut | hit | print | to |
| bake | deal-with | hunt | promise | touch |
| be | decrease | if | prove | translate |
| because | defeat | in | pull | try |
| become | deliver | in-front-of | push | turn-off |
| before | discuss | in-order-to | put | turn-on |
| begin | down | include | read | under |
| behind | drink | increase | reduce | understand |
| believe | drive | kill | refuse | until |
| bet | drop | kiss | remember | use |
| betray | eat | know | repeat | value |
| between | examine | learn | ride | visit |
| blame | explain | leave | roast | want |
| bother | find | like | say | wash |
| break | finish | live-in | see | while |
| bring | fix | look-for | sell | win |
| burn | for | made-of | send | with |
| but | for | make | sew | work-for |
| buy | forget | meet | shave | write |

TABLE 11

DESCRIPTORS

| | | | | |
|---|---|---|---|---|
| abroad | clean | flat | long | round |
| absent | clear | fly | malignant | run |
| again | cold | forbidden | maybe | sad |
| agree | complain | foreign | mean | safe |
| alive | continue | fragile | more | short |
| all | correct | free | much | sick |
| almost | cough | fresh | mute | similar |
| alone | crazy | fun | mutual | sit |
| also | cry | funny | my | sleep |
| always | curious | glad | nervous | slow |
| angry | damp | good | neutral | slowly |
| another | dangerous | goodbye | never | small |
| any | dark | green | new | smile |
| argue | dead | grey | next | soft |
| artificial | deaf | grow | nice | some |
| automatic | decrease | guilty | north | sometimes |
| available | deep | hang | not | sour |
| backward | defective | happen | now | south |
| bad | different | happy | often | special |
| bashful | difficult | hard | okay | stand |
| beautiful | dirty | healthy | old | strong |
| begin | drop | heavy | open | sweet |
| black | drown | hungry | our | swim |
| blind | dry | illegal | permitted | talk |
| blond | early | important | pink | tall |
| blue | east | increase | play | thanks |
| boil | easy | intelligent | please | there |
| boring | empty | interesting | poor | thick |
| born | enough | jealous | portable | thin |
| brave | expensive | kiss | possible | think |
| broken | expire | large | previous | tired |
| brown | extreme | last | quiet | together |
| burn | far | late | red | too-much |
| capsize | fast | laugh | rest | transparent |
| careful | fat | lazy | rich | travel |
| change | few | left | right | ugly |

TABLE 11-continued

| DESCRIPTORS | | | | |
|---|---|---|---|---|
| cheap | first | legal | ripe | upstairs |
| urgent | warm | wet | worry | young |
| wait | weak | white | wrong | your |
| walk | west | why? | Yellow | |

An input buffer 3940 receives from the user, via keyboard 3910, an input sentence that is preferably structured in accordance with the invention and formatted as described below. In this case, analysis module 3925 initially examines the input sentence for conformance to the structure. Following this, module 3925 processes single linguistic units of the input sentence in an iterative fashion, addressing the databases to locate the entries corresponding to each linguistic unit in the given language, as well as the corresponding entries in the target language. Analysis module 3925 translates the sentence by replacing the input entries with the entries from the target language, entering the translation into an output buffer 3945 whose contents appears on screen display 3914.

It must be understood that although the modules of main memory 3904 have been described separately, this is for clarity of presentation only; so long as the system performs all necessary functions, it is immaterial how they are distributed within the system and the programming architecture thereof.

In order to facilitate convenient analysis by module 3925, input sentences are preferably structured in a characteristic, easily processed format that facilitates both straightforward identification of individual linguistic units and simple verification that the sequence of units qualifies as a legitimate sentence in accordance with the expansion rules of the invention. In one approach ("portrait form"), each linguistic unit of a sentence appears in a separate line. If an expansion has been applied, an asterisk (*) is used to mark where the expansion occurred; that is, the * is used to connect basic sentence structures together to form larger sentences. For example, drawing from the entries in FIG. 1, cat striped
*hit*
ball red represents the results of steps 132 and 134.

Alternatively, the sentence can be expressed in an algebraic ("landscape") format where expansions are identified by enclosing the expansion terms in parentheses:

(cat striped) hit (ball red)

In either case, the user's input is treated as a character string, and using standard string-analysis routines, module 3925 identifies the separate linguistic units and the expansion points. It then compares these with templates corresponding to the allowed expansion rules to validate the sentence, following which database lookup and translation take place. If the sentence fails to conform to the rules of the invention, module 3925 alerts the user via screen display 3914.

In accordance with either of these representation formats, plurals in English are noted by adding "/s" to the end of a singular noun (e.g., "nation/s"). In other languages, the most generic method of forming plurals is used; for example, in French, "/s" is added as in English, but in Italian, "/i" is added. Numbers are expressed numerically.

Alternatively, analysis module 3925 can be configured to process unformatted input sentences. To accomplish this, module 3925 looks up each input word (or, as appropriate, groups of words) in databases 3935 and builds a representation of the sentence in terms of the linguistic classes comprising it—that is, replacing each unit with its linguistic class symbol. Module 3925 then assesses whether the resulting sequence of classes could have been generated in accordance with the allowed expansion rules, and if so, groups the linguistic units to facilitate lookup and translation. The output is provided either in an unstructured format corresponding to the input or in one of the formats set forth above. The latter form of output is preferred, since word strings in one language rarely correspond sensibly to word strings in another language produced solely by substitution; it is generally easier to comprehend output in a form that isolates the linguistic units and highlights expansions. The invention may incorporate additional features to simplify operation. For example, as noted above, words having multiple senses are differentiated by ending periods; naturally, the number of periods following a particular sense of the word represents an arbitrary choice. Accordingly, an additional database 3935 can comprise a dictionary of words having multiple meanings, with the invention-recognized format of each sense of the word set next to the various definitions. User interface 3930 interprets the user's clicking on one of the definitions as selection thereof, and enters the proper encoding of the word into input buffer 3940.

Similarly, because considerations of economy and speed of operation limit the overall desirable size of the databases, one of the databases 3935 can be set up as a thesaurus that gives the closest invention-recognized linguistic unit to an unrecognized input word. In operation, when following an unsuccessful attempt by analysis module 3925 to locate a word in the databases, module 3925 can be programmed to consult the thesaurus database 3935 and return a list of words that do, in fact, appear in the linguistic-unit databases.

Module 3925 can also include certain utilities that recognize and correct (e.g., after approval by the user) frequently made errors in sentence construction. For example, the present invention ordinarily indicates possession by a named person using the verb "to have"; thus, the sentence "Paul's computer is fast" is represented (in algebraic format) as "paul have (computer fast)" or "(computer of paul) fast"; if the person is unnamed, the usual possessive pronouns may be used (e.g., "(computer my) fast"). Thus, module 3925 can be configured to recognize constructions such as "Paul's" and return the appropriate construction in accordance with the invention.

It will therefore be seen that the foregoing represents a convenient and fast approach to translation among multiple languages. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for monitoring telephonic interactions of an agent with customers, the method comprising:
   (a) pre-recording a first speech portion of a telephone call received by an agent;

(b) determining whether said first speech portion satisfies a monitoring condition, and, if so:

(c) recording at least a second portion of said telephone call.

2. A method for monitoring telephonic interactions of an agent with customers, the method comprising:

(a) pre-recording a first speech portion of a telephone call received by an agent;

(b) determining whether said first speech portion satisfies a monitoring condition, and, if so:

(c) recording at least a second portion of said telephone call; and (d) wherein said determining step comprises determining a speech rate of words spoken during said telephone call and wherein said monitoring condition is whether said speech rate exceeds a predetermined level.

3. A method for monitoring telephonic interactions of an agent with customers, the method comprising:

(a) pre-recording a first speech portion of a telephone call received by an agent;

(b) determining whether said first speech portion satisfies a monitoring condition, and, if so:

(c) recording at least a second portion of said telephone call; and (d) wherein said determining step comprises determining a state of emotion present during said telephone call and wherein said monitoring condition is whether said state of emotion exceeds a predefined emotion threshold.

\* \* \* \* \*